(12) United States Patent
Chen

(10) Patent No.: US 11,668,909 B2
(45) Date of Patent: Jun. 6, 2023

(54) PHOTOGRAPHING OPTICAL LENS SYSTEM, IMAGE CAPTURING UNIT AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 211 days.

(21) Appl. No.: 17/145,069

(22) Filed: Jan. 8, 2021

(65) Prior Publication Data

US 2021/0157105 A1 May 27, 2021

Related U.S. Application Data

(63) Continuation of application No. 16/676,312, filed on Nov. 6, 2019, now Pat. No. 10,921,567, which is a
(Continued)

(30) Foreign Application Priority Data

Aug. 11, 2015 (TW) .................................. 104126122

(51) Int. Cl.
*G02B 13/00* (2006.01)
*G02B 9/64* (2006.01)
(Continued)

(52) U.S. Cl.
CPC ........... *G02B 13/0045* (2013.01); *G02B 3/04* (2013.01); *G02B 5/005* (2013.01); *G02B 5/208* (2013.01); *G02B 9/64* (2013.01); *G02B 27/0025* (2013.01)

(58) Field of Classification Search
CPC ............................. G02B 13/0045; G02B 9/64
See application file for complete search history.

(56) References Cited

U.S. PATENT DOCUMENTS

| 4,770,513 A | 9/1988 | Fujie et al. |
| 4,981,344 A | 1/1991 | Ueda |
| (Continued) | | |

FOREIGN PATENT DOCUMENTS

| CN | 101315458 A | 12/2008 |
| CN | 101354479 A | 1/2009 |
| (Continued) | | |

OTHER PUBLICATIONS

USPTO, Notice of Allowance, dated Aug. 12, 2016 in U.S. Appl. No. 14/866,314.
(Continued)

*Primary Examiner* — Joseph P Martinez
(74) *Attorney, Agent, or Firm* — Maschoff Brennan

(57) ABSTRACT

A photographing optical lens system includes, in order from an object side to an image side, a first lens element, a second lens element, a third lens element, a fourth lens element, a fifth lens element, a sixth lens element, a seventh lens element and an eighth lens element. The second lens element has positive refractive power. The eighth lens element has an image-side surface being concave in a paraxial region thereof, wherein the image-side surface of the eighth lens element has at least one convex shape in an off-axis region thereof, and both an object-side surface and the image-side surface thereof are aspheric. The photographing optical lens system has a total of eight lens elements. An air gap in a paraxial region is located between every two lens elements of the photographing optical lens system that are adjacent to each other.

25 Claims, 27 Drawing Sheets

Related U.S. Application Data continuation of application No. 16/379,740, filed on Apr. 9, 2019, now Pat. No. 10,514,528, which is a continuation of application No. 16/013,234, filed on Jun. 20, 2018, now Pat. No. 10,302,915, which is a continuation of application No. 15/844,102, filed on Dec. 15, 2017, now Pat. No. 10,036,876, which is a continuation of application No. 15/588,163, filed on May 5, 2017, now Pat. No. 9,885,855, which is a continuation of application No. 15/345,133, filed on Nov. 7, 2016, now Pat. No. 9,678,315, which is a continuation of application No. 14/866,314, filed on Sep. 25, 2015, now Pat. No. 9,523,841.

(51) Int. Cl.
 *G02B 5/00* (2006.01)
 *G02B 5/20* (2006.01)
 *G02B 27/00* (2006.01)
 *G02B 3/04* (2006.01)

(56) References Cited

U.S. PATENT DOCUMENTS

| | | | |
|---|---|---|---|
| 5,211,297 | A | 5/1993 | Yamada |
| 5,272,566 | A | 12/1993 | Aoki |
| 5,440,429 | A | 8/1995 | Kim |
| 5,625,495 | A | 4/1997 | Moskovich |
| 6,091,901 | A | 7/2000 | Ogawa |
| 9,523,841 | B1 | 12/2016 | Chen |
| 2012/0081799 | A1 | 4/2012 | Chen |
| 2015/0036230 | A1 | 2/2015 | Bone |
| 2015/0103413 | A1* | 4/2015 | Uchida ............... G02B 13/18 359/694 |
| 2015/0355445 | A1 | 12/2015 | Uchida |
| 2016/0202461 | A1 | 7/2016 | Uchida |
| 2017/0052335 | A1 | 2/2017 | Chen |
| 2017/0242223 | A1 | 8/2017 | Chen |

FOREIGN PATENT DOCUMENTS

| | | |
|---|---|---|
| JP | 1988070818 A | 2/1988 |
| JP | H02-196207 | 1/1989 |
| JP | H08-179215 | 12/1994 |
| JP | H11-500834 | 9/1995 |
| JP | H11142726 A | 5/1999 |
| JP | H11-174326 | 7/1999 |
| JP | H11295595 A | 10/1999 |
| JP | 2000321490 A | 11/2000 |
| JP | 2009251367 | 10/2009 |
| JP | 2013061547 A | 4/2013 |
| JP | 2013130820 A | 7/2013 |
| JP | 2014016574 A | 1/2014 |
| JP | 2014-055992 | 3/2014 |
| JP | 2014095841 A | 5/2014 |
| JP | 2014219609 A | 11/2014 |
| JP | 2015-052674 | 3/2015 |
| JP | 2015042674 A | 3/2015 |
| JP | 2015125383 A | 7/2015 |
| JP | 2015129967 A | 7/2015 |
| WO | 2012086890 | 4/2012 |

OTHER PUBLICATIONS

USPTO, Notice of Allowance, dated Feb. 10, 2017 in U.S. Appl. No. 15/345,133.

USPTO, Notice of Allowance, dated Sep. 28, 2017 in U.S. Appl. No. 15/588,163.

\* cited by examiner

PHOTOGRAPHING OPTICAL LENS SYSTEM, IMAGE CAPTURING UNIT AND ELECTRONIC DEVICE

RELATED APPLICATIONS

This application is a continuation patent application of U.S. application Ser. No. 16/676,312, file on Nov. 6, 2019, which is a continuation patent application of U.S. application Ser. No. 16/379,740, file on Apr. 9, 2019, which is a continuation patent application of U.S. application Ser. No. 16/013,234, file on Jun. 20, 2018, which is a continuation patent application of U.S. application Ser. No. 15/844,102, filed on Dec. 15, 2017, which is a continuation patent application of U.S. application Ser. No. 15/588,163, filed on May 5, 2017, which is a continuation patent application of U.S. application Ser. No. 15/345,133, filed on Nov. 7, 2016, which is a continuation patent application of U.S. application Ser. No. 14/866,314, filed Sep. 25, 2015, which claims priority to Taiwan Application 104126122, filed Aug. 11, 2015, all of which are incorporated by reference herein in its entirety.

BACKGROUND

Technical Field

The present disclosure relates to a photographing optical lens system, an image capturing unit and an electronic device, more particularly to a photographing optical lens system and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced, and compact optical systems have gradually evolved toward the field of higher megapixels, there is an increasing demand for compact optical systems featuring better image quality.

A conventional optical system employed in a portable electronic product mainly adopts a lens structure with fewer lens elements. Due to the popularity of mobile terminals with high-end specifications, such as smart phones, wearable devices and tablet personal computers, the requirements for high resolution and image quality of present compact optical systems increase significantly. However, the conventional optical systems cannot satisfy these requirements of the compact optical systems. Since an image capturing unit applied to the electronic product has evolved toward the field of large aperture, wide field of view, large image surface and high resolution, the conventional optical system is unfavorable for simultaneously satisfying the requirements of good image quality and compact size. Thus, it is important to develop an optical system to provide good image quality and compact size simultaneously.

SUMMARY

According to one aspect of the present disclosure, a photographing optical lens system includes, in order from an object side to an image side, a first lens element, a second lens element, a third lens element, a fourth lens element, a fifth lens element, a sixth lens element, a seventh lens element and an eighth lens element. The second lens element has positive refractive power. The eighth lens element has an image-side surface being concave in a paraxial region thereof, wherein the image-side surface of the eighth lens element has at least one convex shape in an off-axis region thereof, and both an object-side surface and the image-side surface of the eighth lens element are aspheric. The photographing optical lens system has a total of eight lens elements. There is an air gap in a paraxial region between every two of the lens elements that are adjacent to each other. When an axial distance between an object-side surface of the first lens element and the image-side surface of the eighth lens element is Td, a focal length of the photographing optical lens system is f, a vertical distance between a non-axial critical point on the image-side surface of the eighth lens element and an optical axis is Yc82, the following conditions are satisfied:

$Td/f<2.0$; and $0.10<Yc82/f<0.80$.

According to another aspect of the present disclosure, an image capturing unit includes the aforementioned photographing optical lens system and an image sensor, wherein the image sensor is disposed on the image side of the photographing optical lens system.

According to still another aspect of the present disclosure, an electronic device includes the aforementioned image capturing unit.

According to still yet another aspect of present disclosure, a photographing optical lens system includes, in order from an object side to an image side, a first lens element, a second lens element, a third lens element, a fourth lens element, a fifth lens element, a sixth lens element, a seventh lens element and an eighth lens element. The second lens element has positive refractive power. The eighth lens element has an object-side surface being convex in a paraxial region thereof and an image-side being concave in the paraxial region thereof, wherein the image-side surface of the eighth lens element has at least one convex shape in an off-axis region thereof, and both the object-side surface and the image-side surface of the eighth lens element are aspheric. The photographing optical lens system has a total of eight lens elements. There is an air gap in a paraxial region between every two of the lens elements that are adjacent to each other. When an axial distance between an object-side surface of the first lens element and an image surface is TL, a maximum image height of the photographing optical lens system is ImgH, the following condition is satisfied:

$TL/ImgH<2.0$.

According to still yet another aspect of present disclosure, a photographing optical lens system includes, in order from an object side to an image side, a first lens element, a second lens element, a third lens element, a fourth lens element, a fifth lens element, a sixth lens element, a seventh lens element and an eighth lens element. The second lens element has positive refractive power. The eighth lens element has an image-side surface being concave in a paraxial region thereof, wherein the image-side surface of the eighth lens element has at least one convex shape in an off-axis region thereof, and both an object-side surface and the image-side surface of the eighth lens element are aspheric. The photographing optical lens system has a total of eight lens elements. There is an air gap in a paraxial region between every two of the lens elements that are adjacent to each other. When a curvature radius of the image-side surface of the eighth lens element is R16, a focal length of the photographing optical lens system is f, a maximum effective radius of an object-side surface of the first lens element is Y11, a maximum effective radius of the image-side surface of the eighth lens element is Y82, the following conditions are satisfied:

$0.10 < R16/f < 1.0$; and $Y11/Y82 < 1.25$.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
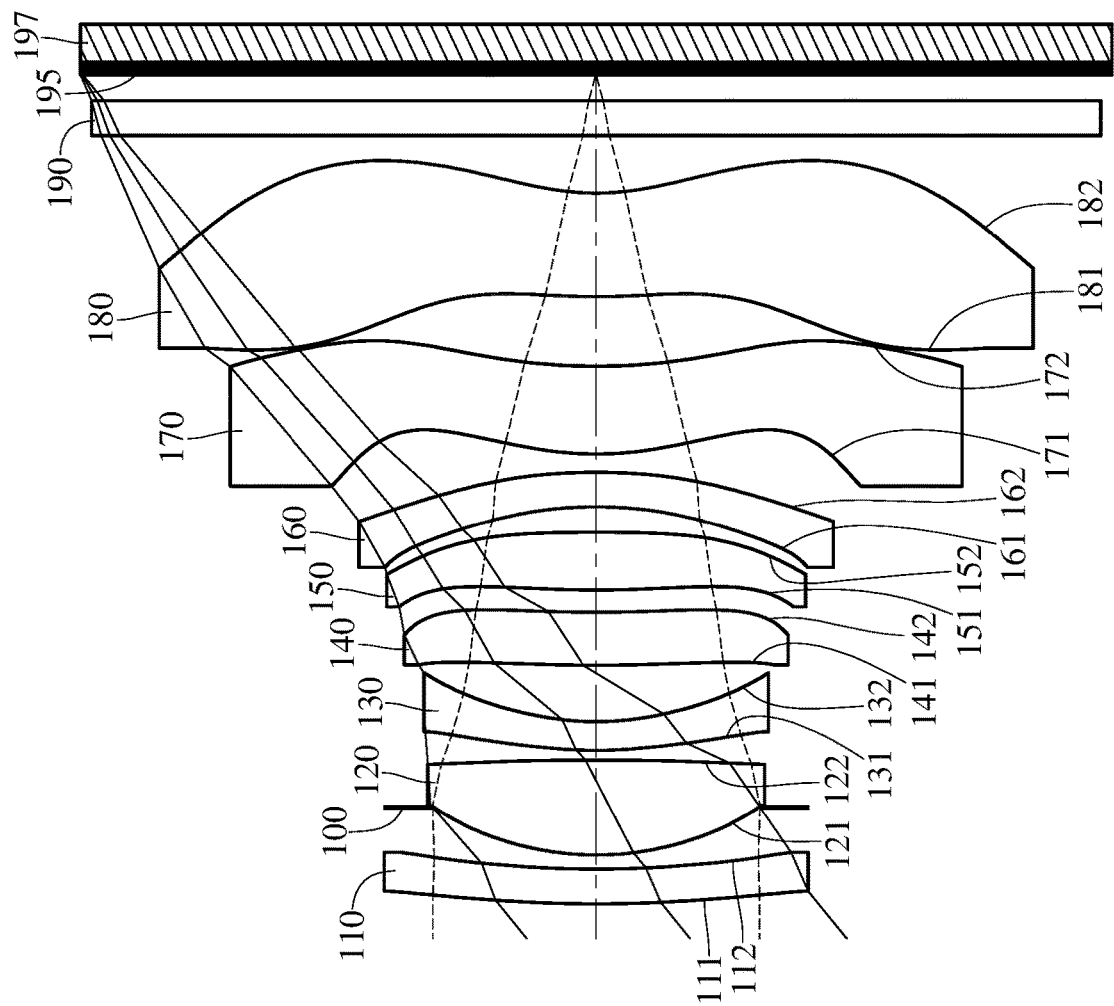
FIG. 1 is a schematic view of an image capturing unit according to the 1st embodiment of the present disclosure.

A photographing optical lens system includes, in order from an object side to an image side, a first lens element, a second lens element, a third lens element, a fourth lens element, a fifth lens element, a sixth lens element, a seventh lens element and an eighth lens element. The photographing optical lens system has a total of eight lens elements.

According to the photographing optical lens system of the present disclosure, there is an air gap in a paraxial region arranged between every two of the first lens element, the second lens element, the third lens element, the fourth lens element, the fifth lens element, the sixth lens element, the seventh lens element and the eighth lens element that are adjacent to each other, that is, each of the first through eighth lens elements of the photographing optical lens system is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there is an air gap in a paraxial region between every two of the lens elements of the photographing optical lens system that are adjacent to each other in the present disclosure for solving the problem generated by the cemented lens elements.

The first lens element can have positive refractive power. The first lens element can have an object-side surface being convex in a paraxial region thereof. Therefore, it is favorable for reducing a back focal length of the photographing optical lens system.

The second lens element has positive refractive power. Therefore, it is favorable for arranging the lens element having strong refractive power near the middle section of the photographing optical lens system so as to prevent the lens element with strong refractive power having excessive curvature, and thereby preventing the molding problems.

Each of the third lens element, the fourth lens element, the fifth lens element and the sixth lens element can have positive or negative refractive power. Therefore, the refractive power distribution of the photographing optical lens system is proper so that it is favorable for correcting the aberration and enlarging the field of view.

The seventh lens element can have positive refractive power. The seventh lens element can have an image-side surface being concave in a paraxial region thereof. Therefore, it is favorable with the principal point being positioned away from the image side of the photographing optical lens system for reducing the back focal length, and thereby maintaining a compact size thereof. In some embodiments, the image-side surface of the seventh lens element can be convex in a paraxial region thereof for correcting the aberration.

The eighth lens element can have positive refractive power or negative refractive power. The eighth lens element can have an object-side surface being convex in a paraxial region thereof and an image-side surface being concave in a paraxial region thereof. The image-side surface of the eighth lens element has at least one convex shape in an off-axis region thereof. Therefore, it is favorable for reducing a total track length of the photographing optical lens system and correcting the aberration. Furthermore, it is favorable for reducing the incident angle of the light projecting onto the image sensor so as to improve the image-sensing efficiency of the image sensor, and thereby correcting the aberration of the off-axis field.

When an axial distance between the object-side surface of the first lens element and the image-side surface of the eighth lens element is Td, a focal length of the photographing optical lens system is f, the following condition is satisfied: Td/f<2.0. Therefore, it is favorable for tightly arranging the lens elements so as to reduce the total track length of the photographing optical lens system. Preferably, the following condition can also be satisfied: Td/f<1.50.

Figure 25:
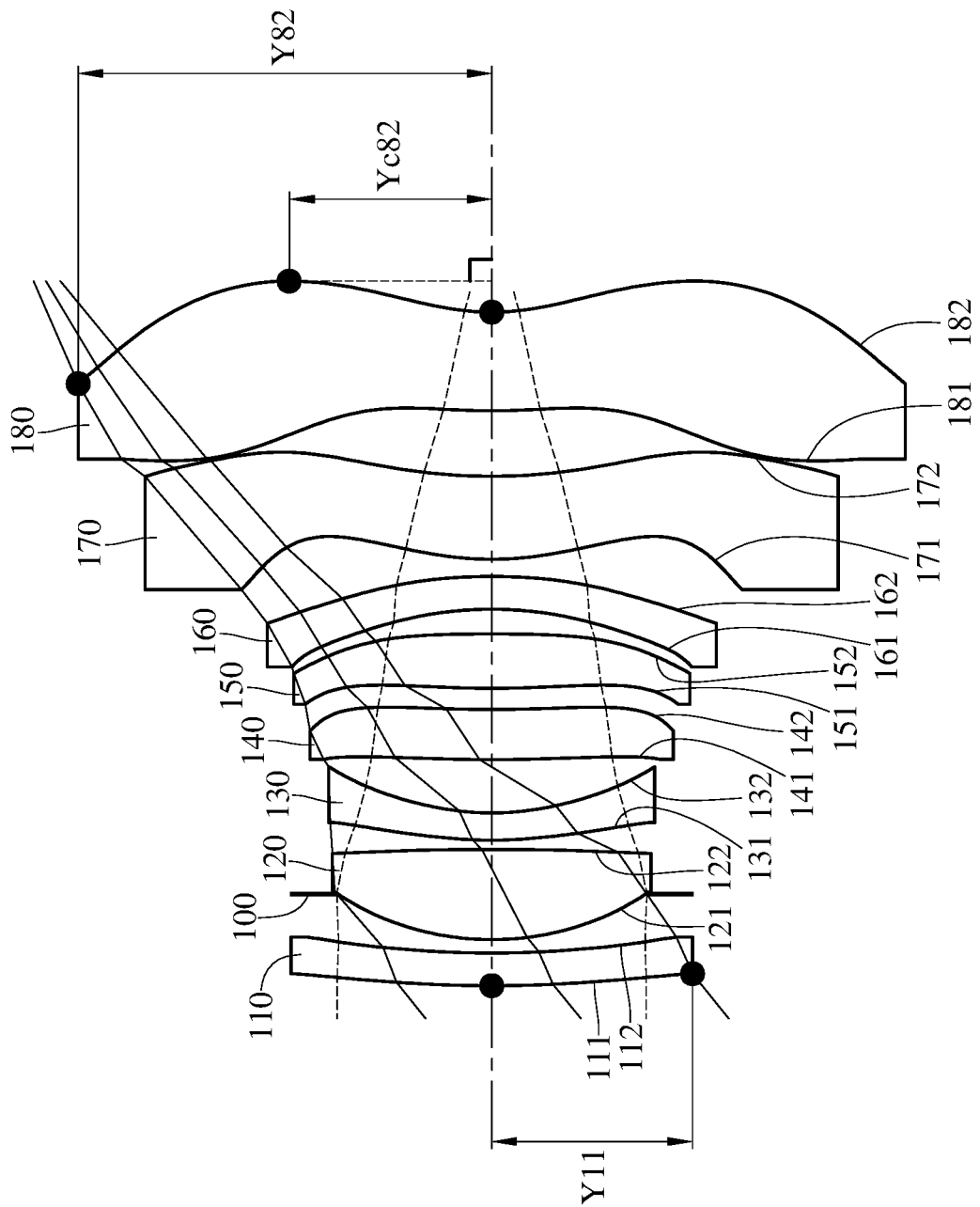
FIG. 25 is a schematic view of a maximum effective radius of an object-side surface of a first lens element, a maximum effective radius of an image-side surface of an eighth lens element and a vertical distance between a non-axial critical point on the image-side surface of the eighth lens element and an optical axis in FIG. 1.

When a vertical distance between a non-axial critical point on the image-side surface of the eighth lens element and an optical axis is Yc82, the focal length of the photographing optical lens system is f, the following condition is satisfied: 0.10<Yc82/f<0.80. Therefore, it is favorable for correcting the aberration and increasing the relative illumination so as to improve the image resolution at the off-axis region. Please refer to FIG. 25, which shows a schematic view of a vertical distance between a non-axial critical point on an image-side surface of an eighth lens element and an optical axis in FIG. 1. A non-axial critical point is not located on the optical axis and its tangent is perpendicular to the optical axis.

When an axial distance between the object-side surface of the first lens element and an image surface is TL, a maximum image height of the photographing optical lens system (half of a diagonal length of an effective photosensitive area of the image sensor) is ImgH, the following conditions is satisfied: TL/ImgH<3.0. Therefore, the photographing optical lens system favorably satisfies the requirement of compact size and large image surface so as to be applied to an electronic device having high resolution. Preferably, the following condition can also be satisfied: TL/ImgH<2.0. More preferably, the following condition can also be satisfied: TL/ImgH<1.75.

When a curvature radius of the image-side surface of the eighth lens element is R16, the focal length of the photographing optical lens system is f, the following condition is satisfied: 0.10<R16/f<1.0. Thus, it is favorable with the rear principal point being positioned close to the object side of the photographing optical lens system for reducing the back focal length of the photographing optical lens system. When a maximum effective radius of the object-side surface of the first lens element is Y11, a maximum effective radius of the image-side surface of the eighth lens element is Y82, the following condition can be satisfied: Y11/Y82<1.25. Therefore, it is favorable for properly arranging the lens elements so as to keep the photographing optical lens system compact. Preferably, the following condition can also be satisfied: Y11/Y82<1.0. More preferably, the following condition can also be satisfied: Y11/Y82<0.75. Please refer to FIG. 25, which shows a schematic view of a maximum effective radius of an object-side surface of a first lens element and a maximum effective radius of an image-side surface of an eighth lens element in FIG. 1.

According to the present disclosure, the photographing optical lens system further includes a stop. When an axial distance between the stop and the image-side surface of the eighth lens element is Sd, the axial distance between the object-side surface of the first lens element and the image-side surface of the eighth lens element is Td, the following conditions can be satisfied: 0.70<Sd/Td<1.20. Therefore, it is favorable for balancing the total track length and the view angle characteristics.

When a sum of central thicknesses of all lens elements of the photographing optical lens system is ΣCT (that is, a sum of central thicknesses of the first lens element, the second lens element, the third lens element, the fourth lens element, the fifth lens element, the sixth lens element, the seventh lens element and the eighth lens element), an axial distance between the image-side surface of the eighth lens element and the image surface is BL, the following condition can be satisfied: 1.5<ΣCT/BL. Therefore, it is favorable for further reducing the back focal length of the photographing optical lens system. Preferably, the following condition can also be satisfied: 2.0<ΣCT/BL<10. More preferably, the following condition can also be satisfied: 2.5<ΣCT/BL<6.5. Much more preferably, the following condition can also be satisfied: 2.5<ΣCT/BL<6.0.

When a focal length of the first lens element is f1, a focal length of the second lens element is f2, the following condition can be satisfied: −0.25<f2/f1<1.25. Therefore, it is favorable for preventing the refractive power distribution from overloading at the object-side so as to reduce the sensitivity of the photographing optical lens system.

When the focal length of the photographing optical lens system is f, a composite focal length of the first lens element, the second lens element and the third lens element is f123, the following condition can be satisfied: 0.30<f/f123<1.5. Therefore, it is favorable for properly arranging the refractive power distribution of the first lens element, the second lens element and the third lens element so as to improve the chromatic aberration correction capability.

When a focal length of the second lens element is f2, a focal length of the seventh lens element is f7, the following condition can be satisfied: 1.0<|f7/f2|. Therefore, it is favorable for effectively correcting the aberration with a large aperture configuration.

When the focal length of the second lens element is f2, the focal length of the seventh lens element is f7, the following condition can be satisfied: |f7/f2|<1.0. Therefore, the refractive power of the seventh lens element is favorable for reducing the total length of the photographing optical lens system.

When a curvature radius of the object-side surface of the eighth lens element is R15, the curvature radius of the image-side surface of the eighth lens element is R16, the following condition can be satisfied: −0.50<(R15+R16)/(R15−R16). Therefore, the curvature radii of the object-side surface and the image-side surface of the eighth lens element are proper for correcting the astigmatism.

According to the present disclosure, each of the first lens element, the second lens element, the third lens element, the fourth lens element, the fifth lens element, the sixth lens element and the seventh lens element can have at least one inflection point. In detail, at least one of the object-side surface and the image-side surface of each of the lens elements can have at least one inflection point. Therefore, it is favorable for correcting the aberration of the off axis field.

When the focal length of the photographing optical lens system is f, a composite focal length of the fourth lens element, the fifth lens element and the sixth lens element is f456, the following condition can be satisfied: If/f456I<0.60. Therefore, the refractive power distribution of the fourth lens element, the fifth lens element and the sixth lens element are favorable for eliminating the stray light.

When the maximum image height of the photographing optical lens system is ImgH, the focal length of the photographing optical lens system is f, the following condition can be satisfied: 0.65<ImgH/f<1.40. Therefore, it is favorable for enlarging the field of view. Preferably, the following condition can also be satisfied: 0.70<ImgH/f<1.30.

When the axial distance between the object-side surface of the first lens element and the image-side surface of the eighth lens element is Td, an entrance pupil diameter of the photographing optical lens system is EPD, the following condition can be satisfied: Td/EPD<3.0. Therefore, it is favorable for the photographing optical lens system obtaining the characteristics of compactness and a large aperture.

According to the present disclosure, an aperture stop can be configured as a front stop or a middle stop. A front stop disposed between an imaged object and the first lens element can produce a telecentric effect by providing a longer distance between an exit pupil and the image surface and thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the photographing optical lens system can be made of glass or plastic material. When the lens elements are made of glass material, the refractive power distribution of the photographing optical lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens system, based on the corresponding image sensor, can be flat or curved, especially a curved surface being concave facing towards the object side of the photographing optical lens system.

According to the present disclosure, the photographing optical lens system can include at least one stop, such as an aperture stop, a glare stop or a field stop. Said glare stop or said field stop is allocated for eliminating the stray light and thereby improving the image quality thereof.

According to the present disclosure, an image capturing unit is provided. The image capturing unit includes the aforementioned photographing optical lens system of the present disclosure and an image sensor, wherein the image sensor is disposed on the image side of the aforementioned photographing optical lens system, that is, the image sensor can be disposed on or near an image surface of the aforementioned photographing optical lens system. In some embodiments, the image capturing unit can further include a barrel member, a holding member or a combination thereof.

Figure 27:
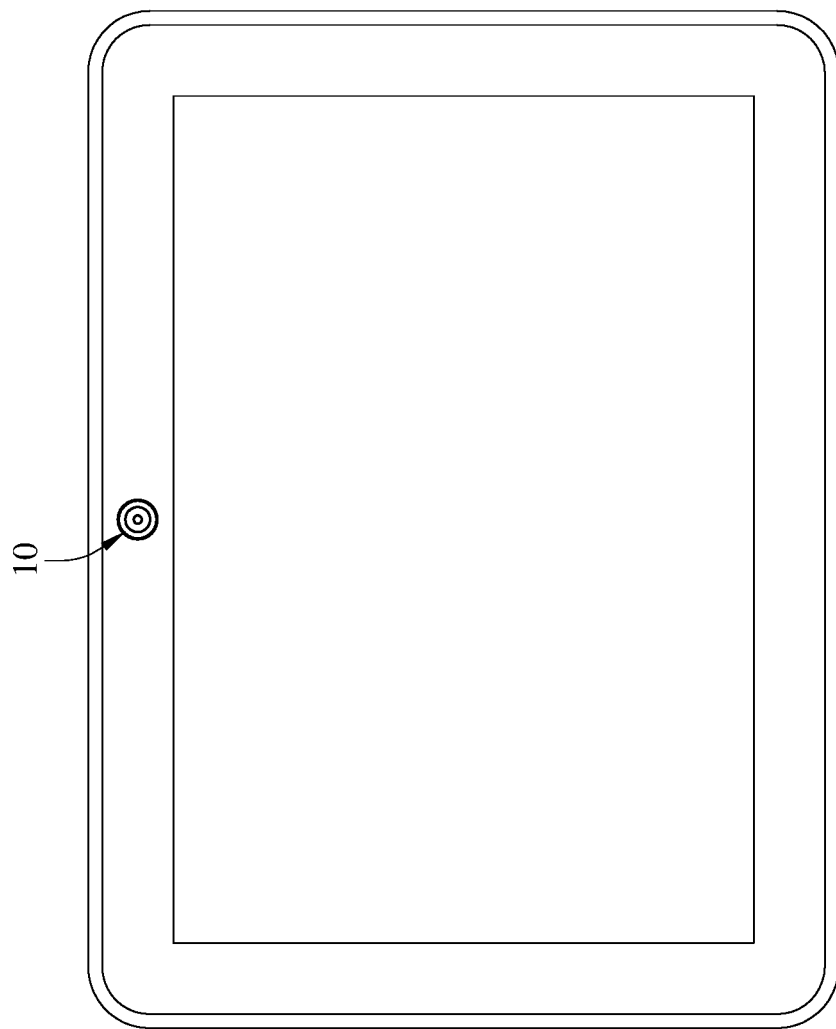
FIG. 27 shows an electronic device according to another embodiment.
Figure 26:
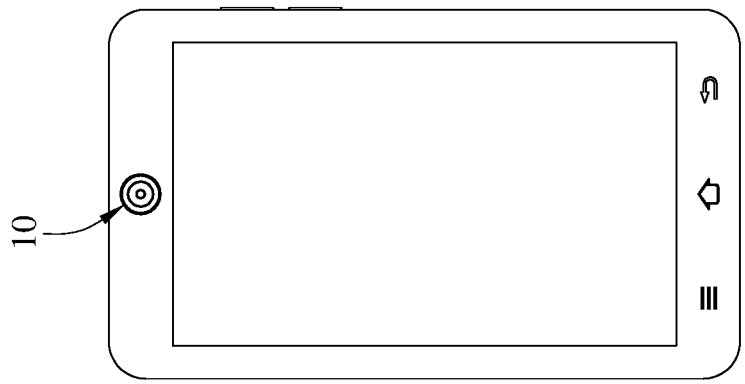
FIG. 26 shows an electronic device according to one embodiment.
Figure 28:
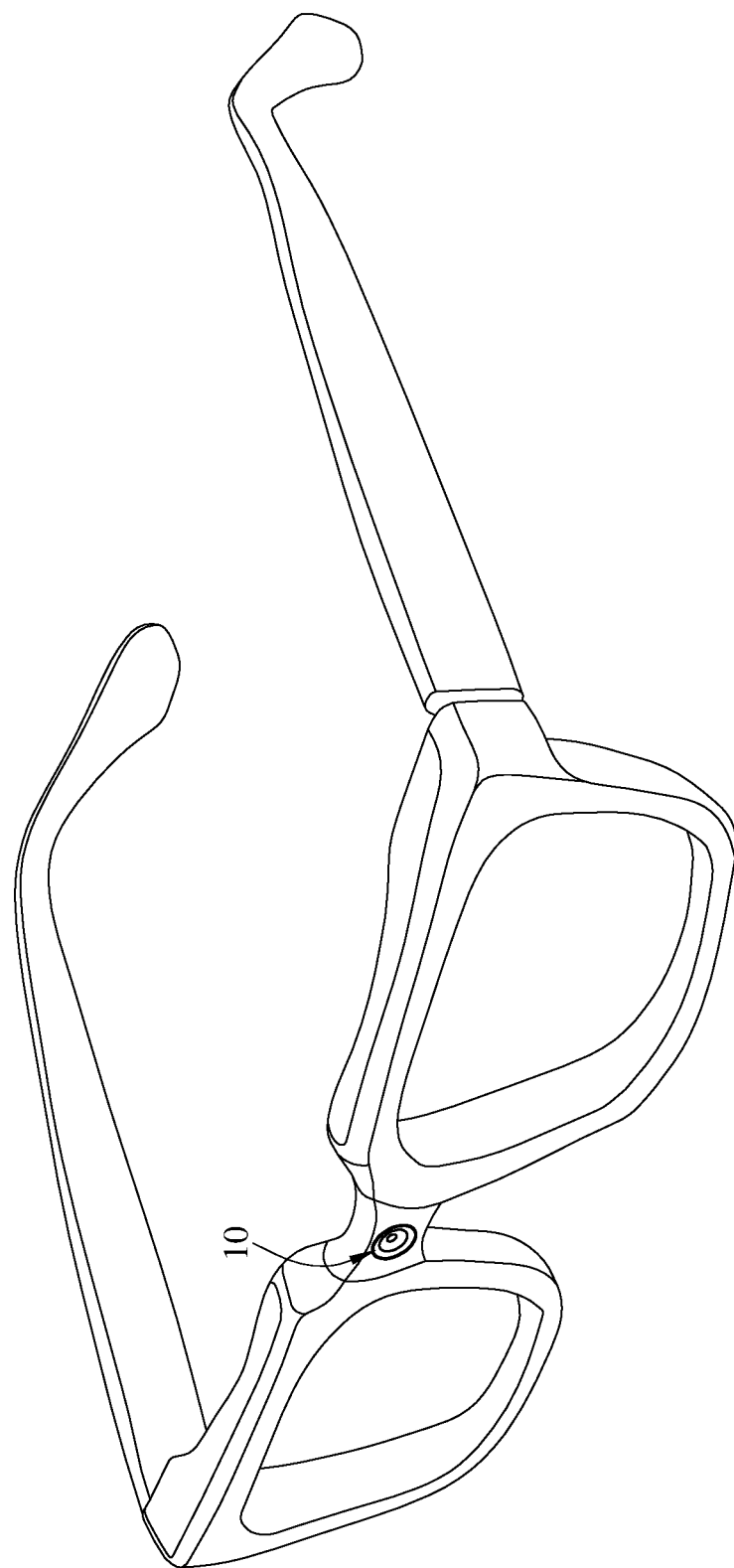
FIG. 28 shows an electronic device according to still another embodiment.

In FIG. 26, FIG. 27, and FIG. 28, an image capturing unit 10 may be installed in, but not limited to, an electronic device, including a smart phone (FIG. 26), a tablet personal computer (FIG. 27) or a wearable device (FIG. 28). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing optical lens system can be optionally applied to optical systems with a movable focus. Furthermore, the photographing optical lens system is featured with good capability in the aberration correction and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
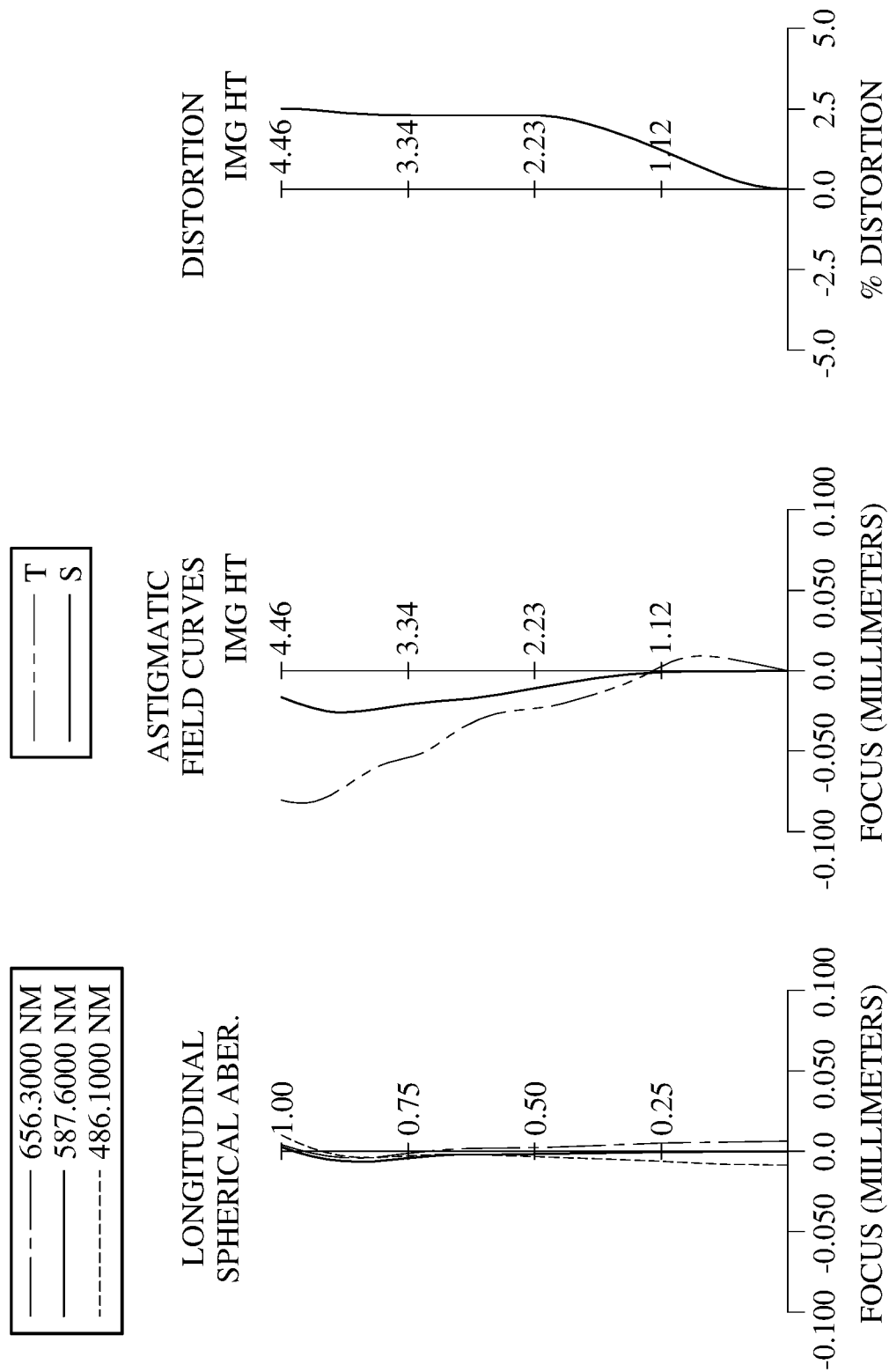
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens system (its reference numeral is omitted) of the present disclosure and an image sensor 197. The photographing optical lens system includes, in order from an object side to an image side, a first lens element 110, an aperture stop 100, a second lens element 120, a third lens element 130, a fourth lens element 140, a fifth lens element 150, a sixth lens element 160, a seventh lens element 170, an eighth lens element 180, an IR-cut filter 190 and an image surface 195, wherein the image sensor 197 is disposed on or near the image surface 195 of the photographing optical lens system, and the photographing optical lens system has a total of eight lens elements (110-180). There is an air gap in a paraxial region between every two of the lens elements that are adjacent to each other.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. Both the object-side surface 111 and the image-side surface 112 of the first lens element 110 have at least one inflection point.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. The image-side surface 122 of the second lens element 120 has at least one inflection point.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has at least one inflection point.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. Both the object-side surface 141 and the image-side surface 142 of the fourth lens element 140 have at least one inflection point.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point.

The sixth lens element 160 with negative refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The image-side surface 162 of the sixth lens element 160 has at least one inflection point.

The seventh lens element 170 with positive refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. Both the object-side surface 171 and the image-side surface 172 of the seventh lens element 170 have at least one inflection point.

The eighth lens element 180 with negative refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has at least one inflection point. The image-side surface 182 has at least one convex shape in an off-axis region thereof.

The IR-cut filter 190 is made of glass and located between the eighth lens element 180 and the image surface 195, and will not affect the focal length of the photographing optical lens system.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens system of the image capturing unit according to the 1st embodiment, when a focal length of the photographing optical lens system is f, an f-number of the photographing optical lens system is Fno, and half of a maximal field of view of the photographing optical lens system is HFOV, these parameters have the following values: f=5.38 millimeters (mm); Fno=1.90; and HFOV=39.0 degrees (deg.).

When a sum of central thicknesses of all lens elements of the photographing optical lens system is ΣCT, an axial distance between the image-side surface 182 of the eighth lens element 180 and the image surface 195 is BL, the following condition is satisfied: ΣCT/BL=4.19.

When an axial distance between the stop 100 and the image-side surface 182 of the eighth lens element 180 is Sd, an axial distance between the object-side surface 111 of the first lens element 110 and the image-side surface 182 of the eighth lens element 180 is Td, the following condition is satisfied: Sd/Td=0.86.

When the axial distance between the object-side surface 111 of the first lens element 110 and the image-side surface 182 of the eighth lens element 180 is Td, the focal length of the photographing optical lens system is f, the following condition is satisfied: Td/f=1.15.

When the axial distance between the object-side surface 111 of the first lens element 110 and the image-side surface 182 of the eighth lens element 180 is Td, an entrance pupil diameter of the photographing optical lens system is EPD, the following condition is satisfied: Td/EPD=2.18.

When an axial distance between the object-side surface 111 of the first lens element 110 and the image surface 195 is TL, a maximum image height of the photographing optical lens system is ImgH, the following condition is satisfied: TL/ImgH=1.61.

When the maximum image height of the photographing optical lens system is ImgH, the focal length of the photographing optical lens system is f, the following condition is satisfied: ImgH/f=0.83.

When a maximum effective radius of the object-side surface 111 of the first lens element 110 is Y11, a maximum effective radius of the image-side surface 182 of the eighth lens element 180 is Y82, the following condition is satisfied: Y11/Y82=0.49.

When a vertical distance between a non-axial critical point on the image-side surface 182 of the eighth lens element 180 and an optical axis is Yc82, the focal length of the photographing optical lens system is f, the following condition is satisfied: Yc82/f=0.34.

When a curvature radius of the object-side surface 181 of the eighth lens element 180 is R15, a curvature radius of the image-side surface 182 of the eighth lens element 180 is R16, the following condition is satisfied: (R15+R16)/(R15−R16)=2.26.

When the curvature radius of the image-side surface 182 of the eighth lens element 180 is R16, the focal length of the photographing optical lens system is f, the following condition is satisfied: R16/f=0.39.

When a focal length of the first lens element 110 is f1, a focal length of the second lens element 120 is f2, the following condition is satisfied: f2/f1=−0.06.

When the focal length of the second lens element 120 is f2, a focal length of the seventh lens element 170 is f7, the following condition is satisfied: |f7/f2|=2.25.

When the focal length of the photographing optical lens system is f, a composite focal length of the first lens element 110, the second lens element 120 and the third lens element 130 is f123, the following condition is satisfied: f/f123=0.72.

When the focal length of the photographing optical lens system is f, a composite focal length of the fourth lens element 140, the fifth lens element 150 and the sixth lens element 160 is f456, the following condition is satisfied: |f/f456|=0.04.

The detailed optical data of the 1st embodiment are shown in Table 1 and the aspheric surface data are shown in Table 2 below.

TABLE 1

1st Embodiment
f = 5.38 mm, Fno = 1.90, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.963 | (ASP) | 0.300 | Plastic | 1.639 | 23.5 | −79.40 |
| 2 | | 8.918 | (ASP) | 0.541 | | | | |
| 3 | Ape. Stop | Plano | | −0.418 | | | | |
| 4 | Lens 2 | 2.600 | (ASP) | 0.826 | Plastic | 1.544 | 55.9 | 4.65 |
| 5 | | −82.275 | (ASP) | 0.085 | | | | |
| 6 | Lens 3 | 3.639 | (ASP) | 0.250 | Plastic | 1.639 | 23.5 | −11.46 |
| 7 | | 2.366 | (ASP) | 0.489 | | | | |
| 8 | Lens 4 | 14.087 | (ASP) | 0.460 | Plastic | 1.544 | 55.9 | −172.22 |
| 9 | | 12.104 | (ASP) | 0.194 | | | | |
| 10 | Lens 5 | 9.630 | (ASP) | 0.498 | Plastic | 1.544 | 55.9 | 13.06 |
| 11 | | −26.566 | (ASP) | 0.227 | | | | |
| 12 | Lens 6 | −3.441 | (ASP) | 0.300 | Plastic | 1.639 | 23.5 | −15.65 |
| 13 | | −5.426 | (ASP) | 0.158 | | | | |
| 14 | Lens 7 | 2.922 | (ASP) | 0.761 | Plastic | 1.544 | 55.9 | 10.48 |
| 15 | | 5.447 | (ASP) | 0.600 | | | | |
| 16 | Lens 8 | 5.483 | (ASP) | 0.904 | Plastic | 1.530 | 55.8 | −7.18 |
| 17 | | 2.119 | (ASP) | 0.500 | | | | |
| 18 | IR-cut filter | Plano | | 0.300 | Glass | 1.517 | 64.2 | — |
| 19 | | Plano | | 0.225 | | | | |
| 20 | Image | Plano | | — | | | | |

Note:
Reference wavelength is 587.6 nm (d-line).

TABLE 2

Aspheric Coefficients

| Surface # | 1 | 2 | 4 | 5 | 6 | 7 |
|---|---|---|---|---|---|---|
| k = | −3.5953E−08 | −1.1485E−09 | 6.3990E−02 | 8.9709E+01 | −1.9293E+01 | −1.2082E+01 |
| A4 = | −3.8670E−03 | −4.7098E−03 | −2.6379E−03 | −3.4701E−02 | −4.1683E−02 | 4.0352E−02 |
| A6 = | −4.4128E−03 | −7.0466E−03 | −1.7924E−03 | 3.8498E−02 | 4.8140E−02 | −2.4297E−02 |
| A8 = | 5.8119E−03 | 1.2794E−02 | 3.2548E−03 | −2.3851E−02 | −2.5580E−02 | 2.3854E−02 |
| A10 = | −3.0365E−03 | −7.9666E−03 | −1.1513E−03 | 9.0654E−03 | 7.6022E−03 | −1.2011E−02 |
| A12 = | 8.4197E−04 | 2.6532E−03 | 2.2455E−04 | −1.7388E−03 | −1.4856E−03 | 2.7355E−03 |
| A14 = | −1.3055E−04 | −5.0003E−04 | −2.8077E−05 | 8.9087E−05 | 1.1375E−04 | −1.9952E−04 |
| A16 = | 8.9849E−06 | 4.1833E−05 | — | — | — | — |

| Surface # | 8 | 9 | 10 | 11 | 12 | 13 |
|---|---|---|---|---|---|---|
| k = | −9.0000E+01 | −8.6566E+01 | −8.8998E+01 | 9.0000E+01 | 7.5382E−01 | −3.6587E+00 |
| A4 = | −7.6064E−03 | −1.0595E−02 | −9.8981E−03 | −4.5790E−02 | −1.1355E−02 | −2.9572E−02 |
| A6 = | −1.7187E−03 | −4.5402E−03 | −3.9092E−03 | 1.5441E−02 | 2.9125E−02 | 1.7968E−02 |
| A8 = | 1.3999E−03 | −1.3714E−04 | −8.2144E−04 | −5.2708E−03 | −2.0810E−02 | −7.5162E−03 |
| A10 = | −8.4247E−04 | −2.2027E−04 | −1.2447E−05 | −2.4647E−03 | 8.2603E−03 | 2.4541E−03 |
| A12 = | 2.4084E−04 | −1.4238E−04 | −8.5031E−06 | 2.6960E−03 | −1.5354E−03 | −4.7615E−04 |

TABLE 2-continued

| Aspheric Coefficients | | | | | |
|---|---|---|---|---|---|
| A14 = | −5.5180E−05 | — | — | −7.6310E−04 | 8.0269E−05 | 3.7487E−05 |
| A16 = | — | — | — | 7.1821E−05 | — | — |

| Surface # | 14 | 15 | 16 | 17 |
|---|---|---|---|---|
| k = | −6.2967E+00 | −3.2987E+01 | −1.7763E−01 | −1.4446E+00 |
| A4 = | −5.5453E−03 | 2.9770E−02 | −9.1756E−02 | −7.8738E−02 |
| A6 = | −5.2382E−03 | −1.3832E−02 | 1.7425E−02 | 2.0511E−02 |
| A8 = | −3.4590E−04 | 2.1223E−03 | −1.1433E−03 | −3.9552E−03 |
| A10 = | 6.6278E−05 | −1.6047E−04 | −3.4758E−05 | 4.8899E−04 |
| A12 = | −1.7729E−05 | 8.1785E−06 | 9.2161E−06 | −3.6173E−05 |
| A14 = | 3.7807E−06 | −4.3265E−07 | −4.8622E−07 | 1.4490E−06 |
| A16 = | — | 1.4130E−08 | 8.6531E−09 | −2.4047E−08 |

In Table 1, the curvature radius, the thickness and the focal length are shown in millimeters (mm). Surface numbers 0-20 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
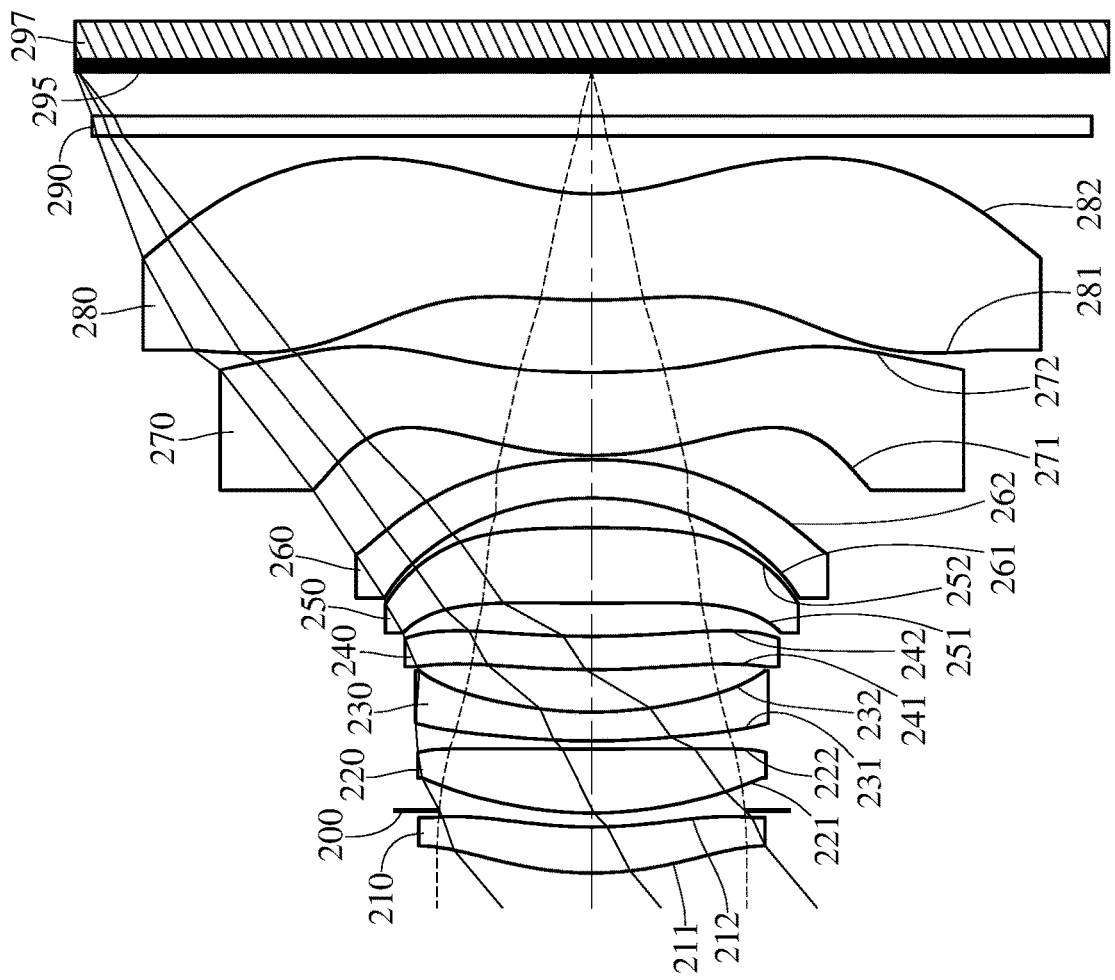
FIG. 3 is a schematic view of an image capturing unit according to the 2nd embodiment of the present disclosure.
Figure 4:
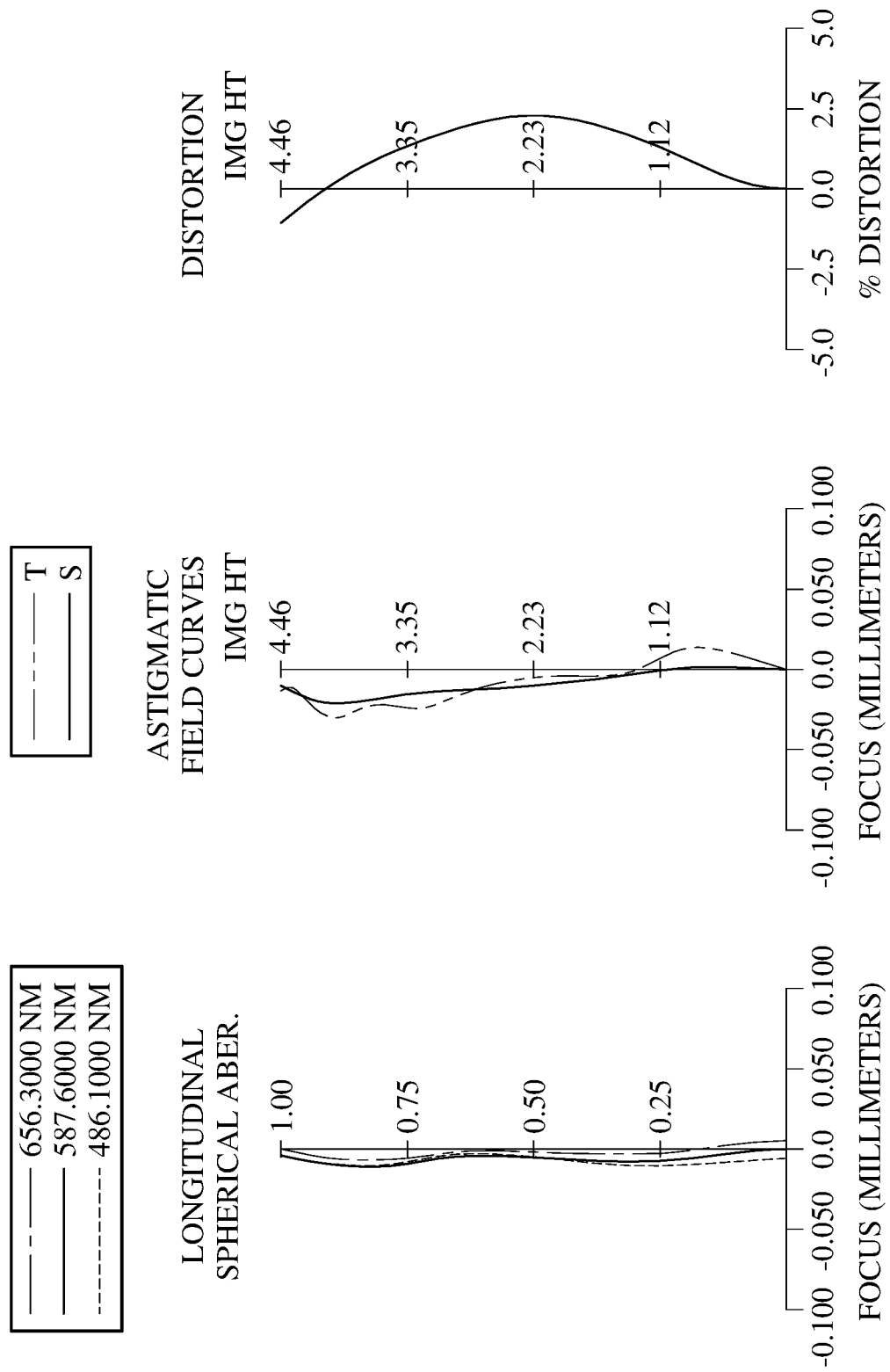
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens system (its reference numeral is omitted) of the present disclosure and an image sensor 297. The photographing optical lens system includes, in order from an object side to an image side, a first lens element 210, an aperture stop 200, a second lens element 220, a third lens element 230, a fourth lens element 240, a fifth lens element 250, a sixth lens element 260, a seventh lens element 270, an eighth lens element 280, an IR-cut filter 290 and an image surface 295, wherein the image sensor 297 is disposed on or near the image surface 295 of the photographing optical lens system, the photographing optical lens system has a total of eight lens elements (210-280). There is an air gap in a paraxial region between every two of the lens elements that are adjacent to each other.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. Both the object-side surface 211 and the image-side surface 212 of the first lens element 210 have at least one inflection point.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. Both the object-side surface 221 and the image-side surface 222 of the second lens element 220 have at least one inflection point.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. Both the object-side surface 241 and the image-side surface 242 of the fourth lens element 240 have at least one inflection point.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point.

The sixth lens element 260 with negative refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The image-side surface 262 of the sixth lens element 260 has at least one inflection point.

The seventh lens element 270 with positive refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. Both the object-side surface 271 and the image-side surface 272 of the seventh lens element 270 have at least one inflection point.

The eighth lens element 280 with negative refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The object-side surface 281 of the eighth lens element 280 has at least one inflection point. The image-side surface 282 of the eighth lens element 280 has at least one convex shape in an off-axis region thereof.

The IR-cut filter 290 is made of glass and located between the eighth lens element 280 and the image surface 295, and will not affect the focal length of the photographing optical lens system.

The detailed optical data of the 2nd embodiment are shown in Table 3 and the aspheric surface data are shown in Table 4 below.

TABLE 3

2nd Embodiment
f = 5.38 mm, Fno = 2.00, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.874 | (ASP) | 0.300 | Plastic | 1.544 | 55.9 | 16.96 |
| 2 | | 3.971 | (ASP) | 0.541 | | | | |
| 3 | Ape. Stop | Plano | | -0.418 | | | | |
| 4 | Lens 2 | 3.391 | (ASP) | 0.826 | Plastic | 1.544 | 55.9 | 6.77 |
| 5 | | 40.433 | (ASP) | 0.085 | | | | |
| 6 | Lens 3 | 5.937 | (ASP) | 0.250 | Plastic | 1.660 | 20.4 | -12.60 |
| 7 | | 3.406 | (ASP) | 0.489 | | | | |
| 8 | Lens 4 | 7.918 | (ASP) | 0.460 | Plastic | 1.544 | 55.9 | 509.07 |
| 9 | | 8.045 | (ASP) | 0.194 | | | | |
| 10 | Lens 5 | 27.927 | (ASP) | 0.498 | Plastic | 1.544 | 55.9 | 19.63 |
| 11 | | -17.133 | (ASP) | 0.227 | | | | |
| 12 | Lens 6 | -2.638 | (ASP) | 0.300 | Plastic | 1.660 | 20.4 | -14.88 |
| 13 | | -3.788 | (ASP) | 0.158 | | | | |
| 14 | Lens 7 | 2.893 | (ASP) | 0.761 | Plastic | 1.544 | 55.9 | 8.31 |
| 15 | | 7.339 | (ASP) | 0.600 | | | | |
| 16 | Lend 8 | 5.200 | (ASP) | 0.904 | Plastic | 1.544 | 55.9 | -7.19 |
| 17 | | 2.093 | (ASP) | 0.500 | | | | |
| 18 | IR-cut filter | Plano | | 0.300 | Glass | 1.517 | 64.2 | — |
| 19 | | Plano | | 0.225 | | | | |
| 20 | Image | Plano | | — | | | | |

Note:
Reference wavelength is 587.6 nm (d-line).

TABLE 4

Aspheric Coefficients

| Surface # | 1 | 2 | 4 | 5 | 6 | 7 |
|---|---|---|---|---|---|---|
| k = | -6.2378E+00 | -3.0429E+01 | -1.8685E+00 | 9.0000E+01 | -6.7413E+00 | -2.2149E+01 |
| A4 = | 1.5032E-02 | 1.9550E-02 | -1.1142E-02 | -2.8743E-02 | -4.7457E-02 | 3.7957E-02 |
| A6 = | -1.8459E-02 | -6.0905E-02 | 3.2918E-04 | 3.5858E-02 | 4.6517E-02 | -2.5062E-02 |
| A8 = | 1.0860E-02 | 5.8005E-02 | 4.0065E-03 | -2.3882E-02 | -2.4391E-02 | 2.2582E-02 |
| A10 = | -1.0753E-02 | -4.5363E-02 | -7.3922E-04 | 8.8385E-03 | 7.8459E-03 | -1.1240E-02 |
| A12 = | 5.3990E-03 | 2.3974E-02 | 3.5521E-04 | -1.8988E-03 | -1.4864E-03 | 3.1594E-03 |
| A14 = | -1.2816E-03 | -7.0627E-03 | -2.1132E-04 | 1.0296E-04 | 1.6228E-04 | -2.9926E-04 |
| A16 = | 1.2072E-04 | 8.6605E-04 | — | — | — | — |

| Surface # | 8 | 9 | 10 | 11 | 12 | 13 |
|---|---|---|---|---|---|---|
| k = | -1.9822E+01 | -1.9656E+01 | 7.0763E+01 | 8.3990E+01 | 5.9033E-01 | 1.2064E+00 |
| A4 = | -9.9833E-03 | -9.5904E-03 | -2.7377E-02 | -5.6151E-02 | -1.5690E-02 | -3.4432E-02 |
| A6 = | -5.1320E-03 | -4.1355E-03 | -1.4277E-02 | 1.3699E-02 | 2.5980E-02 | 1.8654E-02 |
| A8 = | 9.1576E-04 | -3.5469E-04 | -1.7257E-03 | -5.3174E-03 | -2.1117E-02 | -8.5968E-03 |
| A10 = | -7.9375E-04 | 2.1809E-05 | -8.1819E-05 | -2.5829E-03 | 8.3233E-03 | 2.9344E-03 |
| A12 = | 3.3899E-04 | -1.3680E-05 | -8.4208E-06 | 2.6606E-03 | -1.5044E-03 | -6.1702E-04 |
| A14 = | -3.1489E-05 | -1.9656E+01 | 7.0763E+01 | -7.6385E-04 | 8.5924E-05 | 5.7233E-05 |
| A16 = | — | — | — | 7.3491E-05 | — | — |

| Surface # | 14 | 15 | 16 | 17 |
|---|---|---|---|---|
| k = | -3.0170E+00 | -3.9053E-01 | -8.7342E-01 | -1.3555E+00 |
| A4 = | -1.4794E-02 | 2.8155E-02 | -8.4801E-02 | -7.5499E-02 |
| A6 = | -5.3234E-04 | -1.4189E-02 | 1.4328E-02 | 1.8239E-02 |
| A8 = | -1.5249E-03 | 2.1340E-03 | -6.4328E-04 | -3.2200E-03 |
| A10 = | 2.7166E-04 | -1.5897E-04 | -6.9541E-05 | 3.6791E-04 |
| A12 = | -2.9872E-05 | 8.2550E-06 | 9.9798E-06 | -2.5382E-05 |
| A14 = | 2.7367E-06 | -4.3289E-07 | -4.6390E-07 | 9.5420E-07 |
| A16 = | — | 1.3420E-08 | 7.7115E-09 | -1.4935E-08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.38 | Y11/Y82 | 0.39 |
| Fno | 2.00 | Yc82/f | 0.36 |
| HFOV [deg.] | 40.0 | (R15 + R16)/(R15 − R16) | 2.35 |
| ΣCT/BL | 3.88 | R16/f | 0.39 |
| Sd/Td | 0.91 | f2/f1 | 0.40 |
| Td/f | 1.10 | |f7/f2| | 1.23 |
| Td/EPD | 2.19 | f/f123 | 0.74 |
| TL/ImgH | 1.56 | |f/f456| | 0.08 |
| ImgH/f | 0.83 | | |

3rd Embodiment

Figure 5:
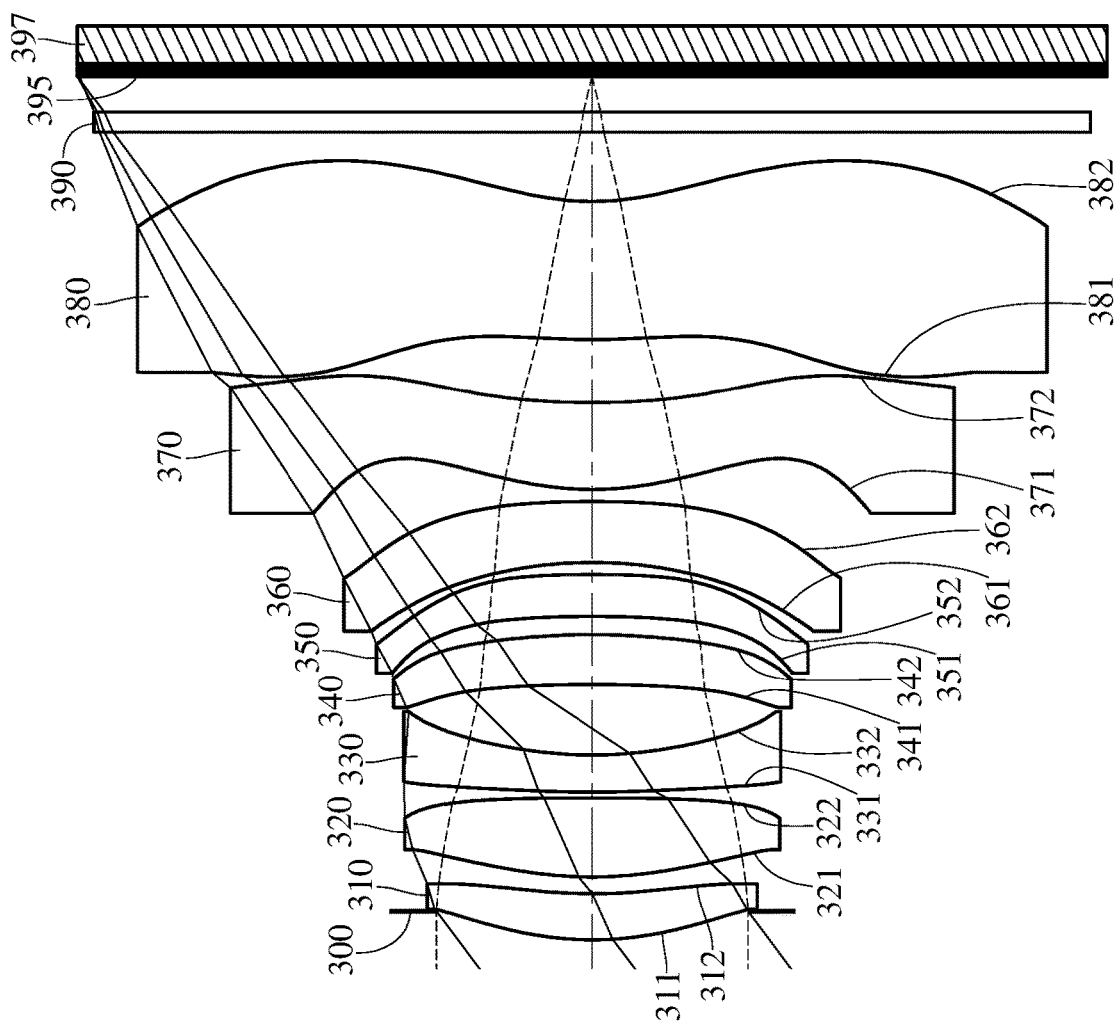
FIG. 5 is a schematic view of an image capturing unit according to the 3rd embodiment of the present disclosure.
Figure 6:
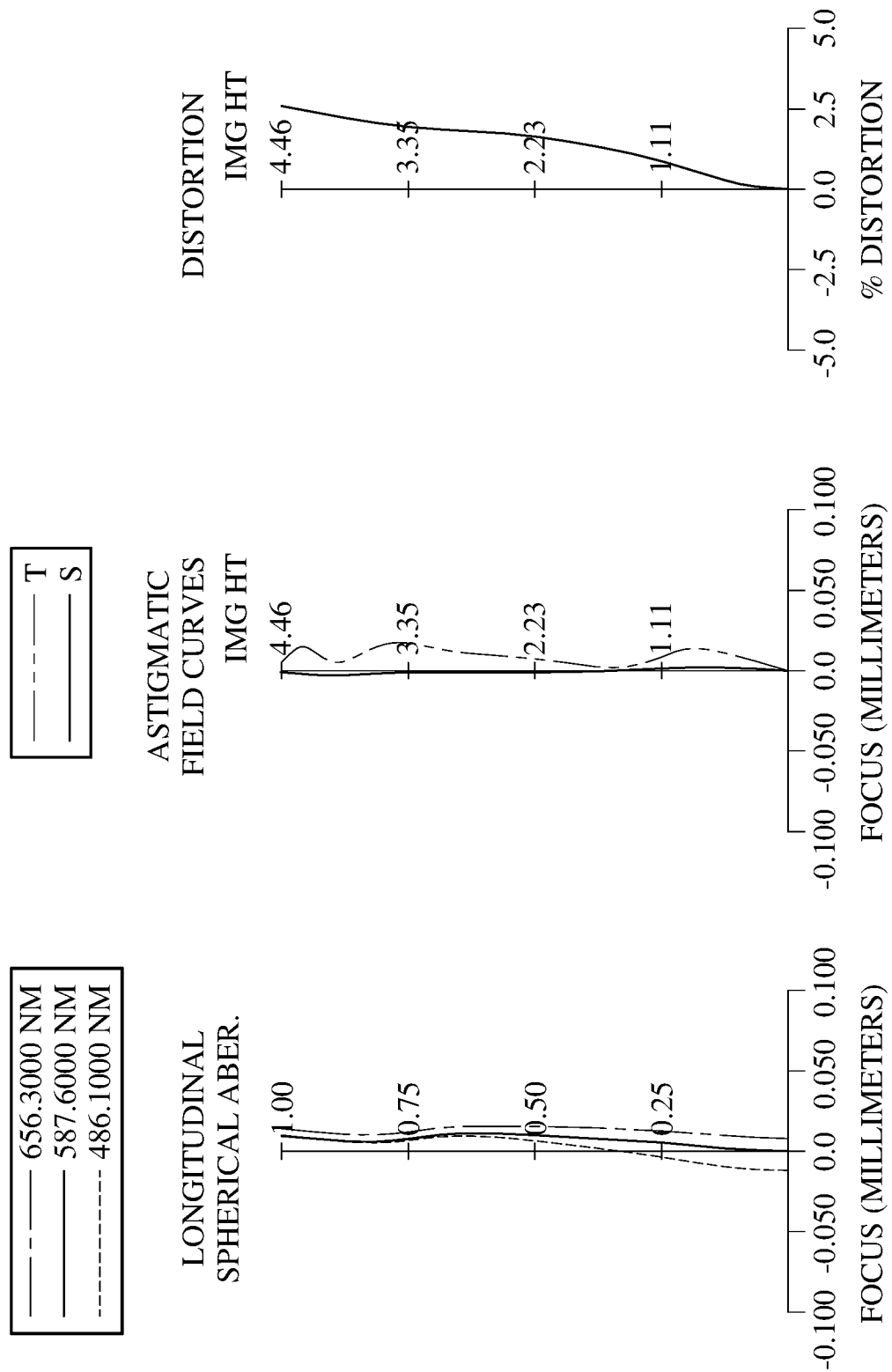
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens system (its reference numeral is omitted) of the present disclosure and an image sensor 397. The photographing optical lens system includes, in order from an object side to an image side, an aperture stop 300, a first lens element 310, a second lens element 320, a third lens element 330, a fourth lens element 340, a fifth lens element 350, a sixth lens element 360, a seventh lens element 370, an eighth lens element 380, an IR-cut filter 390 and an image surface 395, wherein the image sensor 397 is disposed on or near the image surface 395 of the photographing optical lens system, the photographing optical lens system has a total of eight lens elements (310-380). There is an air gap in a paraxial region between every two of the lens elements that are adjacent to each other.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. Both the object-side surface 311 and the image-side surface 312 of the first lens element 110 have at least one inflection point.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has at least one inflection point.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one inflection point.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The image-side surface 362 of the sixth lens element 360 has at least one inflection point.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. Both the object-side surface 371 and the image-side surface 372 of the seventh lens element 370 have at least one inflection point.

The eighth lens element 380 with negative refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has at least one inflection point. The image-side surface 382 of the eighth lens element 380 has at least one convex shape in an off-axis region thereof.

The IR-cut filter 390 is made of glass and located between the eighth lens element 380 and the image surface 395, and will not affect the focal length of the photographing optical lens system.

The detailed optical data of the 3rd embodiment are shown in Table 5 and the aspheric surface data are shown in Table 6 below.

TABLE 5

3rd Embodiment
f = 5.81 mm, Fno = 2.15, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.247 | | | | |
| 2 | Lens 1 | 2.912 | (ASP) | 0.300 | Plastic | 1.530 | 55.8 | 14.86 |
| 3 | | 4.400 | (ASP) | 0.541 | | | | |
| 4 | Lens 2 | 3.422 | (ASP) | 0.826 | Plastic | 1.530 | 55.8 | 6.28 |

TABLE 5-continued

3rd Embodiment
f = 5.81 mm, Fno = 2.15, HFOV = 36.8 deg.

| Surface # | | Curvature Radius | | Thickness | Material | Index | Abbe # | Focal Length |
|---|---|---|---|---|---|---|---|---|
| 5 | | −113.850 | (ASP) | 0.085 | | | | |
| 6 | Lens 3 | 8.606 | (ASP) | 0.250 | Plastic | 1.660 | 20.4 | −9.74 |
| 7 | | 3.625 | (ASP) | 0.489 | | | | |
| 8 | Lens 4 | −13.138 | (ASP) | 0.460 | Plastic | 1.544 | 56.0 | 19.71 |
| 9 | | −5.974 | (ASP) | 0.194 | | | | |
| 10 | Lens 5 | −12.541 | (ASP) | 0.498 | Plastic | 1.544 | 56.0 | −180.23 |
| 11 | | −14.526 | (ASP) | 0.227 | | | | |
| 12 | Lens 6 | −3.808 | (ASP) | 0.300 | Plastic | 1.544 | 56.0 | −10.65 |
| 13 | | −11.643 | (ASP) | 0.158 | | | | |
| 14 | Lens 7 | 2.754 | (ASP) | 0.761 | Plastic | 1.530 | 55.8 | 7.53 |
| 15 | | 8.042 | (ASP) | 0.600 | | | | |
| 16 | Lens 8 | 6.279 | (ASP) | 0.904 | Plastic | 1.530 | 55.8 | −7.50 |
| 17 | | 2.273 | (ASP) | 0.500 | | | | |
| 18 | IR-cut filter | Plano | | 0.175 | Glass | 1.517 | 64.2 | — |
| 19 | | Plano | | 0.313 | | | | |
| 20 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | −4.1921E+00 | −3.0253E+01 | −4.5200E+00 | −1.0000E+00 | −7.4008E+00 | −2.4258E+01 |
| A4 = | 7.4694E−03 | 1.7245E−03 | −1.6970E−02 | −3.6869E−02 | −4.8839E−02 | 3.7129E−02 |
| A6 = | −7.8799E−05 | −3.0815E−02 | −1.4320E−03 | 3.4174E−02 | 4.5424E−02 | −2.6022E−02 |
| A8 = | −1.0297E−02 | 2.8194E−02 | 3.5310E−03 | −2.3745E−02 | −2.4591E−02 | 2.1999E−02 |
| A10 = | 1.1083E−02 | −1.8658E−02 | −7.4065E−04 | 8.9068E−03 | 7.8526E−03 | −1.1194E−02 |
| A12 = | −7.2497E−03 | 8.3721E−03 | 4.2585E−04 | −1.8950E−03 | −1.4646E−03 | 3.1955E−03 |
| A14 = | 2.4290E−03 | −2.1611E−03 | −1.9798E−04 | 1.2928E−04 | 1.4646E−04 | −3.4153E−04 |
| A16 = | −3.2328E−04 | 2.3100E−04 | — | — | — | — |

| Surface # | 8 | 9 | 10 | 11 | 12 | 13 |
|---|---|---|---|---|---|---|
| k = | −6.8928E+01 | −2.9997E+01 | −1.0000E+00 | 5.5771E+01 | 7.3103E−01 | 1.3091E+01 |
| A4 = | −5.2816E−03 | 3.6509E−04 | −2.8328E−02 | −6.7026E−02 | −9.7606E−03 | −4.2745E−02 |
| A6 = | −7.0547E−03 | −4.9043E−03 | −8.8969E−04 | 1.6647E−02 | 2.3433E−02 | 1.8348E−02 |
| A8 = | 4.8819E−04 | −1.3828E−03 | −8.6456E−04 | −4.5576E−03 | −2.1493E−02 | −7.5822E−03 |
| A10 = | −7.9619E−04 | −1.1801E−04 | 1.1247E−04 | −2.4623E−03 | 8.3459E−03 | 1.5933E−03 |
| A12 = | 3.4828E−04 | 6.8011E−05 | −7.1602E−05 | 2.6821E−03 | −1.4758E−03 | −1.7304E−04 |
| A14 = | 8.8661E−06 | — | — | −7.6011E−04 | 9.7767E−05 | 1.0052E−05 |
| A16 = | — | — | — | 7.2465E−05 | — | — |

| Surface # | 14 | 15 | 16 | 17 |
|---|---|---|---|---|
| k = | −2.4455E+00 | 1.6072E+00 | 8.1920E−01 | −1.1262E+00 |
| A4 = | −1.7663E−02 | 2.9633E−02 | −6.4987E−02 | −6.1069E−02 |
| A6 = | 1.0528E−03 | −1.4103E−02 | 8.0334E−03 | 1.2535E−02 |
| A8 = | −1.8997E−03 | 2.1195E−03 | 5.8955E−04 | −1.9537E−03 |
| A10 = | 3.6232E−04 | −1.5946E−04 | −2.2684E−04 | 2.0245E−04 |
| A12 = | −3.8826E−05 | 8.2564E−06 | 2.2110E−05 | −1.2897E−05 |
| A14 = | 2.6403E−06 | −4.3068E−07 | −9.7262E−07 | 4.5384E−07 |
| A16 = | — | 1.3696E−08 | 1.6538E−08 | −6.7304E−09 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.81 | Y11/Y82 | 0.35 |
| Fno | 2.15 | Yc82/f | 0.38 |
| HFOV [deg.] | 36.8 | (R15 + R16)/(R15 − R16) | 2.14 |
| ΣCT/BL | 4.30 | R16/f | 0.39 |
| Sd/Td | 0.96 | f2/f1 | 0.42 |
| Td/f | 1.10 | |f7/f2| | 1.20 |
| Td/EPD | 2.37 | f/f123 | 0.81 |
| TL/ImgH | 1.68 | |f/f456| | 0.29 |
| ImgH/f | 0.77 | | |

4th Embodiment

Figure 7:
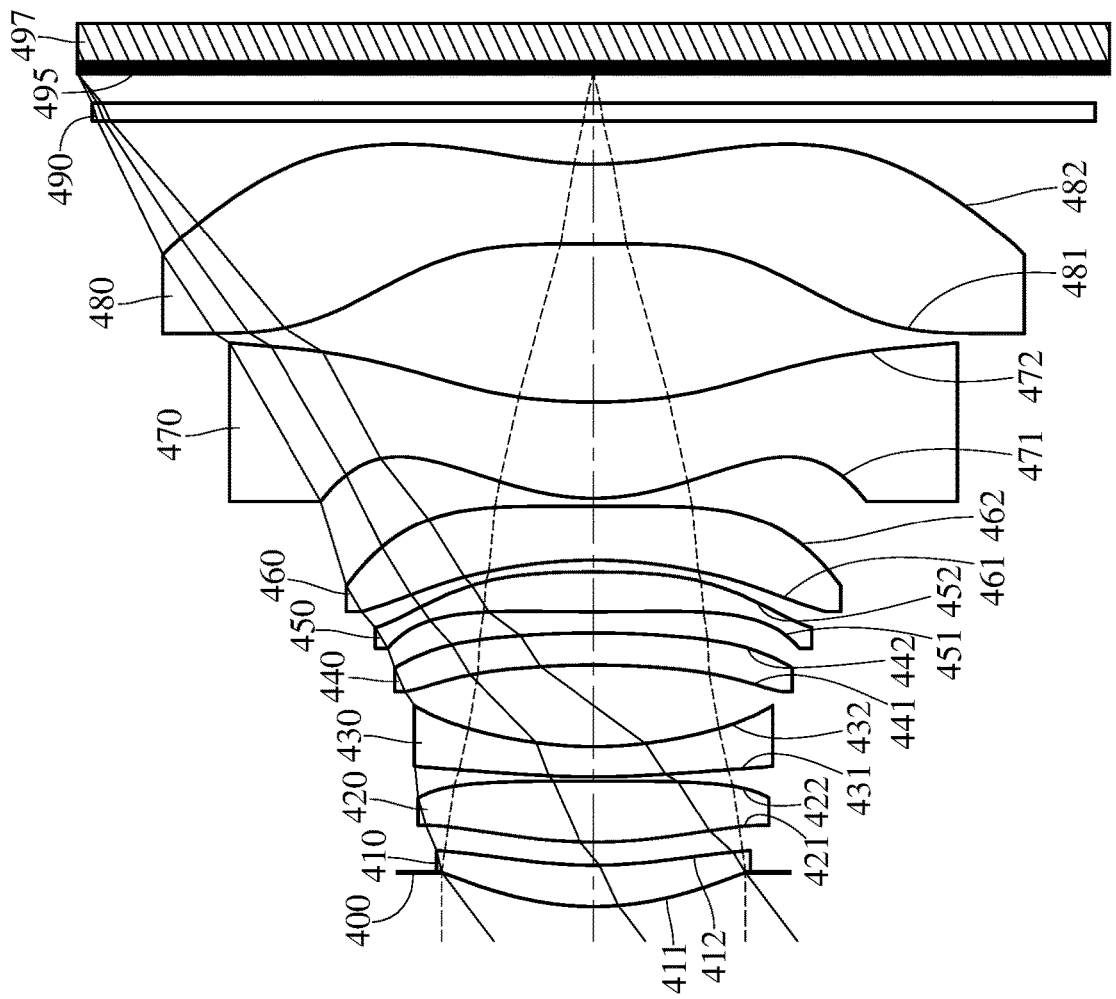
FIG. 7 is a schematic view of an image capturing unit according to the 4th embodiment of the present disclosure.
Figure 8:
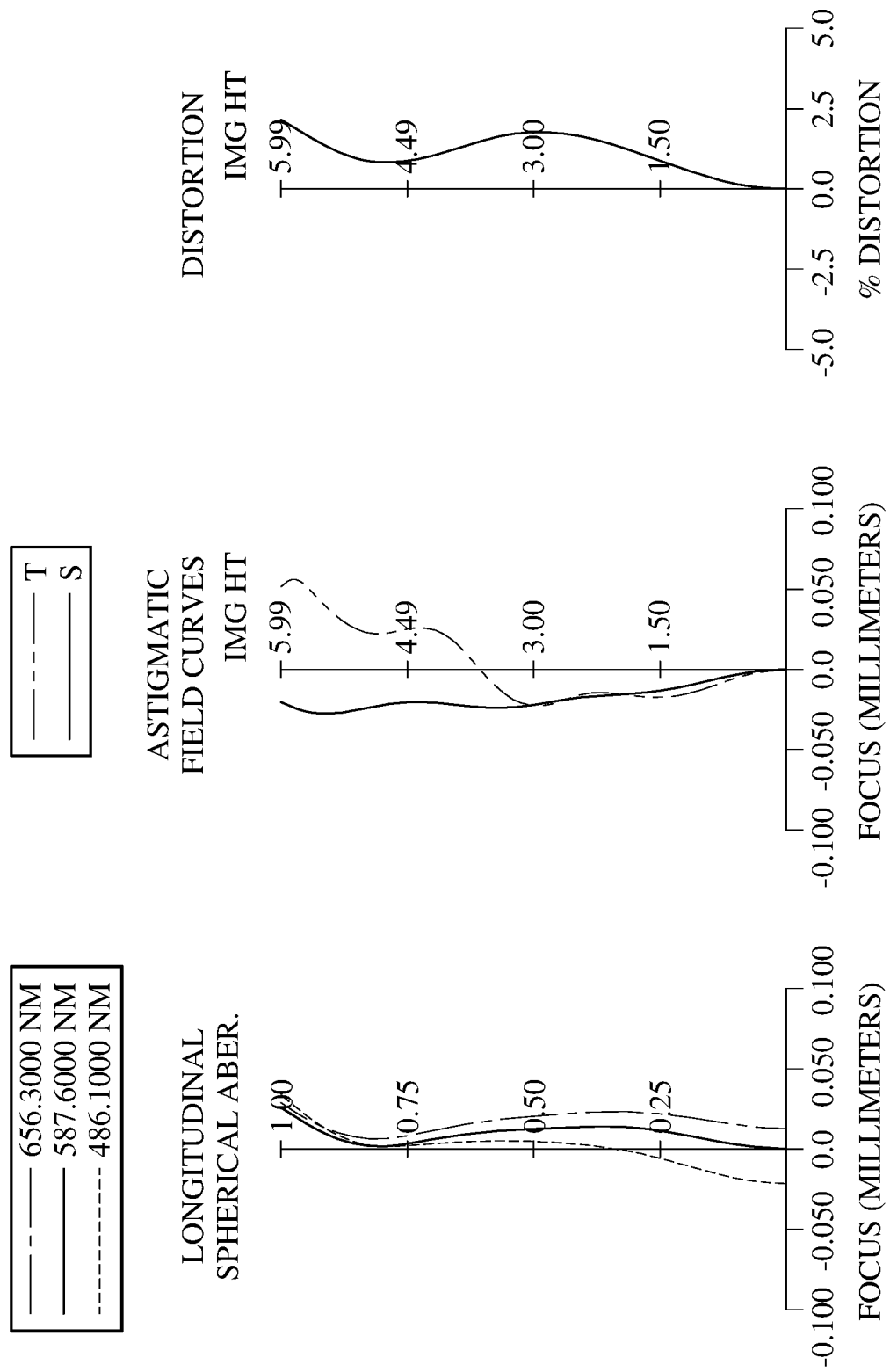
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens system (its reference numeral is omitted) of the present disclosure and an image sensor 497. The photographing optical lens system includes, in order from an object side to an image side, an aperture stop 400, a first lens element 410, a second lens element 420, a third lens element 430, a fourth lens element 440, a fifth lens element 450, a sixth lens element 460, a seventh lens element 470, an eighth lens element 480, an IR-cut filter 490 and an image surface 495, wherein the image sensor 497 is disposed on or near the image surface 495 of the photographing optical lens system, the photographing optical lens system has a total of eight lens elements (410-480). There is an air gap in a paraxial region between every two of the lens elements that are adjacent to each other.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The image-side surface 412 of the first lens element 410 has at least one inflection point.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. Both the object-side surface 421 and the image-side surface 422 of the second lens element 420 have at least one inflection point.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one inflection point.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has at least one inflection point.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric. Both the object-side surface 451 and the image-side surface 452 of the fifth lens element 450 have at least one inflection point.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. Both the object-side surface 461 and the image-side surface 462 of the sixth lens element 460 have at least one inflection point.

The seventh lens element 470 with positive refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. Both the object-side surface 471 and the image-side surface 472 of the seventh lens element 470 have at least one inflection point.

The eighth lens element 480 with negative refractive power has an object-side surface 481 being concave in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has at least one inflection point. The image-side surface 482 of the eighth lens element 480 has at least one convex shape in an off-axis region thereof.

The IR-cut filter 490 is made of glass and located between the eighth lens element 480 and the image surface 495, and will not affect the focal length of the photographing optical lens system.

The detailed optical data of the 4th embodiment are shown in Table 7 and the aspheric surface data are shown in Table 8 below.

TABLE 7

4th Embodiment
f = 7.74 mm, Fno = 2.19, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.394 | | | | |
| 2 | Lens 1 | 3.592 | (ASP) | 0.478 | Plastic | 1.535 | 55.7 | 18.29 |
| 3 | | 5.412 | (ASP) | 0.269 | | | | |
| 4 | Lens 2 | 5.309 | (ASP) | 0.719 | Plastic | 1.544 | 56.0 | 10.04 |
| 5 | | 183.235 | (ASP) | 0.050 | | | | |
| 6 | Lens 3 | 9.205 | (ASP) | 0.350 | Plastic | 1.660 | 20.4 | −15.04 |
| 7 | | 4.704 | (ASP) | 0.951 | | | | |
| 8 | Lens 4 | −9.981 | (ASP) | 0.372 | Plastic | 1.584 | 28.2 | −136.22 |
| 9 | | −11.569 | (ASP) | 0.245 | | | | |
| 10 | Lens 5 | 31.598 | (ASP) | 0.464 | Plastic | 1.544 | 56.0 | 20.56 |
| 11 | | −17.226 | (ASP) | 0.138 | | | | |

TABLE 7-continued

4th Embodiment
f = 7.74 mm, Fno = 2.19, HFOV = 37.1 deg.

| Surface # | | Curvature Radius | | Thickness | Material | Index | Abbe # | Focal Length |
|---|---|---|---|---|---|---|---|---|
| 12 | Lens 6 | −5.670 | (ASP) | 0.633 | Plastic | 1.544 | 56.0 | −9.77 |
| 13 | | 88.329 | (ASP) | 0.092 | | | | |
| 14 | Lens 7 | 2.648 | (ASP) | 1.122 | Plastic | 1.544 | 56.0 | 7.03 |
| 15 | | 7.321 | (ASP) | 1.840 | | | | |
| 16 | Lens 8 | −99.548 | (ASP) | 0.934 | Plastic | 1.544 | 56.0 | −7.32 |
| 17 | | 4.163 | (ASP) | 0.500 | | | | |
| 18 | IR-cut filter | Plano | | 0.210 | Glass | 1.517 | 64.2 | — |
| 19 | | Plano | | 0.336 | | | | |
| 20 | Image | Plano | | — | | | | |

Note:
Reference wavelength is 587.6 nm (d−line).

TABLE 8

Aspheric Coefficients

| Surface # | 2 | 3 | 4 | 5 | 6 | 7 |
|---|---|---|---|---|---|---|
| k = | −3.6591E+00 | −2.0197E+01 | −5.0324E+00 | −1.0000E+00 | −5.6195E+00 | −2.1734E+01 |
| A4 = | 4.0566E−03 | 1.0732E−03 | −8.2331E−03 | −1.6405E−02 | −2.0112E−02 | 1.5639E−02 |
| A6 = | 1.4272E−04 | −5.8300E−03 | −9.6310E−04 | 7.3921E−03 | 1.0189E−02 | −6.0842E−03 |
| A8 = | −1.0427E−03 | 3.2053E−03 | 4.0402E−04 | −2.9594E−03 | −3.1824E−03 | 2.7588E−03 |
| A10 = | 6.3231E−04 | −1.3623E−03 | −4.1634E−05 | 6.1540E−04 | 5.5217E−04 | −7.7156E−04 |
| A12 = | −2.3511E−04 | 3.9110E−04 | 2.0869E−05 | −7.8700E−05 | −5.5034E−05 | 1.2664E−04 |
| A14 = | 4.3392E−05 | −6.2408E−05 | −5.7071E−06 | 3.2919E−06 | 3.2207E−06 | −8.3124E−06 |
| A16 = | −2.8704E−06 | 4.4465E−06 | — | — | — | — |

| Surface # | 8 | 9 | 10 | 11 | 12 | 13 |
|---|---|---|---|---|---|---|
| k = | −1.4795E+01 | −7.4790E+01 | −1.0000E+00 | 3.7178E+01 | 7.4230E−03 | −9.0000E+01 |
| A4 = | −1.8837E−03 | −3.2467E−03 | −1.1473E−02 | −4.1630E−02 | −2.9429E−03 | −1.1561E−02 |
| A6 = | −1.5886E−03 | −9.3260E−04 | 2.4901E−04 | 1.5088E−02 | 5.4203E−03 | −6.9350E−04 |
| A8 = | 1.1800E−04 | −8.4165E−05 | −9.2783E−05 | −4.4880E−03 | −2.7037E−03 | 1.3772E−04 |
| A10 = | −3.4619E−05 | −6.9360E−07 | 3.5601E−06 | 8.1477E−04 | 5.8579E−04 | −2.9013E−05 |
| A12 = | 1.5165E−05 | 2.3815E−06 | −2.9812E−06 | −6.6283E−05 | −5.7307E−05 | 3.0804E−06 |
| A14 = | −6.9091E−07 | — | — | 6.4566E−07 | 2.1185E−06 | −1.1551E−07 |
| A16 = | — | — | — | 1.4828E−07 | — | — |

| Surface # | 14 | 15 | 16 | 17 |
|---|---|---|---|---|
| k = | −3.5569E+00 | 1.2666E+00 | −1.4986E+01 | −8.1535E−01 |
| A4 = | −7.5544E−03 | 1.2691E−02 | −2.2298E−02 | −2.2702E−02 |
| A6 = | 8.6719E−04 | −3.8733E−03 | 9.9415E−04 | 2.2032E−03 |
| A8 = | −3.9812E−04 | 4.2689E−04 | 2.0078E−04 | −1.6800E−04 |
| A10 = | 4.6305E−05 | −2.6275E−05 | −2.6032E−05 | 8.5055E−06 |
| A12 = | −2.6926E−06 | 9.2849E−07 | 1.3178E−06 | −2.7972E−07 |
| A14 = | 7.1494E−08 | −1.7290E−08 | −3.2161E−08 | 5.6947E−09 |
| A16 = | — | 1.2274E−10 | 3.1334E−10 | −5.5153E−11 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 7.74 | Y11/Y82 | 0.35 |
| Fno | 2.19 | Yc82/f | 0.29 |
| HFOV [deg.] | 37.1 | (R15 + R16)/(R15 − R16) | 0.92 |
| ΣCT/BL | 4.85 | R16/f | 0.54 |
| Sd/Td | 0.95 | f2/f1 | 0.55 |
| Td/f | 1.12 | |f7/f2| | 0.70 |
| Td/EPD | 2.45 | f/f123 | 0.74 |
| TL/ImgH | 1.62 | |f/f456| | 0.47 |
| ImgH/f | 0.77 | | |

5th Embodiment

Figure 9:
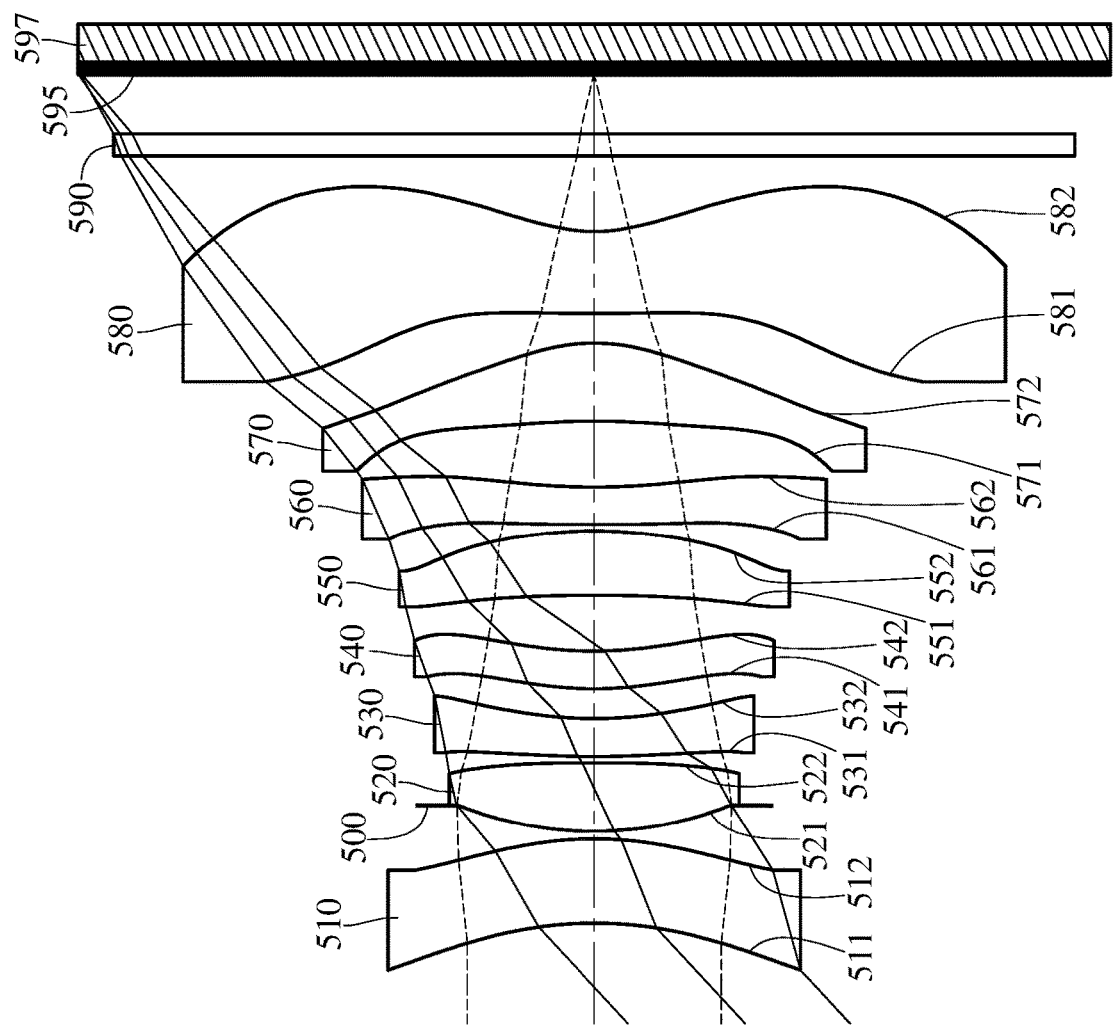
FIG. 9 is a schematic view of an image capturing unit according to the 5th embodiment of the present disclosure.
Figure 10:
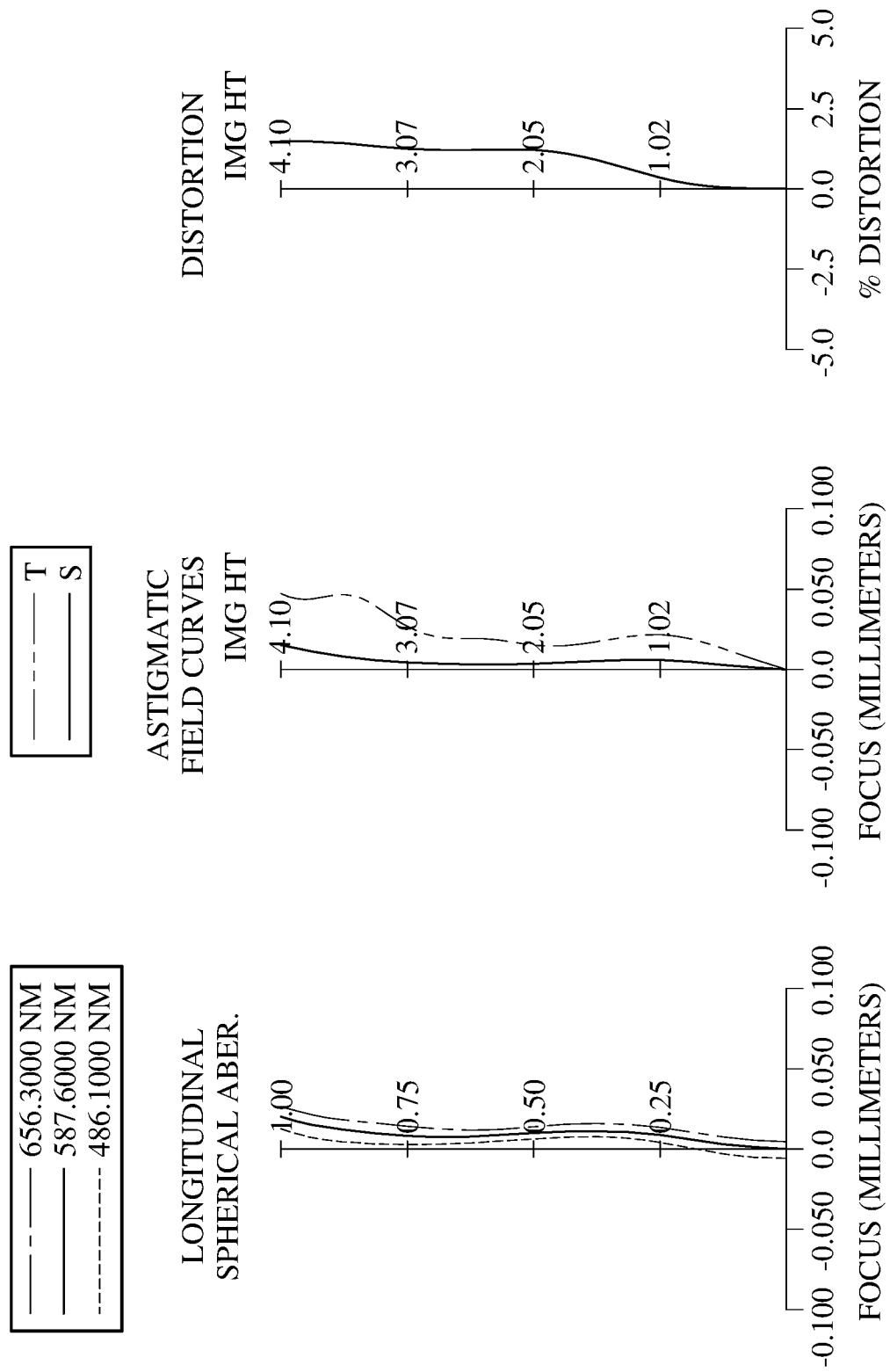
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens system (its reference numeral is omitted) of the present disclosure and an image sensor 597. The photographing optical lens system includes, in order from an object side to an image side, a first lens element 510, an aperture stop 500, a second lens element 520, a third lens element 530, a fourth lens element 540, a fifth lens element 550, a sixth lens element 560, a seventh lens element 570, an eighth lens element 580, an IR-cut filter 590 and an image surface 595, wherein the image sensor 597 is disposed on or near the image surface 595 of the photographing optical lens system, the photographing optical lens system has a total of eight lens elements (510-580). There is an air gap in a paraxial region between every two of the lens elements that are adjacent to each other.

The first lens element 510 with positive refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric. Both the object-side surface 511 and the image-side surface 512 of the first lens element 510 have at least one inflection point.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. Both the object-side surface 531 and the image-side surface 532 of the third lens element 530 have at least one inflection point.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. Both the object-side surface 541 and the image-side surface 542 of the fourth lens element 540 have at least one inflection point.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. Both the object-side surface 551 and the image-side surface 552 of the fifth lens element 550 have at least one inflection point.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. Both the object-side surface 561 and the image-side surface 562 of the sixth lens element 560 have at least one inflection point.

The seventh lens element 570 with positive refractive power has an object-side surface 571 being concave in a paraxial region thereof and an image-side surface 572 being convex in a paraxial region thereof. The seventh lens element 570 is made of plastic material and has the object-side surface 571 and the image-side surface 572 being both aspheric. Both the object-side surface 571 and the image-side surface 572 of the seventh lens element 570 have at least one inflection point.

The eighth lens element 580 with negative refractive power has an object-side surface 581 being convex in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has at least one inflection point. The image-side surface 582 of the eighth lens element 580 has at least one convex shape in an off-axis region thereof.

The IR-cut filter 590 is made of glass and located between the eighth lens element 580 and the image surface 595, and will not affect the focal length of the photographing optical lens system.

The detailed optical data of the 5th embodiment are shown in Table 9 and the aspheric surface data are shown in Table 10 below.

TABLE 9

5th Embodiment
f = 4.35 mm, Fno = 2.15, HFOV = 42.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.102 | (ASP) | 0.668 | Plastic | 1.544 | 55.9 | 42.41 |
| 2 | | −2.942 | (ASP) | 0.270 | | | | |
| 3 | Ape. Stop | Plano | | −0.208 | | | | |
| 4 | Lens 2 | 2.906 | (ASP) | 0.548 | Plastic | 1.544 | 55.9 | 5.09 |
| 5 | | −55.180 | (ASP) | 0.050 | | | | |
| 6 | Lens 3 | 6.703 | (ASP) | 0.300 | Plastic | 1.639 | 23.5 | −9.66 |
| 7 | | 3.157 | (ASP) | 0.237 | | | | |
| 8 | Lens 4 | 2.886 | (ASP) | 0.300 | Plastic | 1.544 | 55.9 | 38.13 |
| 9 | | 3.229 | (ASP) | 0.444 | | | | |
| 10 | Lens 5 | −15.063 | (ASP) | 0.513 | Plastic | 1.544 | 55.9 | 7.67 |
| 11 | | −3.308 | (ASP) | 0.053 | | | | |
| 12 | Lens 6 | 90.626 | (ASP) | 0.300 | Plastic | 1.639 | 23.5 | −9.23 |
| 13 | | 5.529 | (ASP) | 0.522 | | | | |
| 14 | Lens 7 | −5.196 | (ASP) | 0.622 | Plastic | 1.544 | 55.9 | 3.20 |
| 15 | | −1.360 | (ASP) | 0.234 | | | | |
| 16 | Lend 8 | 15.294 | (ASP) | 0.656 | Plastic | 1.544 | 55.9 | −2.64 |
| 17 | | 1.292 | (ASP) | 0.600 | | | | |

TABLE 9-continued

5th Embodiment
f = 4.35 mm, Fno = 2.15, HFOV = 42.9 deg.

| Surface # | | Curvature Radius | Thickness | Material | Index | Abbe # | Focal Length |
|---|---|---|---|---|---|---|---|
| 18 | IR-cut filter | Plano | 0.175 | Glass | 1.517 | 64.2 | — |
| 19 | | Plano | 0.469 | | | | |
| 20 | Image | Plano | — | | | | |

Note:
Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | −8.9821E−01 | −2.8571E+00 | 3.3915E−02 | −1.0144E+01 | 0.0000E+00 | −1.0000E+00 |
| A4 = | 9.4311E−04 | 8.6990E−03 | −3.8333E−03 | −9.6166E−02 | −8.9886E−02 | −5.5193E−02 |
| A6 = | 3.7919E−03 | 4.6841E−03 | 3.5926E−03 | 8.2569E−02 | 9.4471E−02 | 4.6024E−02 |
| A8 = | 1.0642E−04 | −1.1333E−03 | −2.0766E−03 | −2.8338E−02 | −3.8713E−02 | −2.0902E−02 |
| A10 = | −2.4498E−04 | 3.8816E−04 | −4.4465E−03 | −1.4921E−02 | −9.1934E−03 | 5.1891E−03 |
| A12 = | −3.9527E−05 | −6.2368E−05 | 1.1191E−02 | 2.0027E−02 | 1.2851E−02 | −3.1647E−03 |
| A14 = | 4.2884E−05 | −1.1405E−12 | −5.5323E−03 | −8.0878E−03 | −5.4479E−03 | 5.8218E−04 |
| A16 = | −6.9645E−06 | −1.5462E−13 | — | — | — | — |

| Surface # | 8 | 9 | 10 | 11 | 12 | 13 |
|---|---|---|---|---|---|---|
| k = | −8.5979E+00 | 1.0756E+00 | −4.4013E+00 | −1.6135E+01 | −1.0000E+00 | −1.0000E+00 |
| A4 = | −1.7066E−02 | −3.3435E−02 | −3.0970E−02 | 2.4901E−02 | 7.0532E−02 | −1.4278E−03 |
| A6 = | −6.7120E−03 | −3.8165E−03 | 5.9231E−02 | −5.7583E−02 | −1.0990E−01 | −3.3651E−02 |
| A8 = | −7.9919E−03 | −6.4824E−03 | −9.7140E−02 | 1.3929E−02 | 6.7156E−02 | 2.0620E−02 |
| A10 = | 1.7256E−03 | 2.6701E−04 | 9.2985E−02 | 1.8826E−03 | −2.8321E−02 | −7.4388E−03 |
| A12 = | — | — | −5.0291E−02 | −2.6137E−04 | 7.9887E−03 | 1.6595E−03 |
| A14 = | — | — | 1.4651E−02 | 1.0591E−05 | −1.0464E−03 | −1.6148E−04 |
| A16 = | — | — | −1.7671E−03 | — | — | — |

| Surface # | 14 | 15 | 16 | 17 |
|---|---|---|---|---|
| k = | −1.3757E+01 | −4.6387E+00 | −1.1322E+00 | −6.0187E+00 |
| A4 = | 6.6545E−02 | 2.9481E−02 | −3.1311E−02 | −3.3691E−02 |
| A6 = | −3.4484E−02 | −2.1247E−03 | −2.1322E−02 | 5.3795E−03 |
| A8 = | −8.0958E−05 | −1.0677E−02 | 1.0931E−02 | −6.5706E−04 |
| A10 = | 3.7645E−03 | 5.5410E−03 | −1.9476E−03 | 4.9447E−05 |
| A12 = | −1.2056E−03 | −1.0571E−03 | 1.5866E−04 | −2.1154E−06 |
| A14 = | 1.2351E−04 | 7.1183E−05 | −4.9903E−06 | 3.8196E−08 |
| A16 = | — | — | — | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.35 | Y11/Y82 | 0.50 |
| Fno | 2.15 | Yc82/f | 0.42 |
| HFOV [deg.] | 42.9 | (R15 + R16)/(R15 − R16) | 1.18 |
| ΣCT/BL | 3.14 | R16/f | 0.30 |
| Sd/Td | 0.83 | f2/f1 | 0.12 |
| Td/f | 1.27 | |f7/f2| | 0.63 |
| Td/EPD | 2.72 | f/f123 | 0.62 |
| TL/ImgH | 1.65 | |f/f456| | 0.22 |
| ImgH/f | 0.94 | | |

6th Embodiment

Figure 11:
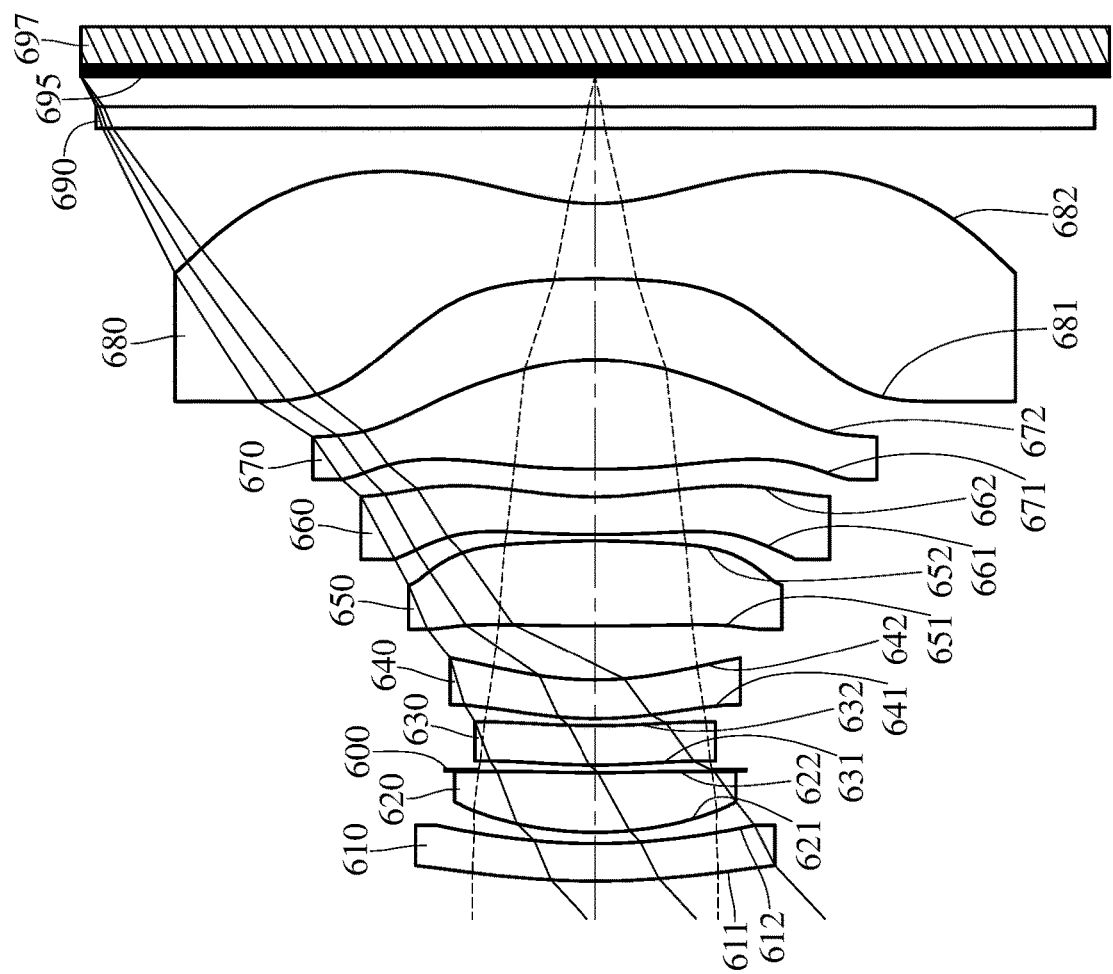
FIG. 11 is a schematic view of an image capturing unit according to the 6th embodiment of the present disclosure.
Figure 12:
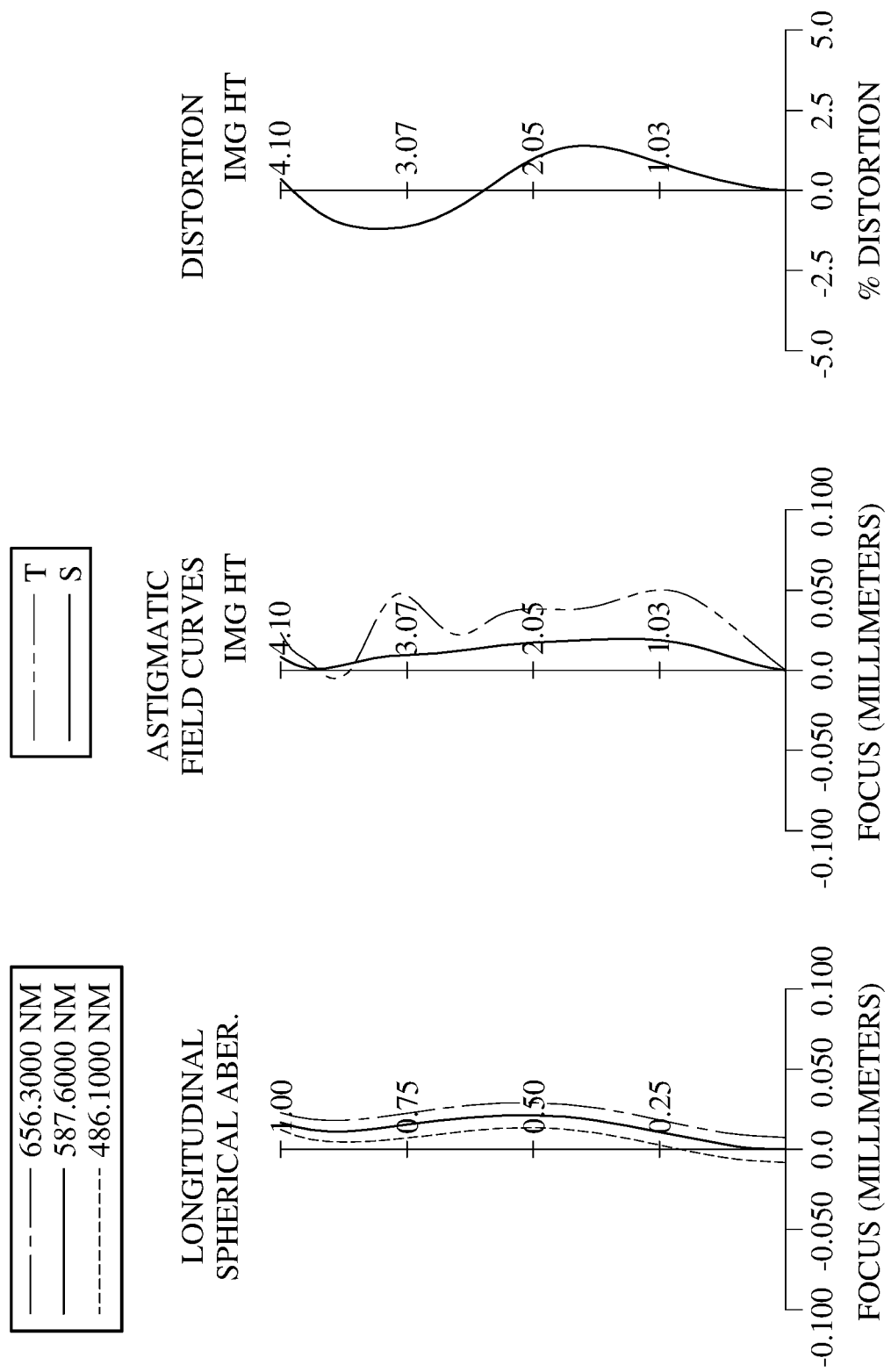
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens system (its reference numeral is omitted) of the present disclosure and an image sensor 690. The photographing optical lens system includes, in order from an object side to an image side, a first lens element 610, a second lens element 620, an aperture stop 600, a third lens element 630, a fourth lens element 640, a fifth lens element 650, a sixth lens element 660, a seventh lens element 670, an eighth lens element 680, an IR-cut filter 690 and an image surface 695, wherein the image sensor 697 is disposed on or near the image surface 695 of the photographing optical lens system, the photographing optical lens system has a total of eight lens elements (610-680). There is an air gap in a paraxial region between every two of the lens elements that are adjacent to each other.

The first lens element 610 with negative refractive power has an object-side surface 611 being convex in a paraxial region thereof and an image-side surface 612 being concave in a paraxial region thereof. The sixth lens element 610 is made of plastic material and has the object-side surface 611 and the image-side surface 612 being both aspheric. Both the object-side surface 611 and the image-side surface 612 of the sixth lens element 610 have at least one inflection point.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The image-side surface 622 of the second lens element 620 has at least one inflection point.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. Both the object-side surface 631 and the image-side surface 632 of the third lens element 630 have at least one inflection point.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. Both the object-side surface 641 and the image-side surface 642 of the fourth lens element 640 have at least one inflection point.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric. Both the object-side surface 651 and the image-side surface 652 of the fifth lens element 650 have at least one inflection point.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. Both the object-side surface 661 and the image-side surface 662 of the sixth lens element 660 have at least one inflection point.

The seventh lens element 670 with positive refractive power has an object-side surface 671 being convex in a paraxial region thereof and an image-side surface 672 being convex in a paraxial region thereof. The seventh lens element 670 is made of plastic material and has the object-side surface 671 and the image-side surface 672 being both aspheric. Both the object-side surface 671 and the image-side surface 672 of the seventh lens element 670 have at least one inflection point.

The eighth lens element 680 with negative refractive power has an object-side surface 681 being concave in a paraxial region thereof and an image-side surface 682 being concave in a paraxial region thereof. The eighth lens element 680 is made of plastic material and has the object-side surface 681 and the image-side surface 682 being both aspheric. The object-side surface 681 of the eighth lens element 680 has at least one inflection point. The image-side surface 682 of the eighth lens element 680 has at least one convex shape in an off-axis region thereof.

The IR-cut filter 690 is made of glass and located between the eighth lens element 680 and the image surface 695, and will not affect the focal length of the photographing optical lens system.

The detailed optical data of the 6th embodiment are shown in Table 11 and the aspheric surface data are shown in Table 12 below.

TABLE 11

6th Embodiment
f = 4.37 mm, Fno = 2.23, HFOV = 43.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.534 | (ASP) | 0.300 | Plastic | 1.650 | 21.4 | −32.56 |
| 2 | | 4.902 | (ASP) | 0.089 | | | | |
| 3 | Lens 2 | 2.815 | (ASP) | 0.476 | Plastic | 1.544 | 55.9 | 7.34 |
| 4 | | 8.978 | (ASP) | 0.020 | | | | |
| 5 | Ape. Stop | Plano | | 0.041 | | | | |
| 6 | Lens 3 | 5.034 | (ASP) | 0.313 | Plastic | 1.544 | 55.9 | 34.71 |
| 7 | | 6.713 | (ASP) | 0.057 | | | | |
| 8 | Lens 4 | 3.116 | (ASP) | 0.309 | Plastic | 1.639 | 23.5 | −58.62 |
| 9 | | 2.766 | (ASP) | 0.436 | | | | |
| 10 | Lens 5 | 22.908 | (ASP) | 0.678 | Plastic | 1.544 | 55.9 | 8.72 |
| 11 | | −5.919 | (ASP) | 0.050 | | | | |
| 12 | Lens 6 | 8.401 | (ASP) | 0.300 | Plastic | 1.650 | 21.4 | −7.31 |
| 13 | | 2.991 | (ASP) | 0.221 | | | | |
| 14 | Lens 7 | 8.856 | (ASP) | 0.875 | Plastic | 1.544 | 55.9 | 2.82 |
| 15 | | −1.790 | (ASP) | 0.646 | | | | |
| 16 | Lend 8 | −7.124 | (ASP) | 0.600 | Plastic | 1.544 | 55.9 | −2.57 |
| 17 | | 1.790 | (ASP) | 0.600 | | | | |
| 18 | IR-cut filter | Plano | | 0.175 | Glass | 1.517 | 64.2 | — |
| 19 | | Plano | | 0.238 | | | | |
| 20 | Image | Plano | | — | | | | |

Note:
Reference wavelength is 587.6 nm (d-line).
An effective radius of the image-side surface of the seventh lens element is 2.250 mm.

TABLE 12

Aspheric Coefficients

| Surface # | 1 | 2 | 3 | 4 | 6 | 7 |
|---|---|---|---|---|---|---|
| k = | 1.4403E+00 | −2.2238E+00 | −7.1178E−01 | −2.1424E+00 | −1.7709E+00 | 7.1291E+00 |
| A4 = | −7.3737E−03 | −1.2218E−02 | −1.0010E−02 | −9.9173E−02 | −1.0543E−01 | −4.8162E−02 |
| A6 = | −2.9638E−04 | 5.0339E−03 | 8.7286E−03 | 7.8475E−02 | 6.7551E−02 | 2.0949E−02 |
| A8 = | 1.1939E−04 | −3.2525E−04 | 6.9333E−03 | −2.5920E−02 | −3.6088E−02 | −3.5904E−02 |
| A10 = | 8.0249E−05 | −2.7100E−04 | −8.3643E−03 | −1.1748E−02 | 6.4536E−04 | 1.9391E−02 |
| A12 = | −1.7804E−04 | 5.5494E−04 | 8.5457E−03 | 2.2176E−02 | 7.9736E−03 | −7.3885E−03 |
| A14 = | 3.5287E−05 | −3.3860E−04 | −1.6137E−03 | −8.0878E−03 | −5.4479E−03 | 2.8544E−03 |
| A16 = | −4.1609E−06 | 1.3586E−12 | — | — | — | — |

| Surface # | 8 | 9 | 10 | 11 | 12 | 13 |
|---|---|---|---|---|---|---|
| k = | −9.8945E+00 | 3.2237E−02 | 3.0000E+00 | −1.6209E+01 | −1.0000E+00 | −5.2317E+00 |
| A4 = | −2.1993E−02 | −4.0322E−02 | −7.4609E−03 | 1.0709E−01 | −2.8663E−02 | −7.9395E−02 |
| A6 = | −6.4146E−04 | 2.5661E−03 | 3.8274E−02 | −1.2277E−01 | 3.6211E−02 | 2.1986E−02 |
| A8 = | −9.6316E−03 | −2.4045E−02 | −1.6583E−01 | −1.7823E−02 | −1.2133E−01 | −8.8514E−03 |
| A10 = | 1.0280E−03 | 4.7933E−02 | 2.5162E−01 | 5.5108E−02 | 1.0244E−01 | 2.3358E−03 |
| A12 = | 2.2265E−03 | −4.9226E−02 | −2.0073E−01 | −2.3525E−02 | −4.3836E−02 | −6.6435E−05 |
| A14 = | −1.7139E−10 | 2.4607E−02 | 7.9569E−02 | 1.5959E−03 | 1.0552E−02 | −2.0830E−05 |
| A16 = | −1.3765E−11 | −4.6238E−03 | −1.2011E−02 | 7.9252E−04 | −1.1329E−03 | −2.4238E−06 |

| Surface # | 14 | 15 | 16 | 17 |
|---|---|---|---|---|
| k = | 2.9984E+00 | −4.3043E+00 | 1.9439E+00 | −3.7453E+00 |
| A4 = | 8.3207E−02 | 4.6108E−02 | −1.9210E−02 | −7.2817E−02 |
| A6 = | −1.3163E−01 | −4.3186E−02 | −6.4360E−02 | 2.2620E−02 |
| A8 = | 8.1940E−02 | 7.8101E−03 | 3.4437E−02 | −5.3131E−03 |
| A10 = | −2.9092E−02 | 3.4523E−03 | −7.4305E−03 | 8.2513E−04 |
| A12 = | 5.6246E−03 | −1.4941E−03 | 8.2943E−04 | −7.7886E−05 |
| A14 = | −5.2046E−04 | 2.0252E−04 | −4.7656E−05 | 3.9779E−06 |
| A16 = | 1.6443E−05 | −9.5205E−06 | 1.1202E−06 | −8.3555E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.37 | Y11/Y82 | 0.43 |
| Fno | 2.23 | Yc82/f | 0.37 |
| HFOV [deg.] | 43.0 | (R15 + R16)/(R15 − R16) | 0.60 |
| ΣCT/BL | 3.80 | R16/f | 0.41 |
| Sd/Td | 0.84 | f2/f1 | −0.23 |
| Td/f | 1.24 | |f7/f2| | 0.38 |
| Td/EPD | 2.76 | f/f123 | 0.57 |
| TL/ImgH | 1.57 | |f/f456| | 0.14 |
| ImgH/f | 0.94 | | |

7th Embodiment

Figure 13:
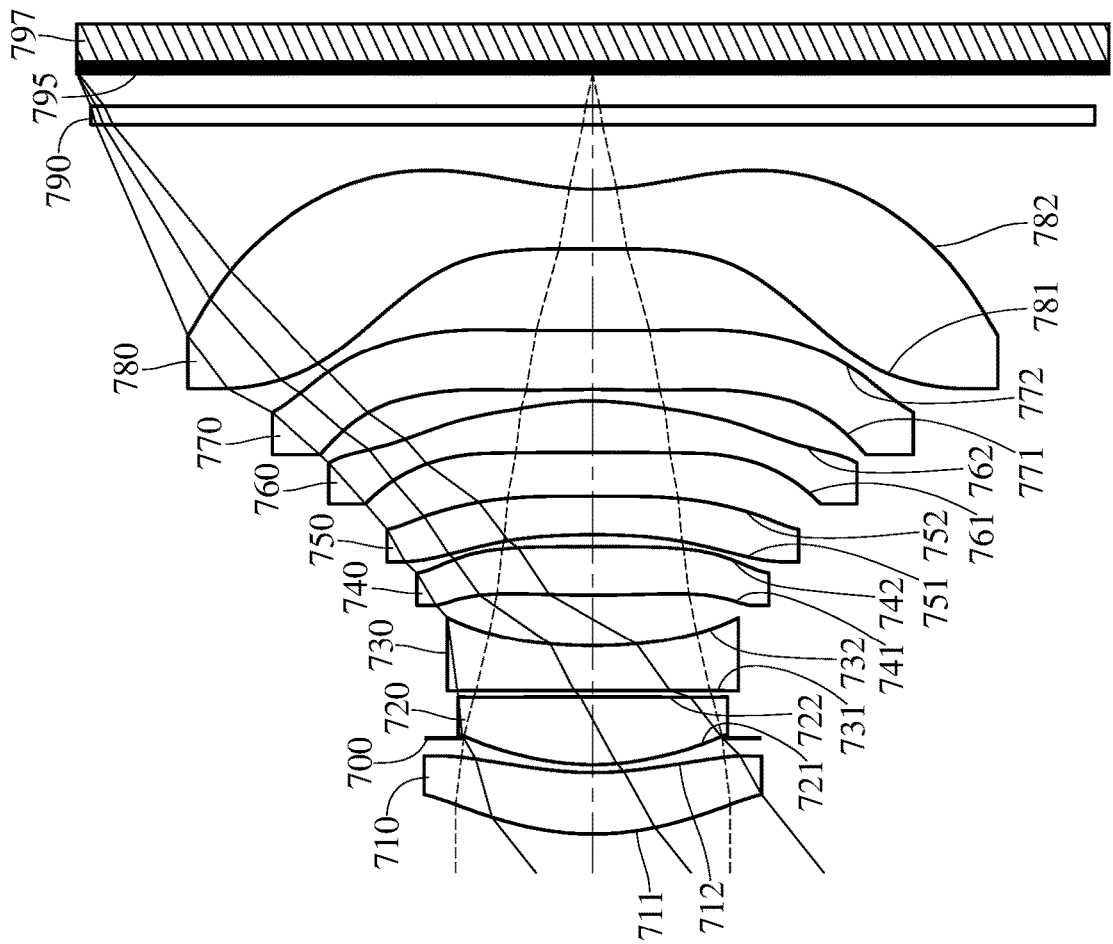
FIG. 13 is a schematic view of an image capturing unit according to the 7th embodiment of the present disclosure.
Figure 14:
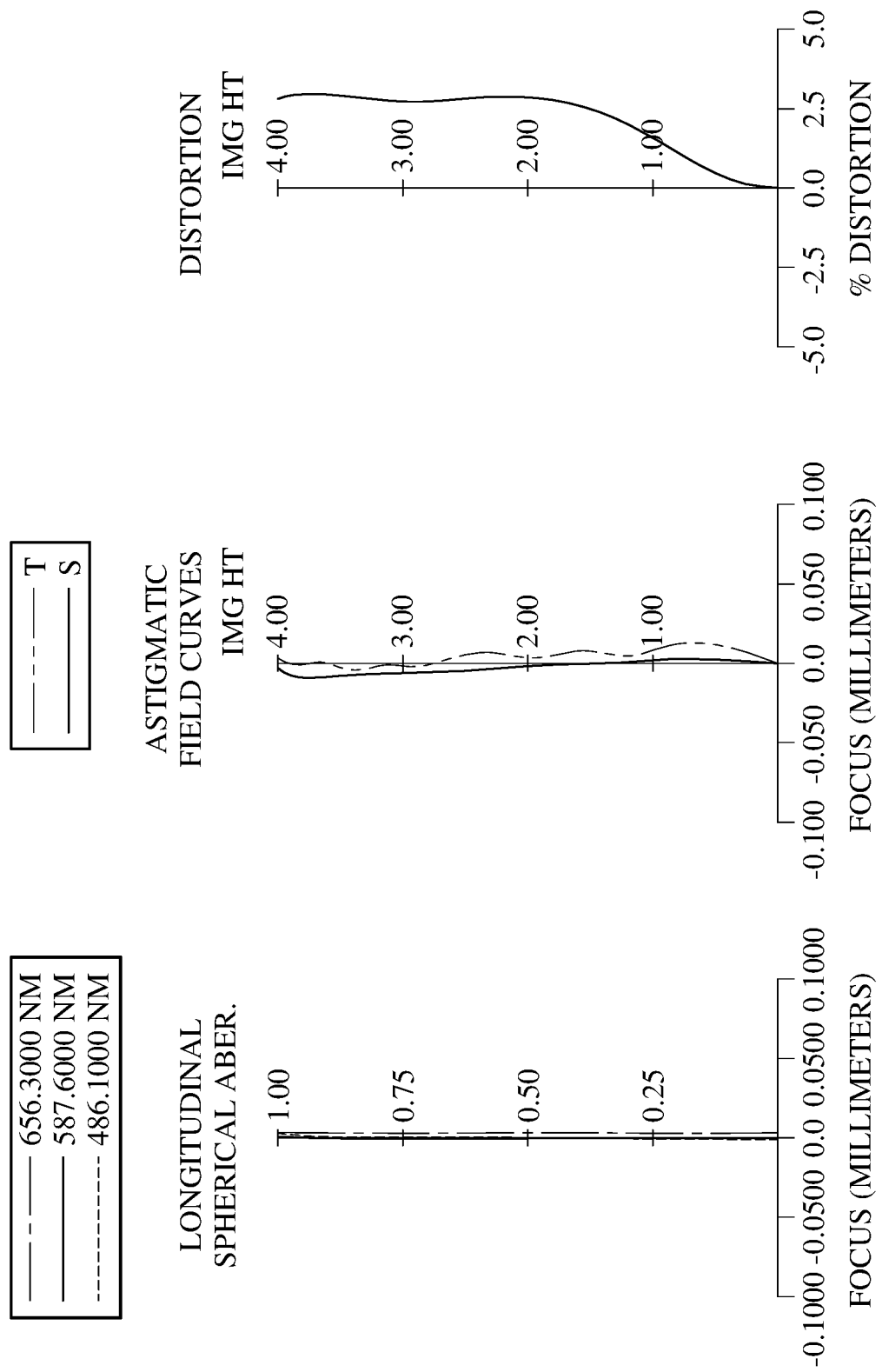
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens system (its reference numeral is omitted) of the present disclosure and an image sensor 797. The photographing optical lens system includes, in order from an object side to an image side, a first lens element 710, an aperture stop 700, a second lens element 720, a third lens element 730, a fourth lens element 740, a fifth lens element 750, a sixth lens element 760, a seventh lens element 770, an eighth lens element 780, an IR-cut filter 790 and an image surface 795, wherein the image sensor 797 is disposed on or near the image surface 795 of the photographing optical lens system, the photographing optical lens system has a total of eight lens elements (710-780). There is an air gap in a paraxial region between every two of the lens elements that are adjacent to each other.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. Both the object-side surface 711 and the image-side surface 712 of the first lens element 710 have at least one inflection point.

The second lens element 720 with positive refractive power has an object-side surface 721 being convex in a paraxial region thereof and an image-side surface 722 being planar in a paraxial region thereof. The second lens element 720 is made of plastic material and has the object-side surface 721 and the image-side surface 722 being both aspheric. The image-side surface 722 of the second lens element 720 has at least one inflection point.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one inflection point.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. Both the object-side surface 741 and the image-side surface 742 of the fourth lens element 740 have at least one inflection point.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. Both the object-side surface 751 and the image-side surface 752 of the fifth lens element 750 have at least one inflection point.

The sixth lens element 760 with positive refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. Both the object-side surface 761 and the image-side surface 762 of the sixth lens element 760 have at least one inflection point.

The seventh lens element 770 with negative refractive power has an object-side surface 771 being concave in a paraxial region thereof and an image-side surface 772 being convex in a paraxial region thereof. The seventh lens element 770 is made of plastic material and has the object-side surface 771 and the image-side surface 772 being both aspheric. Both the object-side surface 771 and the image-side surface 772 of the seventh lens element 770 have at least one inflection point.

The eighth lens element 780 with negative refractive power has an object-side surface 781 being concave in a paraxial region thereof and an image-side surface 782 being concave in a paraxial region thereof. The eighth lens element 780 is made of plastic material and has the object-side surface 781 and the image-side surface 782 being both aspheric. The object-side surface 781 of the eighth lens element 780 has at least one inflection point. The image-side surface 782 of the eighth lens element 780 has at least one convex shape in an off-axis region thereof. The IR-cut filter 790 is made of glass and located between the eighth lens element 780 and the image surface 795, and will not affect the focal length of the photographing optical lens system.

The detailed optical data of the 7th embodiment are shown in Table 13 and the aspheric surface data are shown in Table 14 below.

TABLE 13

7th Embodiment
f = 4.90 mm, Fno = 2.30, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.314 | (ASP) | 0.476 | Plastic | 1.514 | 56.8 | 25.43 |
| 2 | | 2.616 | (ASP) | 0.269 | | | | |
| 3 | Ape. Stop | Plano | | −0.208 | | | | |
| 4 | Lens 2 | 1.987 | (ASP) | 0.525 | Plastic | 1.544 | 55.9 | 3.65 |
| 5 | | ∞ | (ASP) | 0.050 | | | | |
| 6 | Lens 3 | −123.305 | (ASP) | 0.350 | Plastic | 1.639 | 23.5 | −5.85 |
| 7 | | 3.858 | (ASP) | 0.394 | | | | |
| 8 | Lens 4 | 9.875 | (ASP) | 0.375 | Plastic | 1.544 | 55.9 | 16.56 |
| 9 | | −101.913 | (ASP) | 0.094 | | | | |
| 10 | Lens 5 | −6.207 | (ASP) | 0.300 | Plastic | 1.530 | 55.8 | −12.59 |
| 11 | | −90.462 | (ASP) | 0.337 | | | | |
| 12 | Lens 6 | −69.277 | (ASP) | 0.400 | Plastic | 1.544 | 55.9 | 4.04 |
| 13 | | −2.135 | (ASP) | 0.090 | | | | |
| 14 | Lens 7 | −8.012 | (ASP) | 0.460 | Plastic | 1.639 | 23.5 | −16.33 |
| 15 | | −35.250 | (ASP) | 0.635 | | | | |
| 16 | Lend 8 | −64.880 | (ASP) | 0.460 | Plastic | 1.544 | 55.9 | −3.92 |
| 17 | | 2.209 | (ASP) | 0.500 | | | | |
| 18 | IR-cut filter | Plano | | 0.145 | Glass | 1.517 | 64.2 | — |
| 19 | | Plano | | 0.248 | | | | |
| 20 | Image | Plano | | — | | | | |

Note:
Reference wavelength is 587.6 nm (d-line).

TABLE 14

Aspheric Coefficients

| Surface # | 1 | 2 | 4 | 5 | 6 | 7 |
|---|---|---|---|---|---|---|
| k = | −2.1661E+00 | −1.0265E+01 | 6.3037E−01 | 0.0000E+00 | 3.0000E+00 | 2.8410E+00 |
| A4 = | 6.6435E−03 | −3.7944E−02 | −9.2979E−02 | −2.2174E−02 | −1.3953E−02 | 7.2681E−03 |
| A6 = | −2.8943E−03 | −5.2898E−03 | 2.5248E−02 | 3.3164E−02 | 5.0576E−02 | 3.3813E−02 |
| A8 = | −7.4513E−03 | 1.2647E−02 | 6.1101E−03 | −3.4384E−02 | −5.0095E−02 | −3.3998E−02 |
| A10 = | 5.1055E−03 | −1.6575E−03 | −8.5285E−03 | 3.2011E−02 | 1.8811E−02 | 1.9833E−02 |
| A12 = | −3.9314E−03 | −2.5743E−03 | 1.2977E−02 | −3.3086E−03 | 7.9083E−03 | −7.3749E−03 |
| A14 = | 1.5975E−03 | −4.3887E−04 | −5.1017E−03 | −6.0295E−03 | −1.0126E−02 | 1.8793E−03 |
| A16 = | −2.9570E−04 | 4.3328E−04 | 3.7533E−12 | 4.0551E−12 | −1.6060E−12 | 1.6663E−12 |

TABLE 14-continued

Aspheric Coefficients

| Surface # | 8 | 9 | 10 | 11 | 12 | 13 |
|---|---|---|---|---|---|---|
| k = | −3.6520E+01 | 3.0000E+00 | −2.7107E+01 | −2.0000E+01 | 1.3646E+01 | −6.9477E+00 |
| A4 = | −4.6490E−02 | −5.2989E−02 | −9.5180E−02 | −8.7799E−02 | −9.1926E−03 | 1.3809E−01 |
| A6 = | −1.8771E−02 | −1.4869E−02 | 4.1322E−02 | 2.2875E−02 | 6.4452E−02 | −1.2706E−01 |
| A8 = | 5.5328E−04 | −7.0092E−03 | 3.3203E−03 | −1.7944E−02 | −1.4120E−01 | 2.1032E−02 |
| A10 = | −8.9391E−03 | −2.7390E−04 | −7.3137E−05 | 4.2622E−02 | 1.0143E−01 | 1.7988E−02 |
| A12 = | 2.8376E−03 | 7.3103E−03 | −4.0798E−03 | −3.4890E−02 | −3.5214E−02 | −9.2422E−03 |
| A14 = | 3.0592E−03 | −2.0744E−03 | 1.8842E−03 | 1.1551E−02 | 5.9332E−03 | 1.6498E−03 |
| A16 = | 5.6717E−10 | 2.1380E−04 | −2.4386E−04 | −1.3396E−03 | −3.8386E−04 | −1.0645E−04 |

| Surface # | 14 | 15 | 16 | 17 |
|---|---|---|---|---|
| k = | −1.5646E+01 | 3.0000E+00 | 3.0000E+00 | −5.7052E+00 |
| A4 = | 2.1807E−01 | 9.2867E−02 | −7.1382E−02 | −6.7243E−02 |
| A6 = | −2.8722E−01 | −1.2680E−01 | −3.0448E−02 | 9.5976E−03 |
| A8 = | 1.7069E−01 | 6.5586E−02 | 2.0903E−02 | 8.0719E−04 |
| A10 = | −5.5257E−02 | −1.8149E−02 | −4.5453E−03 | −6.3023E−04 |
| A12 = | 9.5908E−03 | 2.7414E−03 | 4.9389E−04 | 1.1085E−04 |
| A14 = | −8.0717E−04 | −2.1123E−04 | −2.7379E−05 | −8.7247E−06 |
| A16 = | 2.3571E−05 | 6.4688E−06 | 6.2003E−07 | 2.6242E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.90 | Y11/Y82 | 0.42 |
| Fno | 2.30 | Yc82/f | 0.26 |
| HFOV [deg.] | 38.4 | (R15 + R16)/(R15 − R16) | 0.93 |
| ΣCT/BL | 3.75 | R16/f | 0.45 |
| Sd/Td | 0.85 | f2/f1 | 0.14 |
| Td/f | 1.02 | |f7/f2| | 4.47 |
| Td/EPD | 2.35 | f/f123 | 0.81 |
| TL/ImgH | 1.47 | |f/f456| | 1.12 |
| ImgH/f | 0.82 | | |

8th Embodiment

Figure 15:
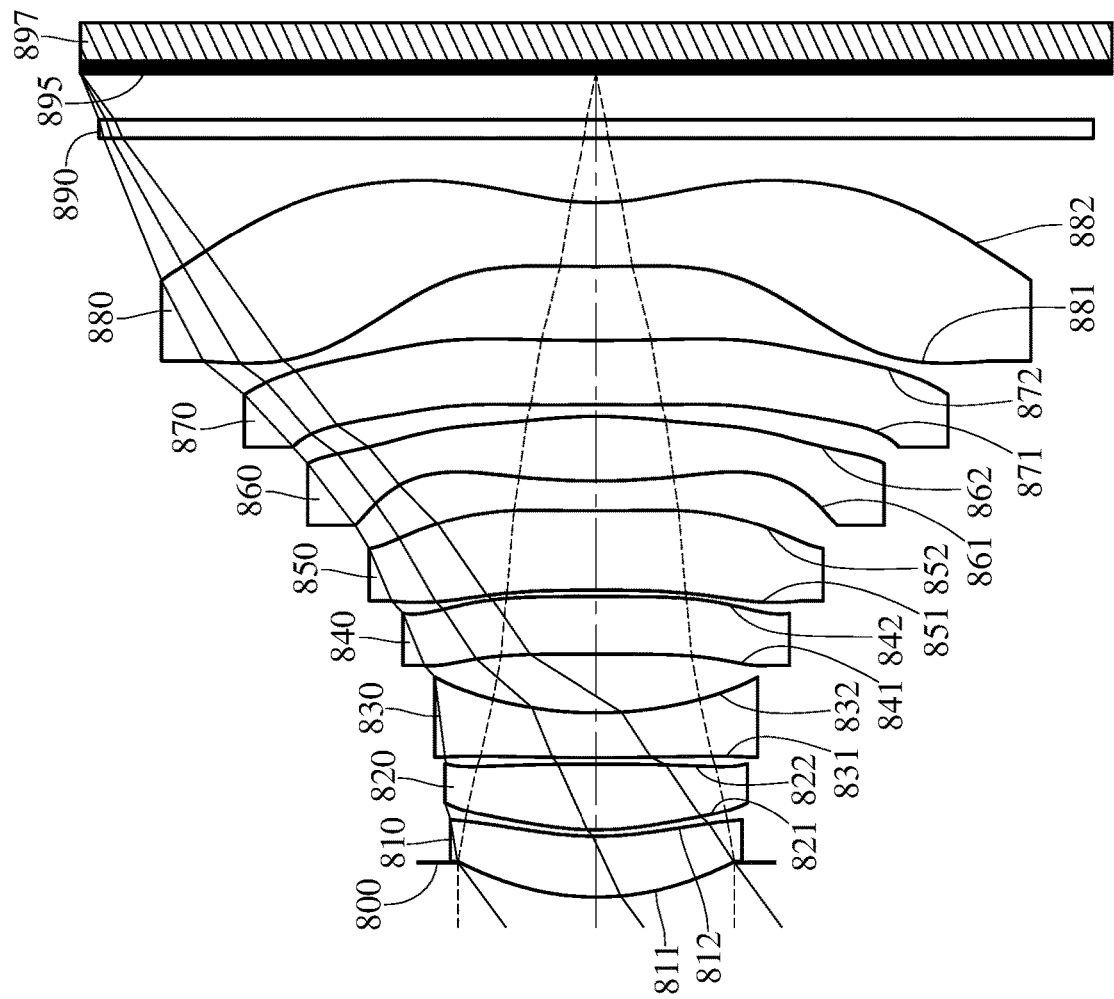
FIG. 15 is a schematic view of an image capturing unit according to the 8th embodiment of the present disclosure.
Figure 16:
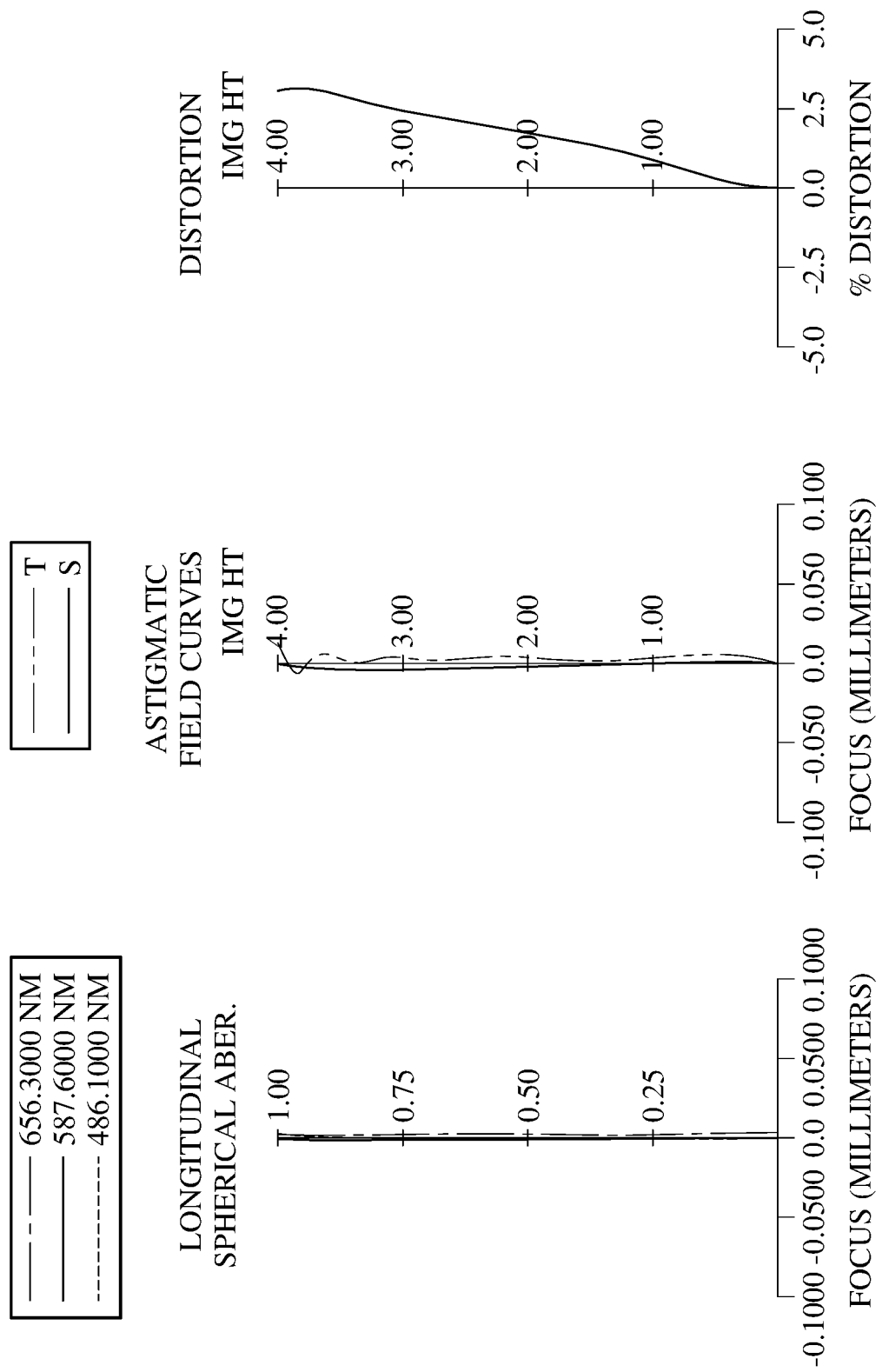
FIG. 16 shows spherical aberration curves, astigmatic field curves and a distortion curve of the image capturing unit according to the 8th embodiment.

FIG. 15 is a schematic view of an image capturing unit according to the 3rd embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens system (its reference numeral is omitted) of the present disclosure and an image sensor 897. The photographing optical lens system includes, in order from an object side to an image side, an aperture stop 800, a first lens element 810, a second lens element 820, a third lens element 830, a fourth lens element 840, a fifth lens element 850, a sixth lens element 860, a seventh lens element 870, an eighth lens element 880, an IR-cut filter 890 and an image surface 895, wherein the image sensor 897 is disposed on or near the image surface 895 of the photographing optical lens system, the photographing optical lens system has a total of eight lens elements (810-880). There is an air gap in a paraxial region between every two of the lens elements that are adjacent to each other.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The image-side surface 812 of the first lens element 810 has at least one inflection point.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric. The image-side surface 822 of the second lens element 820 has at least one inflection point.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has at least one inflection point.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric. Both the object-side surface 841 and the image-side surface 842 of the fourth lens element 840 have at least one inflection point.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. Both the object-side surface 851 and the image-side surface 852 of the fifth lens element 850 have at least one inflection point.

The sixth lens element 860 with positive refractive power has an object-side surface 861 being convex in a paraxial region thereof and an image-side surface 862 being convex in a paraxial region thereof. The sixth lens element 860 is made of plastic material and has the object-side surface 861 and the image-side surface 862 being both aspheric. Both the object-side surface 861 and the image-side surface 862 of the sixth lens element 860 have at least one inflection point.

The seventh lens element 870 with negative refractive power has an object-side surface 871 being concave in a paraxial region thereof and an image-side surface 872 being concave in a paraxial region thereof. The seventh lens element 870 is made of plastic material and has the object-side surface 871 and the image-side surface 872 being both aspheric. Both the object-side surface 871 and the image-side surface 872 of the seventh lens element 870 have at least one inflection point.

The eighth lens element 880 with negative refractive power has an object-side surface 881 being convex in a paraxial region thereof and an image-side surface 882 being concave in a paraxial region thereof. The eighth lens element 880 is made of plastic material and has the object-side surface 881 and the image-side surface 882 being both aspheric. The object-side surface 881 of the eighth lens element 880 has at least one inflection point. The image-side surface 882 of the eighth lens element 880 has at least one convex shape in an off-axis region thereof.

The IR-cut filter 890 is made of glass and located between the eighth lens element 880 and the image surface 895, and will not affect the focal length of the photographing optical lens system.

The detailed optical data of the 8th embodiment are shown in Table 15 and the aspheric surface data are shown in Table 16 below.

TABLE 15

8th Embodiment
f = 5.25 mm, Fno = 2.45, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.266 | | | | |
| 2 | Lens 1 | 2.159 | (ASP) | 0.471 | Plastic | 1.530 | 55.8 | 18.10 |
| 3 | | 2.576 | (ASP) | 0.050 | | | | |
| 4 | Lens 2 | 2.321 | (ASP) | 0.514 | Plastic | 1.544 | 55.9 | 3.98 |
| 5 | | −29.520 | (ASP) | 0.050 | | | | |
| 6 | Lens 3 | 22.394 | (ASP) | 0.350 | Plastic | 1.639 | 23.5 | −5.85 |
| 7 | | 3.182 | (ASP) | 0.454 | | | | |
| 8 | Lens 4 | −101.913 | (ASP) | 0.447 | Plastic | 1.544 | 55.9 | −127.10 |
| 9 | | 214.965 | (ASP) | 0.050 | | | | |
| 10 | Lens 5 | −27.597 | (ASP) | 0.619 | Plastic | 1.530 | 55.8 | −16.51 |
| 11 | | 12.909 | (ASP) | 0.232 | | | | |
| 12 | Lens 6 | 5.853 | (ASP) | 0.500 | Plastic | 1.544 | 55.9 | 3.95 |
| 13 | | −3.289 | (ASP) | 0.090 | | | | |
| 14 | Lens 7 | −31.040 | (ASP) | 0.500 | Plastic | 1.639 | 23.5 | −21.32 |
| 15 | | 24.401 | (ASP) | 0.573 | | | | |
| 16 | Lens 8 | 11.477 | (ASP) | 0.500 | Plastic | 1.544 | 55.9 | −4.34 |
| 17 | | 1.928 | (ASP) | 0.500 | | | | |
| 18 | IR-cut filter | Plano | | 0.145 | Glass | 1.517 | 64.2 | — |
| 19 | | Plano | | 0.356 | | | | |
| 20 | Image | Plano | | — | | | | |

Note:
Reference wavelength is 587.6 nm (d-line).

TABLE 16

Aspheric Coefficients

| Surface # | 2 | 3 | 4 | 5 | 6 | 7 |
|---|---|---|---|---|---|---|
| k = | −1.1173E+00 | −1.0470E+01 | −5.7611E−02 | −1.0000E+00 | −1.2723E+01 | 6.3789E−03 |
| A4 = | 8.8316E−03 | −3.7944E−02 | −1.1235E−01 | −2.4382E−02 | −2.1778E−02 | −3.3394E−03 |
| A6 = | 7.5525E−03 | −5.2898E−03 | 2.5228E−02 | 3.3087E−02 | 4.2418E−02 | 2.2913E−02 |
| A8 = | −1.7848E−02 | 1.2647E−02 | 8.7572E−03 | −3.3511E−02 | −5.0955E−02 | −3.1831E−02 |
| A10 = | 2.2627E−02 | −1.6575E−03 | −2.9187E−03 | 2.5480E−02 | 1.7727E−02 | 2.2662E−02 |
| A12 = | −1.9020E−02 | −2.5743E−03 | 6.5557E−03 | −4.2522E−03 | 5.6386E−03 | −6.9149E−03 |
| A14 = | 7.1247E−03 | −4.3887E−04 | −1.7328E−03 | 1.1001E−03 | −4.2319E−03 | 1.0005E−03 |
| A16 = | −1.2481E−03 | 4.3328E−04 | 1.6191E−11 | 5.9252E−12 | 1.8163E−11 | −1.2321E−04 |

| Surface # | 8 | 9 | 10 | 11 | 12 | 13 |
|---|---|---|---|---|---|---|
| k = | −5.0000E+01 | −5.0000E+01 | −5.0000E+01 | −2.0000E+01 | 7.2815E+00 | −2.4075E+01 |
| A4 = | −3.9124E−02 | −6.9947E−02 | −8.3134E−02 | −8.4335E−02 | 5.8262E−03 | 7.4309E−02 |
| A6 = | −8.5480E−03 | 8.9860E−03 | 3.8732E−02 | −1.0543E−02 | −1.9725E−02 | −3.0823E−02 |
| A8 = | −1.0463E−02 | 3.1519E−04 | 2.5736E−02 | 1.4706E−02 | −2.1269E−02 | −2.1700E−02 |
| A10 = | −1.3878E−03 | −2.7922E−03 | 1.5077E−04 | 7.6720E−03 | 1.6122E−02 | 1.8585E−02 |
| A12 = | 4.1908E−03 | 5.9093E−03 | −4.0007E−03 | −9.2211E−03 | −4.1165E−03 | −5.2679E−03 |
| A14 = | 2.1728E−03 | −2.2588E−03 | 1.8830E−03 | 2.8096E−03 | 2.8339E−04 | 6.7829E−04 |
| A16 = | −1.2555E−03 | 2.4227E−04 | −2.7172E−04 | −2.7966E−04 | 2.0457E−05 | −3.3852E−05 |

TABLE 16-continued

| Aspheric Coefficients | | | | |
|---|---|---|---|---|
| Surface # | 14 | 15 | 16 | 17 |
| k = | −1.9743E+01 | 3.0000E+00 | −2.0000E+01 | −6.0395E+00 |
| A4 = | 9.2727E−02 | 2.8093E−02 | −1.1630E−01 | −7.6739E−02 |
| A6 = | −1.3710E−01 | −6.6422E−02 | 1.5153E−02 | 2.2143E−02 |
| A8 = | 7.6565E−02 | 3.5331E−02 | 3.6199E−03 | −3.9970E−03 |
| A10 = | −2.2225E−02 | −9.2579E−03 | −1.2015E−03 | 4.4334E−04 |
| A12 = | 3.5526E−03 | 1.3274E−03 | 1.3732E−04 | −3.0376E−05 |
| A14 = | −2.9506E−04 | −1.0007E−04 | −7.3293E−06 | 1.2345E−06 |
| A16 = | 9.7340E−06 | 3.1062E−06 | 1.5341E−07 | −2.3431E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.25 | Y11/Y82 | 0.32 |
| Fno | 2.45 | Yc82/f | 0.26 |
| HFOV [deg.] | 36.5 | (R15 + R16)/(R15 − R16) | 1.40 |
| ΣCT/BL | 3.90 | R16/f | 0.37 |
| Sd/Td | 0.95 | f2/f1 | 0.22 |
| Td/f | 1.03 | |f7/f2| | 5.36 |
| Td/EPD | 2.52 | f/f123 | 0.84 |
| TL/ImgH | 1.60 | f/f456 | 1.03 |
| ImgH/f | 0.76 | | |

9th Embodiment

Figure 17:
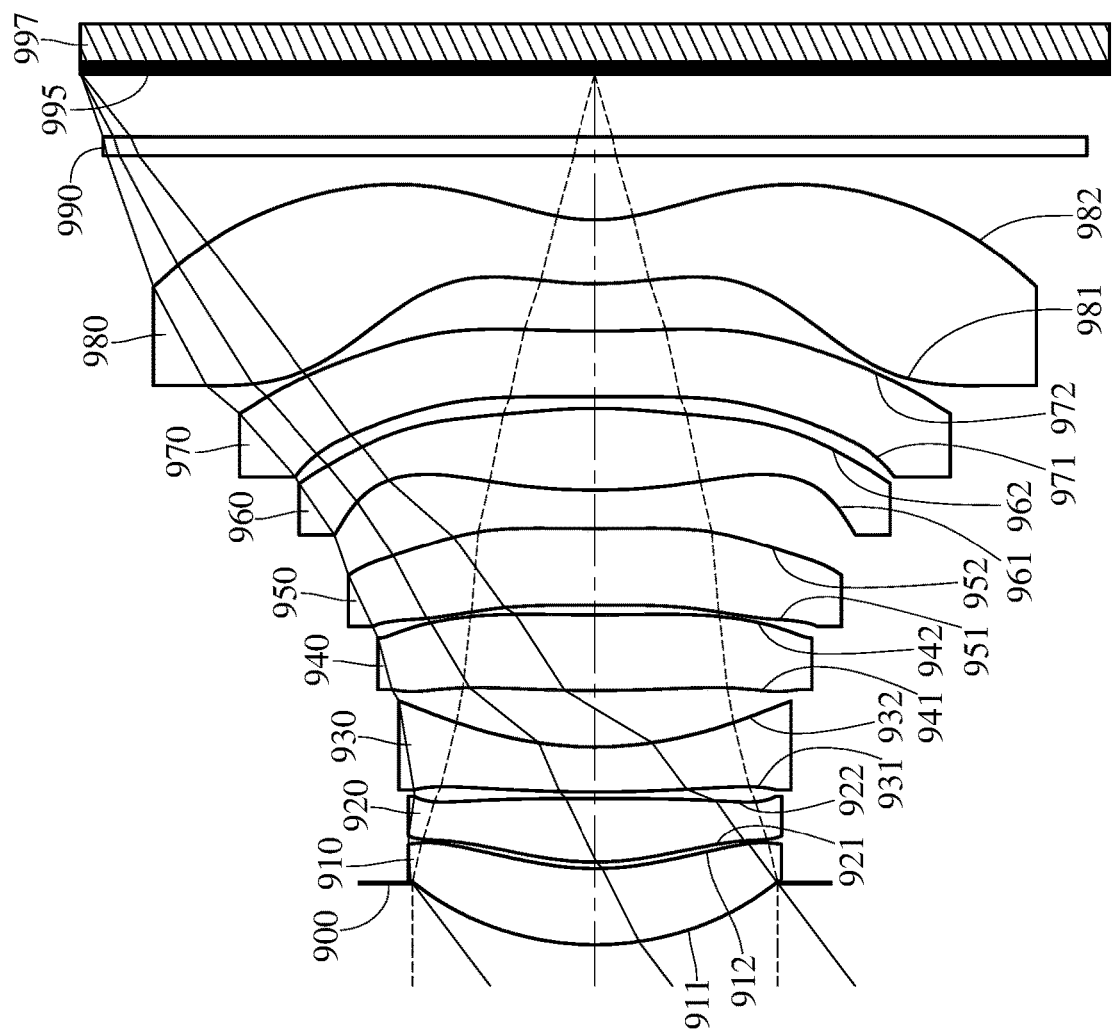
FIG. 17 is a schematic view of an image capturing unit according to the 9th embodiment of the present disclosure.
Figure 18:
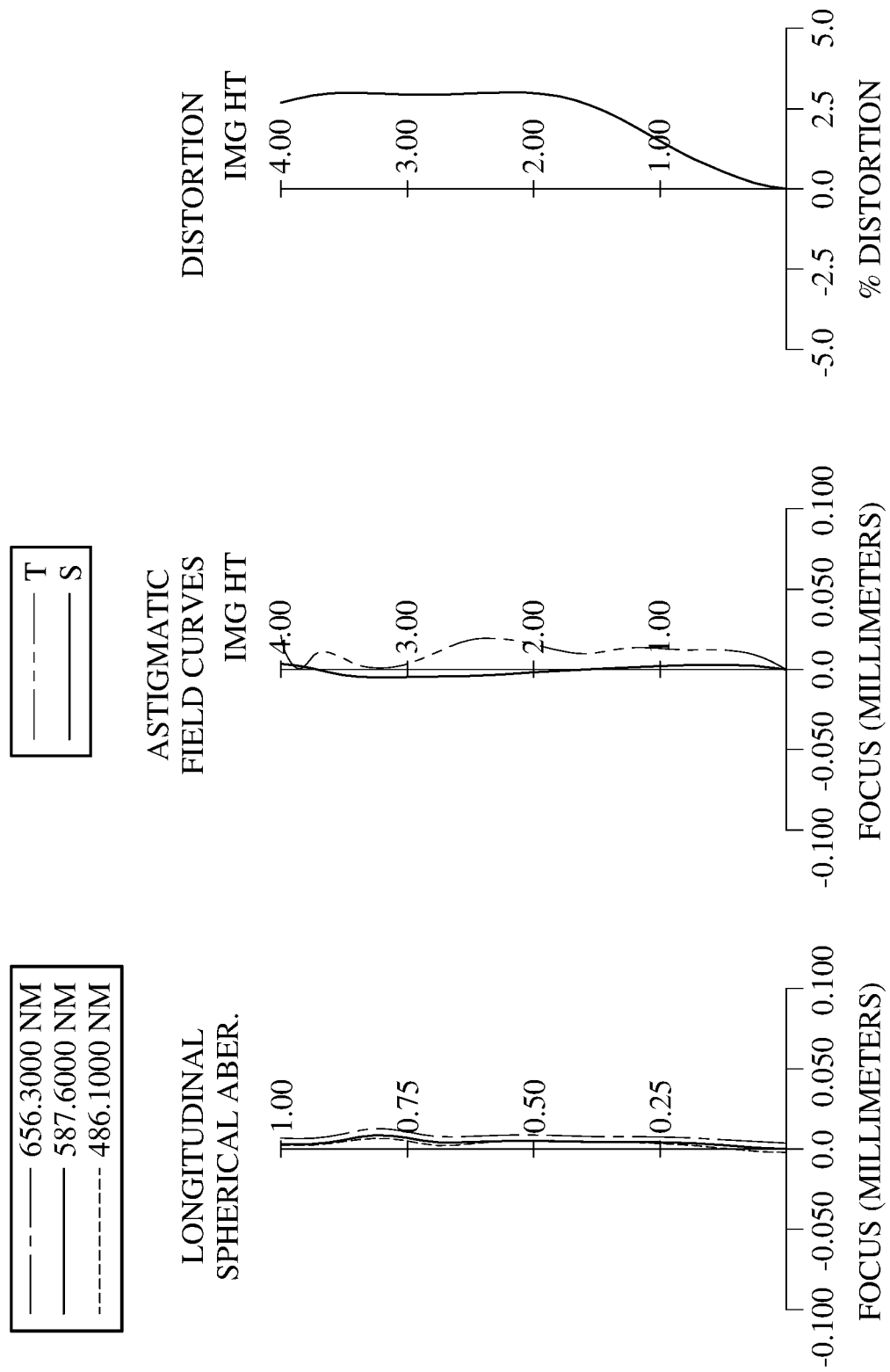
FIG. 18 shows spherical aberration curves, astigmatic field curves and a distortion curve of the image capturing unit according to the 9th embodiment.

FIG. 17 is a schematic view of an image capturing unit according to the 3rd embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens system (its reference numeral is omitted) of the present disclosure and an image sensor 997. The photographing optical lens system includes, in order from an object side to an image side, an aperture stop 900, a first lens element 910, a second lens element 920, a third lens element 930, a fourth lens element 940, a fifth lens element 950, a sixth lens element 960, a seventh lens element 970, an eighth lens element 980, an IR-cut filter 990 and an image surface 995, wherein the image sensor 997 is disposed on or near the image surface 995 of the photographing optical lens system, the photographing optical lens system has a total of eight lens elements (910-980). There is an air gap in a paraxial region between every two of the lens elements that are adjacent to each other.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. Both the object-side surface 911 and the image-side surface 912 of the first lens element 910 have at least one inflection point.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric. Both the object-side surface 921 and the image-side surface 922 of the second lens element 920 have at least one inflection point.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has at least one inflection point.

The fourth lens element 940 with positive refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. Both the object-side surface 941 and the image-side surface 942 of the fourth lens element 940 have at least one inflection point.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. Both the object-side surface 951 and the image-side surface 952 of the fifth lens element 950 have at least one inflection point.

The sixth lens element 960 with positive refractive power has an object-side surface 961 being convex in a paraxial region thereof and an image-side surface 962 being convex in a paraxial region thereof. The sixth lens element 960 is made of plastic material and has the object-side surface 961 and the image-side surface 962 being both aspheric. Both the object-side surface 961 and the image-side surface 962 of the sixth lens element 960 have at least one inflection point.

The seventh lens element 970 with negative refractive power has an object-side surface 971 being planar in a paraxial region thereof and an image-side surface 972 being concave in a paraxial region thereof. The seventh lens element 970 is made of plastic material and has the object-side surface 971 and the image-side surface 972 being both aspheric. Both the object-side surface 971 and the image-side surface 972 of the seventh lens element 970 have at least one inflection point.

The eighth lens element 980 with negative refractive power has an object-side surface 981 being convex in a paraxial region thereof and an image-side surface 982 being concave in a paraxial region thereof. The eighth lens element 980 is made of plastic material and has the object-side surface 981 and the image-side surface 982 being both aspheric. The object-side surface 981 of the eighth lens element 980 has at least one inflection point. The image-side surface 982 of the eighth lens element 980 has at least one convex shape in an off-axis region thereof.

The IR-cut filter 990 is made of glass and located between the eighth lens element 980 and the image surface 995, and will not affect the focal length of the photographing optical lens system.

The detailed optical data of the 9th embodiment are shown in Table 17 and the aspheric surface data are shown in Table 18 below.

TABLE 17

9th Embodiment
f = 5.16 mm, Fno = 1.82, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.480 | | | | |
| 2 | Lens 1 | 2.365 | (ASP) | 0.592 | Plastic | 1.530 | 55.8 | 169.12 |
| 3 | | 2.218 | (ASP) | 0.050 | | | | |
| 4 | Lens 2 | 2.164 | (ASP) | 0.500 | Plastic | 1.544 | 55.9 | 3.90 |
| 5 | | −104.892 | (ASP) | 0.050 | | | | |
| 6 | Lens 3 | 9.517 | (ASP) | 0.350 | Plastic | 1.639 | 23.5 | −6.61 |
| 7 | | 2.883 | (ASP) | 0.438 | | | | |
| 8 | Lens 4 | 10.935 | (ASP) | 0.587 | Plastic | 1.544 | 55.9 | 95.62 |
| 9 | | 13.582 | (ASP) | 0.077 | | | | |
| 10 | Lens 5 | 101.913 | (ASP) | 0.600 | Plastic | 1.544 | 55.9 | −38.13 |
| 11 | | 17.202 | (ASP) | 0.300 | | | | |
| 12 | Lens 6 | 5.371 | (ASP) | 0.635 | Plastic | 1.544 | 55.9 | 4.33 |
| 13 | | −4.027 | (ASP) | 0.090 | | | | |
| 14 | Lens 7 | ∞ | (ASP) | 0.510 | Plastic | 1.639 | 23.5 | −14.92 |
| 15 | | 9.532 | (ASP) | 0.368 | | | | |
| 16 | Lens 8 | 2.742 | (ASP) | 0.500 | Plastic | 1.544 | 55.9 | −6.29 |
| 17 | | 1.424 | (ASP) | 0.500 | | | | |
| 18 | IR-cut filter | Plano | | 0.145 | Glass | 1.517 | 64.2 | — |
| 19 | | Plano | | 0.486 | | | | |
| 20 | Image | Plano | | — | | | | |

Note:
Reference wavelength is 587.6 nm (d-line).

TABLE 18

Aspheric Coefficients

| Surface # | 2 | 3 | 4 | 5 | 6 | 7 |
|---|---|---|---|---|---|---|
| k = | −6.1633E−01 | −4.6935E+00 | −1.6696E−01 | −1.0000E+00 | −5.0000E+01 | −3.6749E+00 |
| A4 = | 4.1471E−03 | −3.7944E−02 | −9.6723E−02 | −3.5264E−02 | −4.0153E−02 | −9.3531E−03 |
| A6 = | 1.3823E−02 | −5.2898E−03 | −1.0946E−02 | 3.9482E−02 | 6.8981E−02 | 3.4304E−02 |
| A8 = | −2.7045E−02 | 1.2647E−02 | 1.5466E−02 | −3.3636E−02 | −5.4246E−02 | −3.7266E−02 |
| A10 = | 3.7565E−02 | −1.6575E−03 | −8.1248E−04 | 1.7693E−02 | 1.2851E−02 | 2.1110E−02 |
| A12 = | −2.8085E−02 | −2.5743E−03 | −2.8312E−03 | −5.5380E−03 | 4.2199E−03 | −6.7535E−03 |
| A14 = | 1.0875E−02 | −4.3887E−04 | 1.5711E−04 | 1.5632E−03 | −2.9487E−03 | 1.2829E−03 |
| A16 = | −1.7349E−03 | 4.3328E−04 | 3.6681E−04 | −5.5765E−05 | 3.9469E−04 | −1.4186E−04 |

| Surface # | 8 | 9 | 10 | 11 | 12 | 13 |
|---|---|---|---|---|---|---|
| k = | 2.5558E+00 | −4.0832E+01 | −5.0000E+01 | −2.0000E+01 | 5.5981E+00 | −8.7463E+00 |
| A4 = | −1.8886E−02 | −7.2596E−02 | −1.1236E−01 | −6.8599E−02 | 3.9586E−02 | 7.3517E−02 |
| A6 = | −4.1268E−03 | 2.6352E−02 | 4.4805E−02 | −4.3923E−02 | −6.5741E−02 | −3.4583E−02 |
| A8 = | 5.8229E−04 | −1.8597E−03 | 5.1484E−03 | 6.1911E−02 | 3.0873E−02 | −4.3841E−03 |
| A10 = | −4.2897E−03 | −6.8013E−03 | 3.1831E−04 | −3.1864E−02 | −1.1553E−02 | 6.3986E−03 |
| A12 = | 8.4564E−04 | 5.4807E−03 | −4.5513E−03 | 9.6080E−03 | 3.2870E−03 | −1.8407E−03 |
| A14 = | 1.4836E−03 | −2.0808E−03 | 1.7160E−03 | −1.6484E−03 | −6.0720E−04 | 2.3833E−04 |
| A16 = | −4.2040E−04 | 3.1025E−04 | −1.9980E−04 | 1.1898E−04 | 4.7269E−05 | −1.2123E−05 |

| Surface # | 14 | 15 | 16 | 17 |
|---|---|---|---|---|
| k = | 0.0000E+00 | −1.4392E+01 | −2.0000E+01 | −4.2848E+00 |
| A4 = | −4.4898E−03 | −3.4323E−02 | −8.1983E−02 | −7.4151E−02 |
| A6 = | −4.7834E−02 | −1.9783E−02 | −2.1184E−02 | 1.9138E−02 |
| A8 = | 3.2977E−02 | 1.5191E−02 | 1.5720E−02 | −3.4425E−03 |
| A10 = | −1.1111E−02 | −4.3713E−03 | −3.2459E−03 | 4.3310E−04 |
| A12 = | 2.1352E−03 | 6.6283E−04 | 3.2905E−04 | −3.5604E−05 |
| A14 = | −2.2329E−04 | −5.2582E−05 | −1.6885E−05 | 1.6618E−06 |
| A16 = | 9.6511E−06 | 1.7195E−06 | 3.5196E−07 | −3.2780E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.16 | Y11/Y82 | 0.42 |
| Fno | 1.82 | Yc82/f | 0.30 |
| HFOV [deg.] | 37.0 | (R15 + R16)/(R15 − R16) | 3.16 |
| ΣCT/BL | 3.78 | R16/f | 0.28 |
| Sd/Td | 0.91 | f2/f1 | 0.02 |
| Td/f | 1.09 | |f7/f2| | 3.83 |
| Td/EPD | 1.99 | f/f123 | 0.65 |
| TL/ImgH | 1.69 | |f/f456| | 1.09 |
| ImgH/f | 0.78 | | |

10th Embodiment

Figure 19:
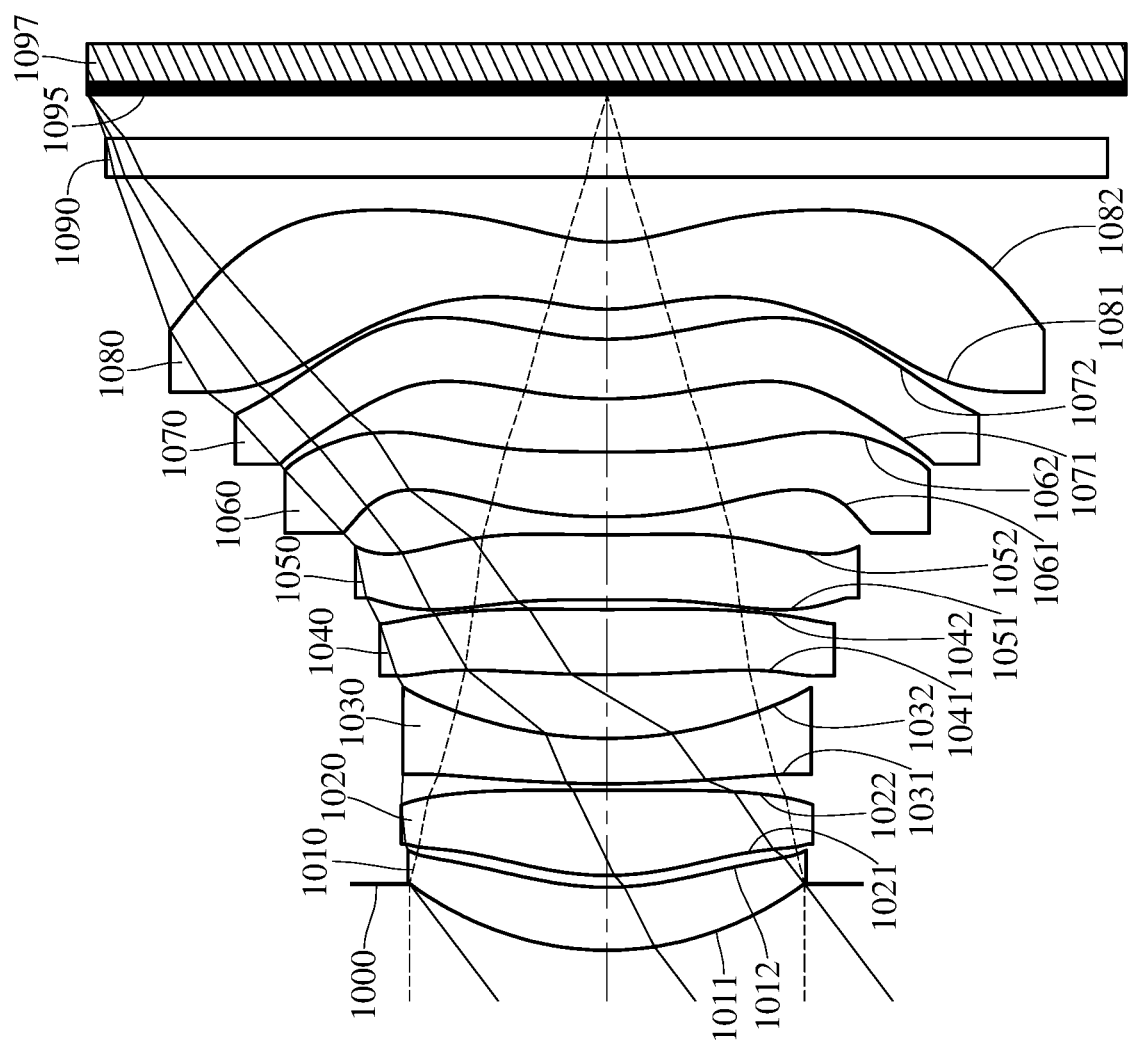
FIG. 19 is a schematic view of an image capturing unit according to the 10th embodiment of the present disclosure.
Figure 20:
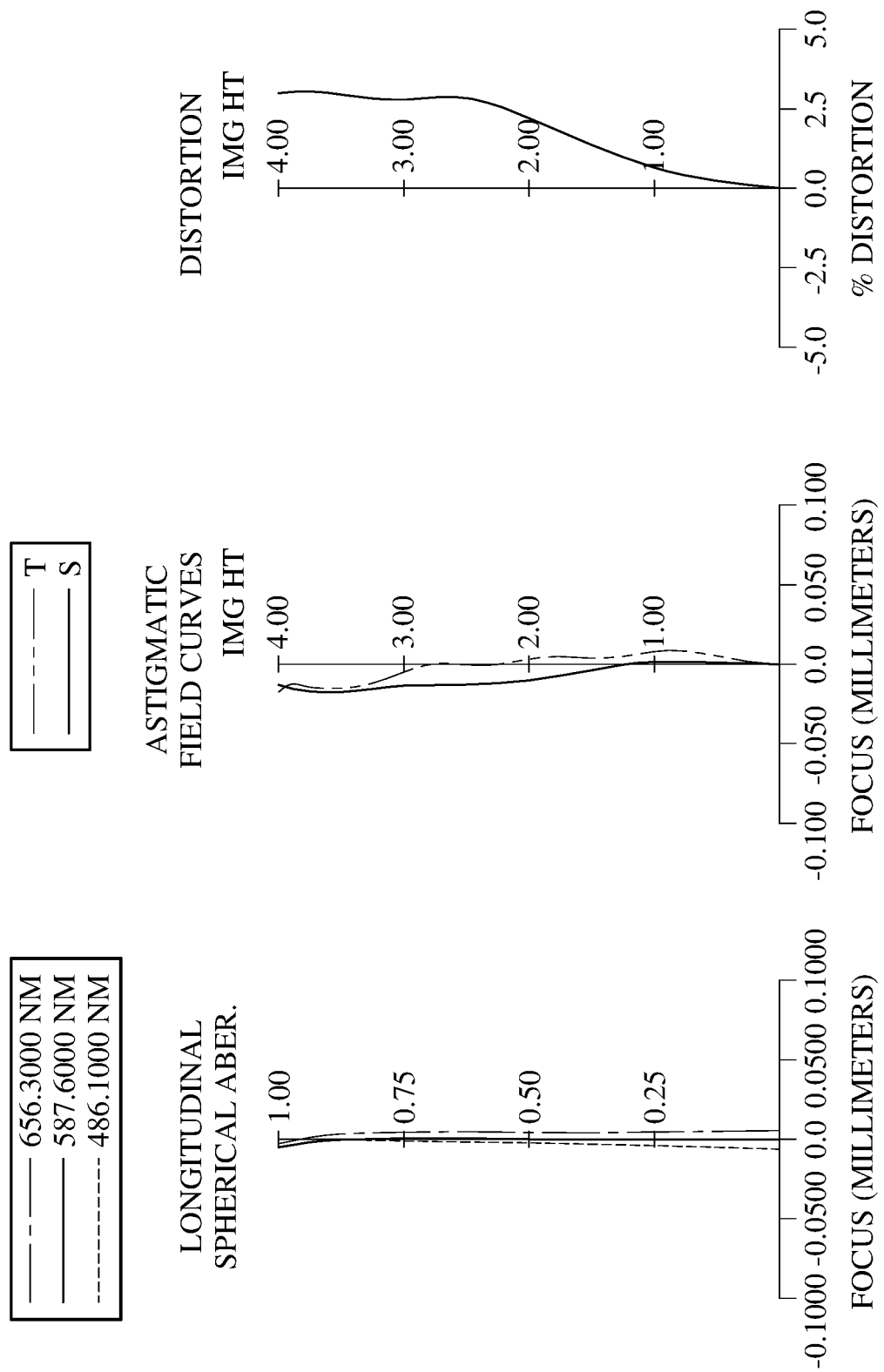
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens system (its reference numeral is omitted) of the present disclosure and an image sensor 1090. The photographing optical lens system includes, in order from an object side to an image side, an aperture stop 1000, a first lens element 1010, a second lens element 1020, a third lens element 1030, a fourth lens element 1040, a fifth lens element 1050, a sixth lens element 1060, a seventh lens element 1070, an eighth lens element 1080, an IR-cut filter 1090 and an image surface 1095, wherein the image sensor 1097 is disposed on or near the image surface 1095 of the photographing optical lens system, the photographing optical lens system has a total of eight lens elements (1010-1080). There is an air gap in a paraxial region between every two of the lens elements that are adjacent to each other.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The image-side surface 1012 of the first lens element 1010 has at least one inflection point.

The second lens element 1020 with positive refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric. Both the object-side surface 1021 and the image-side surface 1022 of the second lens element 1020 have at least one inflection point.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has at least one inflection point.

The fourth lens element 1040 with positive refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. Both the object-side surface 1041 and the image-side surface 1042 of the fourth lens element 1040 have at least one inflection point.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. Both the object-side surface 1051 and the image-side surface 1052 of the fifth lens element 1050 have at least one inflection point.

The sixth lens element 1060 with positive refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. Both the object-side surface 1061 and the image-side surface 1062 of the sixth lens element 1060 have at least one inflection point.

The seventh lens element 1070 with negative refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric. Both the object-side surface 1071 and the image-side surface 1072 of the seventh lens element 1070 have at least one inflection point.

The eighth lens element 1080 with positive refractive power has an object-side surface 1081 being convex in a paraxial region thereof and an image-side surface 1082 being concave in a paraxial region thereof. The eighth lens element 1080 is made of plastic material and has the object-side surface 1081 and the image-side surface 1082 being both aspheric. The object-side surface 1081 of the eighth lens element 1080 has at least one inflection point. The image-side surface 1082 of the eighth lens element 1080 has at least one convex shape in an off-axis region thereof.

The IR-cut filter 1090 is made of glass and located between the eighth lens element 1080 and the image surface 1095, and will not affect the focal length of the photographing optical lens system.

The detailed optical data of the 10th embodiment are shown in Table 19 and the aspheric surface data are shown in Table 20 below.

TABLE 19

10th Embodiment
f = 5.14 mm, Fno = 1.69, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.511 | | | | |
| 2 | Lens 1 | 2.378 | (ASP) | 0.486 | Plastic | 1.530 | 55.8 | 489.74 |
| 3 | | 2.230 | (ASP) | 0.091 | | | | |
| 4 | Lens 2 | 2.186 | (ASP) | 0.657 | Plastic | 1.544 | 56.0 | 4.17 |
| 5 | | 54.015 | (ASP) | 0.050 | | | | |
| 6 | Lens 3 | 7.787 | (ASP) | 0.350 | Plastic | 1.660 | 20.4 | −8.25 |
| 7 | | 3.147 | (ASP) | 0.492 | | | | |
| 8 | Lens 4 | 9.802 | (ASP) | 0.501 | Plastic | 1.544 | 56.0 | 48.46 |
| 9 | | 15.324 | (ASP) | 0.076 | | | | |
| 10 | Lens 5 | 101.913 | (ASP) | 0.505 | Plastic | 1.544 | 56.0 | −24.38 |
| 11 | | 11.717 | (ASP) | 0.140 | | | | |
| 12 | Lens 6 | 4.554 | (ASP) | 0.500 | Plastic | 1.544 | 56.0 | 8.76 |
| 13 | | 98.696 | (ASP) | 0.409 | | | | |
| 14 | Lens 7 | 2.925 | (ASP) | 0.459 | Plastic | 1.639 | 23.5 | −9.92 |
| 15 | | 1.879 | (ASP) | 0.232 | | | | |
| 16 | Lens 8 | 1.459 | (ASP) | 0.518 | Plastic | 1.544 | 56.0 | 102.59 |
| 17 | | 1.311 | (ASP) | 0.500 | | | | |
| 18 | IR-cut filter | Plano | | 0.300 | Glass | 1.517 | 64.2 | — |
| 19 | | Plano | | 0.334 | | | | |
| 20 | Image | Plano | | — | | | | |

Note:
Reference wavelength is 587.6 nm (d-line).

TABLE 20

Aspheric Coefficients

| Surface # | 2 | 3 | 4 | 5 | 6 | 7 |
|---|---|---|---|---|---|---|
| k = | −9.8108E−01 | −3.6952E+00 | −9.3134E−02 | −1.0000E+00 | −1.1519E+01 | −4.3052E+00 |
| A4 = | −6.0307E−04 | −4.4573E−02 | −7.8639E−02 | −3.2314E−02 | −3.6378E−02 | −3.3118E−03 |
| A6 = | 1.8274E−03 | 2.6111E−03 | 2.0735E−02 | 2.3386E−02 | 4.3720E−02 | 2.4048E−02 |
| A8 = | 3.7792E−03 | 8.0974E−03 | −8.3987E−03 | −1.9581E−02 | −2.5581E−02 | −2.0242E−02 |
| A10 = | −4.6591E−03 | −1.0522E−02 | 8.0907E−03 | 8.4297E−03 | 4.4103E−03 | 8.5976E−03 |
| A12 = | 2.7599E−03 | 7.0875E−03 | −3.1393E−03 | −1.8996E−03 | 1.3129E−03 | −2.2355E−03 |
| A14 = | −8.9818E−04 | −2.4320E−03 | 7.3571E−04 | 2.6301E−04 | −6.6982E−04 | 4.1180E−04 |
| A16 = | 1.2767E−04 | 3.7942E−04 | −6.1766E−05 | −3.4897E−05 | 8.2904E−05 | −2.7832E−05 |

| Surface # | 8 | 9 | 10 | 11 | 12 | 13 |
|---|---|---|---|---|---|---|
| k = | 1.5341E+00 | −5.0000E+01 | −2.4914E+01 | −1.8747E+01 | 3.6755E+00 | −1.0000E+00 |
| A4 = | −1.1167E−02 | −7.8251E−02 | −1.3936E−01 | −7.3602E−02 | 7.0596E−02 | 8.8705E−02 |
| A6 = | −5.4080E−03 | 6.5959E−02 | 1.3207E−01 | −5.9464E−03 | −9.6064E−02 | −3.9894E−02 |
| A8 = | 4.9325E−04 | −3.9078E−02 | −7.4470E−02 | 2.4388E−02 | 5.9794E−02 | 4.8039E−03 |
| A10 = | −1.8069E−03 | 1.4042E−02 | 3.3551E−02 | −1.2809E−02 | −2.7626E−02 | 9.0214E−04 |
| A12 = | 1.5440E−04 | −2.8544E−03 | −1.0407E−02 | 3.5994E−03 | 8.0321E−03 | −4.2237E−04 |
| A14 = | 4.1865E−04 | 2.3073E−04 | 1.8464E−03 | −5.0084E−04 | −1.3266E−03 | 6.2122E−05 |
| A16 = | −7.9240E−05 | 8.8830E−06 | −1.3982E−04 | 2.5693E−05 | 9.2682E−05 | −3.3596E−06 |

| Surface # | 14 | 15 | 16 | 17 |
|---|---|---|---|---|
| k = | 0.0000E+00 | −2.0000E+01 | −1.2163E+01 | −7.1627E+00 |
| A4 = | −5.7697E−02 | 1.0521E−02 | −1.5848E−01 | −7.4149E−02 |
| A6 = | 9.8666E−03 | −2.2081E−02 | 7.1332E−02 | 2.4750E−02 |
| A8 = | −1.4711E−02 | 3.1294E−03 | −1.9746E−02 | −4.2144E−03 |
| A10 = | 6.5394E−03 | 4.4537E−04 | 3.2665E−03 | 3.0069E−04 |
| A12 = | −1.2754E−03 | −1.5843E−04 | −3.0793E−04 | 1.0423E−06 |
| A14 = | 1.1892E−04 | 1.5536E−05 | 1.5290E−05 | −1.2504E−06 |
| A16 = | −4.4003E−06 | −5.3342E−07 | −3.1104E−07 | 4.6955E−08 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 5.14 | Y11/Y82 | 0.45 |
| Fno | 1.69 | Yc82/f | 0.33 |
| HFOV [deg.] | 37.1 | (R15 + R16)/(R15 − R16) | 18.68 |
| ΣCT/BL | 3.51 | R16/f | 0.25 |
| Sd/Td | 0.91 | f2/f1 | 0.01 |
| Td/f | 1.06 | |f7/f2| | 2.38 |
| Td/EPD | 1.80 | f/f123 | 0.70 |
| TL/ImgH | 1.65 | |f/f456| | 0.47 |
| ImgH/f | 0.78 | | |

11th Embodiment

Figure 21:
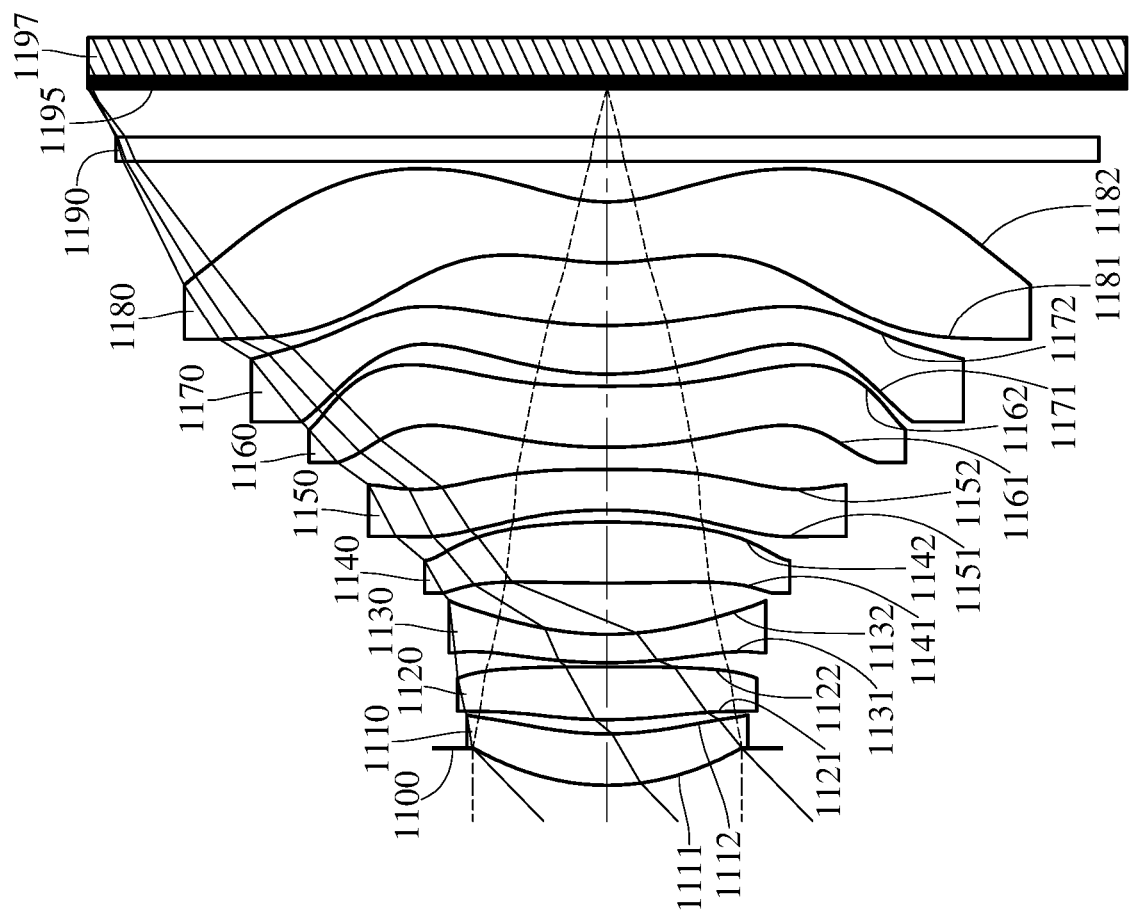
FIG. 21 is a schematic view of an image capturing unit according to the 11th embodiment of the present disclosure.
Figure 22:
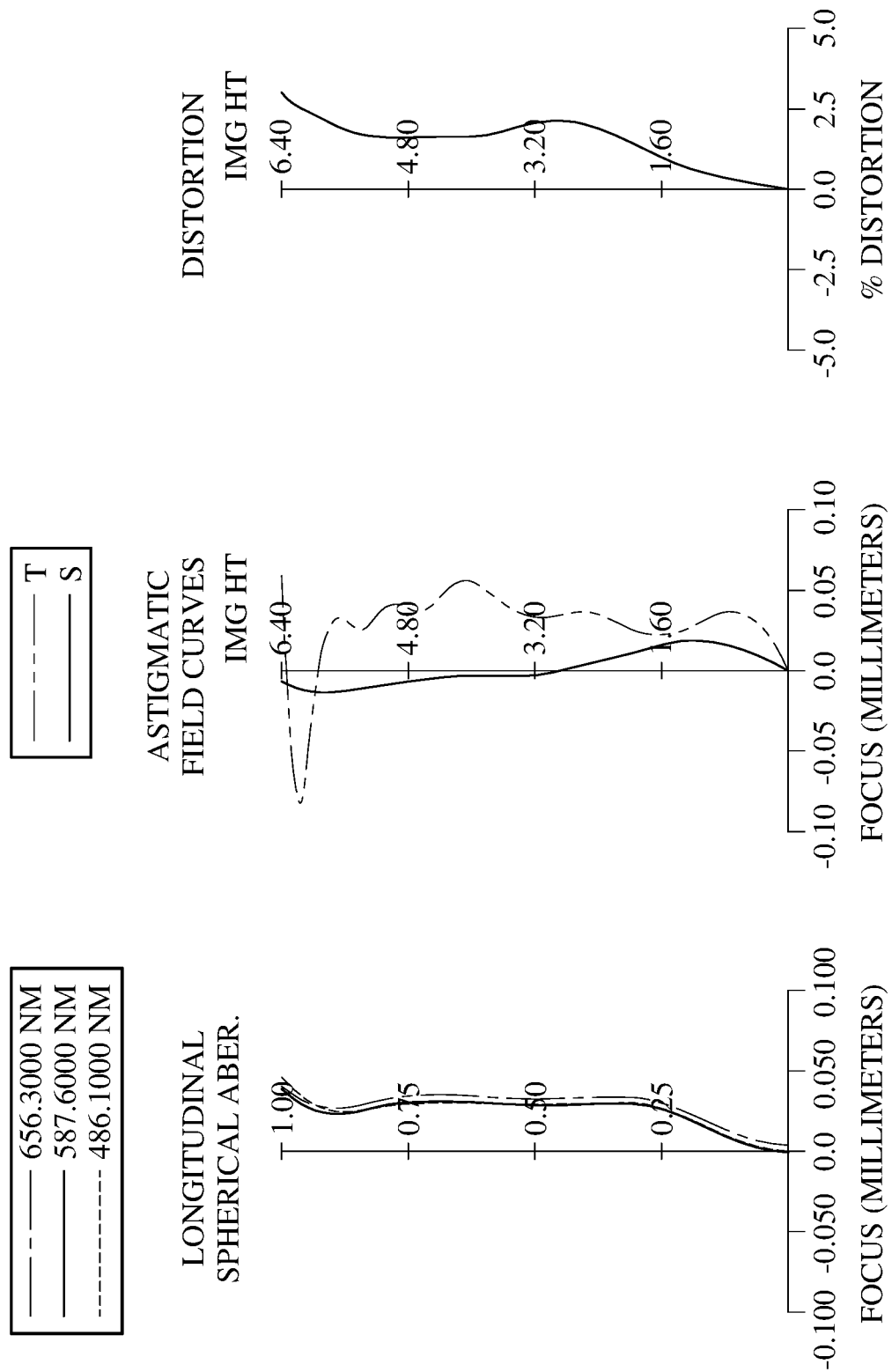
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the photographing optical lens system (its reference numeral is omitted) of the present disclosure and an image sensor 1197. The photographing optical lens system includes, in order from an object side to an image side, an aperture stop 1100, a first lens element 1110, a second lens element 1120, a third lens element 1130, a fourth lens element 1140, a fifth lens element 1150, a sixth lens element 1160, a seventh lens element 1170, an eighth lens element 1180, an IR-cut filter 1190 and an image surface 1195, wherein the image sensor 1197 is disposed on or near the image surface 1195 of the photographing optical lens system, the photographing optical lens system has a total of eight lens elements (1110-1180). There is an air gap in a paraxial region between every two of the lens elements that are adjacent to each other.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric. The image-side surface 1112 of the first lens element 1110 has at least one inflection point.

The second lens element 1120 with positive refractive power has an object-side surface 1121 being convex in a paraxial region thereof and an image-side surface 1122 being convex in a paraxial region thereof. The second lens element 1120 is made of plastic material and has the object-side surface 1121 and the image-side surface 1122 being both aspheric. The object-side surface 1121 of the second lens element 1120 has at least one inflection point.

The third lens element 1130 with negative refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric. The object-side surface 1131 of the third lens element 1130 has at least one inflection point.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric. Both the object-side surface 1141 and the image-side surface 1142 of the fourth lens element 1140 have at least one inflection point.

The fifth lens element 1150 with negative refractive power has an object-side surface 1151 being concave in a paraxial region thereof and an image-side surface 1152 being convex in a paraxial region thereof. The fifth lens element 1150 is made of plastic material and has the object-side surface 1151 and the image-side surface 1152 being both aspheric. The image-side surface 1152 of the fifth lens element 1150 has at least one inflection point.

The sixth lens element 1160 with positive refractive power has an object-side surface 1161 being convex in a paraxial region thereof and an image-side surface 1162 being concave in a paraxial region thereof. The sixth lens element 1160 is made of plastic material and has the object-side surface 1161 and the image-side surface 1162 being both aspheric. Both the object-side surface 1161 and the image-side surface 1162 of the sixth lens element 1160 have at least one inflection point.

The seventh lens element 1170 with positive refractive power has an object-side surface 1171 being convex in a paraxial region thereof and an image-side surface 1172 being concave in a paraxial region thereof. The seventh lens element 1170 is made of plastic material and has the object-side surface 1171 and the image-side surface 1172 being both aspheric. Both the object-side surface 1171 and the image-side surface 1172 of the seventh lens element 1170 have at least one inflection point.

The eighth lens element 1180 with negative refractive power has an object-side surface 1181 being convex in a paraxial region thereof and an image-side surface 1182 being concave in a paraxial region thereof. The eighth lens element 1180 is made of plastic material and has the object-side surface 1181 and the image-side surface 1182 being both aspheric. The object-side surface 1181 of the eighth lens element 1180 has at least one inflection point. The image-side surface 1182 of the eighth lens element 1180 has at least one convex shape in an off-axis region thereof.

The IR-cut filter 1190 is made of glass and located between the eighth lens element 1180 and the image surface 1195, and will not affect the focal length of the photographing optical lens system.

The detailed optical data of the 11th embodiment are shown in Table 21 and the aspheric surface data are shown in Table 22 below.

TABLE 21

11th Embodiment
f = 6.41 mm, Fno = 1.93, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.456 | | | | |
| 2 | Lens 1 | 3.064 | (ASP) | 0.633 | Plastic | 1.544 | 55.9 | 17.88 |
| 3 | | 4.147 | (ASP) | 0.176 | | | | |

TABLE 21-continued

11th Embodiment
f = 6.41 mm, Fno = 1.93, HFOV = 44.0 deg.

| Surface # | | Curvature Radius | | Thickness | Material | Index | Abbe # | Focal Length |
|---|---|---|---|---|---|---|---|---|
| 4 | Lens 2 | 5.668 | (ASP) | 0.652 | Plastic | 1.544 | 55.9 | 10.04 |
| 5 | | −143.351 | (ASP) | 0.050 | | | | |
| 6 | Lens 3 | 6.037 | (ASP) | 0.350 | Plastic | 1.660 | 20.3 | −17.84 |
| 7 | | 3.899 | (ASP) | 0.633 | | | | |
| 8 | Lens 4 | 26.729 | (ASP) | 0.752 | Plastic | 1.544 | 55.9 | 12.96 |
| 9 | | −9.478 | (ASP) | 0.148 | | | | |
| 10 | Lens 5 | −6.084 | (ASP) | 0.500 | Plastic | 1.660 | 20.3 | −9.73 |
| 11 | | −118.455 | (ASP) | 0.275 | | | | |
| 12 | Lens 6 | 5.852 | (ASP) | 0.753 | Plastic | 1.544 | 55.9 | 14.29 |
| 13 | | 22.628 | (ASP) | 0.148 | | | | |
| 14 | Lens 7 | 4.014 | (ASP) | 0.600 | Plastic | 1.660 | 20.3 | 20.60 |
| 15 | | 5.356 | (ASP) | 0.782 | | | | |
| 16 | Lens 8 | 3.284 | (ASP) | 0.750 | Plastic | 1.632 | 23.4 | −8.64 |
| 17 | | 1.870 | (ASP) | 0.500 | | | | |
| 18 | IR-cut filter | Plano | | 0.300 | Glass | 1.517 | 64.2 | — |
| 19 | | Plano | | 0.596 | | | | |
| 20 | Image | Plano | | — | | | | |

Note:
Reference wavelength is 587.6 nm (d-line).

TABLE 22

Aspheric Coefficients

| Surface # | 2 | 3 | 4 | 5 | 6 | 7 |
|---|---|---|---|---|---|---|
| k = | −8.1870E−01 | −3.4704E+00 | 6.6794E−01 | −1.0000E+00 | −1.1173E+01 | −5.3583E+00 |
| A4 = | −2.9022E−04 | −5.7097E−03 | −1.6616E−02 | −9.4157E−03 | −7.7028E−03 | −1.7777E−04 |
| A6 = | 3.3745E−03 | −6.6698E−03 | −2.8175E−03 | 7.1783E−04 | 3.4461E−03 | 1.9724E−03 |
| A8 = | −4.4509E−03 | 5.8047E−03 | −4.3049E−05 | −4.2134E−04 | −1.4246E−03 | −9.8895E−04 |
| A10 = | 3.2471E−03 | −4.5722E−03 | −2.3890E−04 | 1.5548E−04 | 1.4459E−05 | 1.1766E−04 |
| A12 = | −1.3370E−03 | 2.1590E−03 | 5.3485E−04 | −3.5506E−05 | 1.2369E−05 | −1.8125E−06 |
| A14 = | 2.8507E−04 | −5.3559E−04 | −2.0655E−04 | −3.0015E−06 | 4.3660E−07 | 2.5777E−06 |
| A16 = | −2.4708E−05 | 5.6847E−05 | 2.7164E−05 | 3.3368E−07 | 4.8966E−07 | 1.3015E−08 |

| Surface # | 8 | 9 | 10 | 11 | 12 | 13 |
|---|---|---|---|---|---|---|
| k = | −1.1423E+01 | −1.0000E+00 | −3.8457E+01 | −1.4250E+01 | 1.5358E+00 | −1.0000E+00 |
| A4 = | −3.1141E−03 | −4.2187E−03 | −4.9834E−02 | −5.3348E−02 | −5.3635E−03 | 3.1933E−02 |
| A6 = | −3.0832E−03 | −6.8689E−03 | 3.3078E−02 | 2.7876E−02 | 1.3915E−03 | −1.1407E−02 |
| A8 = | −3.8056E−04 | −5.5245E−04 | −1.3389E−02 | −9.2428E−03 | −8.8019E−04 | 2.3271E−03 |
| A10 = | 9.4417E−04 | 9.6450E−05 | 3.4395E−03 | 1.9058E−03 | 1.7318E−04 | −3.3395E−04 |
| A12 = | −4.7063E−04 | 3.2080E−05 | −5.1114E−04 | −2.2204E−04 | −2.2562E−05 | 2.9562E−05 |
| A14 = | 8.8687E−05 | −1.6714E−05 | 4.0067E−05 | 1.3400E−05 | 1.7043E−06 | −1.4356E−06 |
| A16 = | −5.1551E−06 | 2.1223E−06 | −1.2929E−06 | −3.2827E−07 | −5.1067E−08 | 2.9210E−08 |

| Surface # | 14 | 15 | 16 | 17 |
|---|---|---|---|---|
| k = | −1.0530E−02 | −2.0000E+01 | −1.7235E+01 | −5.9691E+00 |
| A4 = | −8.8391E−03 | −2.7957E−04 | −3.3694E−02 | −1.9362E−02 |
| A6 = | 7.1645E−05 | 1.2134E−03 | 2.7384E−03 | 2.6056E−03 |
| A8 = | −2.6111E−04 | −6.5498E−04 | −2.4460E−05 | −2.8118E−04 |
| A10 = | 2.0557E−05 | 8.8315E−05 | −6.6640E−06 | 2.0114E−05 |
| A12 = | 4.5655E−07 | −5.3096E−06 | 3.5997E−07 | −8.6194E−07 |
| A14 = | −8.8556E−08 | 1.5184E−07 | −7.3810E−09 | 1.9839E−08 |
| A16 = | 2.2376E−09 | −1.6863E−09 | 5.2723E−11 | −1.8743E−10 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 6.41 | Y11/Y82 | 0.32 |
| Fno | 1.93 | Yc82/f | 0.36 |
| HFOV [deg.] | 44.0 | (R15 + R16)/(R15 − R16) | 3.64 |
| ΣCT/BL | 3.57 | R16/f | 0.29 |
| Sd/Td | 0.94 | f2/f1 | 0.56 |
| Td/f | 1.12 | |f7/f2| | 2.05 |
| Td/EPD | 2.17 | f/f123 | 0.67 |
| TL/ImgH | 1.34 | |f/f456| | 0.29 |
| ImgH/f | 1.00 | | |

12th Embodiment

Figure 23:
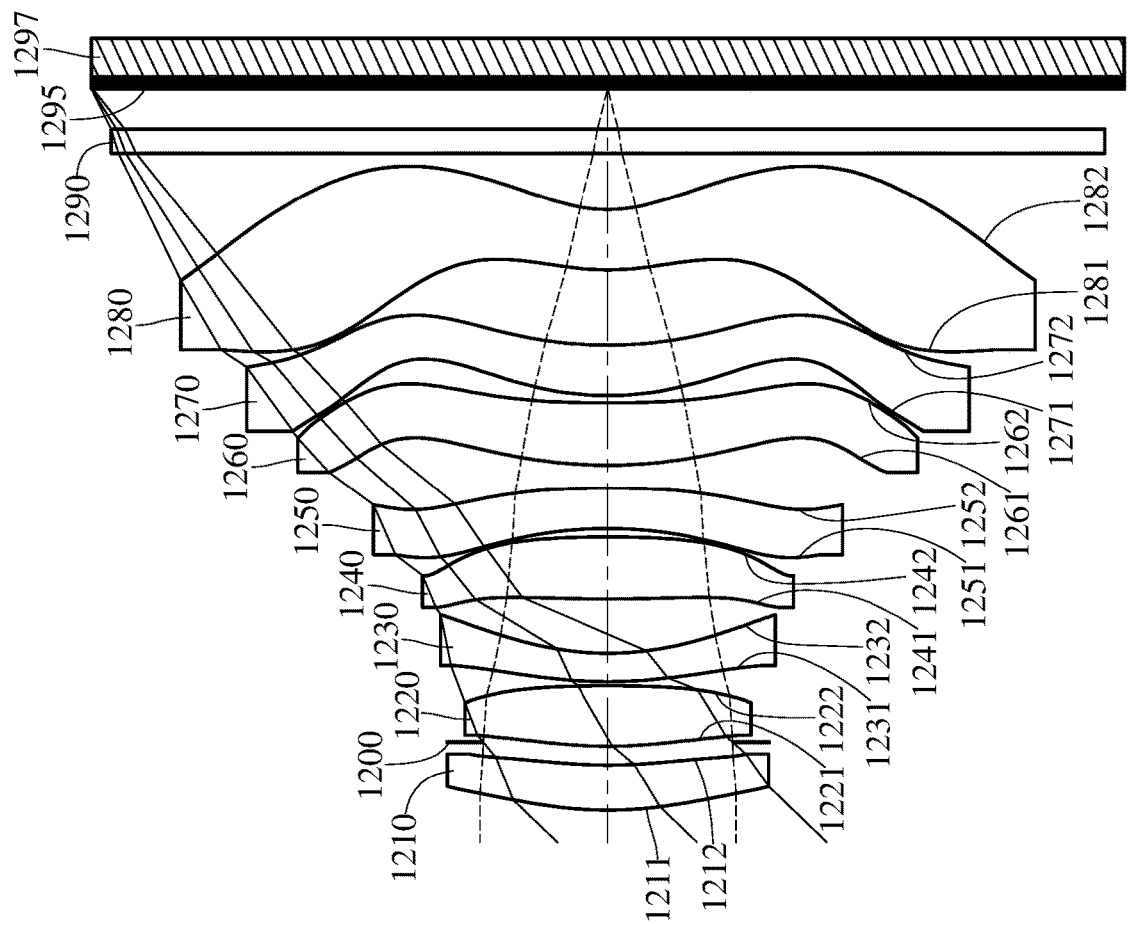
FIG. 23 is a schematic view of an image capturing unit according to the 12th embodiment of the present disclosure.
Figure 24:
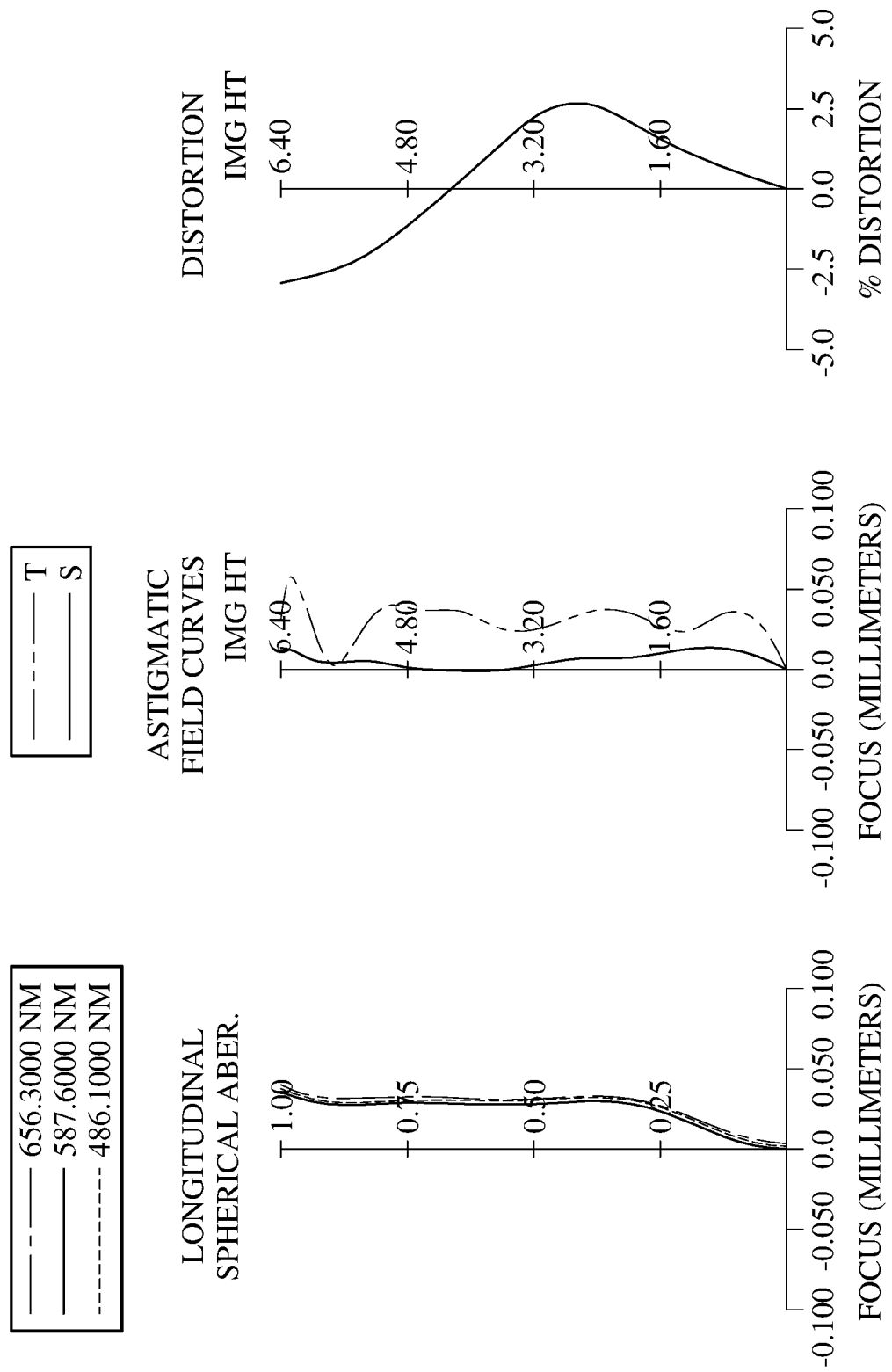
FIG. 24 shows spherical aberration curves, astigmatic field curves and a distortion curve of the image capturing unit according to the 12th embodiment.

FIG. 23 is a schematic view of an image capturing unit according to the 3rd embodiment of the present disclosure. FIG. 24 shows, in order from left to right, spherical aberration curves, astigmatic field curves and a distortion curve of the image capturing unit according to the 3rd embodiment. In FIG. 23, the image capturing unit includes the photographing optical lens system (its reference numeral is omitted) of the present disclosure and an image sensor 1297. The photographing optical lens system includes, in order from an object side to an image side, a first lens element 1210, an aperture stop 1200, a second lens element 1220, a third lens element 1230, a fourth lens element 1240, a fifth lens element 1250, a sixth lens element 1260, a seventh lens element 1270, an eighth lens element 1280, an IR-cut filter 1290 and an image surface 1295, wherein the image sensor 1297 is disposed on or near the image surface 1295 of the photographing optical lens system, the photographing optical lens system has a total of eight lens elements (1210-1280). There is an air gap in a paraxial region between every two of the lens elements that are adjacent to each other.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric. The image-side surface 1212 of the first lens element 1210 has at least one inflection point.

The second lens element 1220 with positive refractive power has an object-side surface 1221 being convex in a paraxial region thereof and an image-side surface 1222 being convex in a paraxial region thereof. The second lens element 1220 is made of plastic material and has the object-side surface 1221 and the image-side surface 1222 being both aspheric. The object-side surface 1221 of the second lens element 1220 has at least one inflection point.

The third lens element 1230 with negative refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric. The object-side surface 1231 of the third lens element 1230 has at least one inflection point.

The fourth lens element 1240 with positive refractive power has an object-side surface 1241 being convex in a paraxial region thereof and an image-side surface 1242 being convex in a paraxial region thereof. The fourth lens element 1240 is made of plastic material and has the object-side surface 1241 and the image-side surface 1242 being both aspheric. Both the object-side surface 1241 and the image-side surface 1242 of the fourth lens element 1240 have at least one inflection point.

The fifth lens element 1250 with negative refractive power has an object-side surface 1251 being concave in a paraxial region thereof and an image-side surface 1252 being convex in a paraxial region thereof. The fifth lens element 1250 is made of plastic material and has the object-side surface 1251 and the image-side surface 1252 being both aspheric. Both the object-side surface 1251 and the image-side surface 1252 of the fifth lens element 1250 have at least one inflection point.

The sixth lens element 1260 with positive refractive power has an object-side surface 1261 being convex in a paraxial region thereof and an image-side surface 1262 being concave in a paraxial region thereof. The sixth lens element 1260 is made of plastic material and has the object-side surface 1261 and the image-side surface 1262 being both aspheric. Both the object-side surface 1261 and the image-side surface 1262 of the sixth lens element 1260 have at least one inflection point.

The seventh lens element 1270 with positive refractive power has an object-side surface 1271 being convex in a paraxial region thereof and an image-side surface 1272 being concave in a paraxial region thereof. The seventh lens element 1270 is made of plastic material and has the object-side surface 1271 and the image-side surface 1272 being both aspheric. Both the object-side surface 1271 and the image-side surface 1272 of the seventh lens element 1270 have at least one inflection point.

The eighth lens element 1280 with negative refractive power has an object-side surface 1281 being convex in a paraxial region thereof and an image-side surface 1282 being concave in a paraxial region thereof. The eighth lens element 1280 is made of plastic material and has the object-side surface 1281 and the image-side surface 1282 being both aspheric. The object-side surface 1281 of the eighth lens element 1280 has at least one inflection point. The image-side surface 1282 of the eighth lens element 1280 has at least one convex shape in an off-axis region thereof.

The IR-cut filter 1290 is made of glass and located between the eighth lens element 1280 and the image surface 1295, and will not affect the focal length of the photographing optical lens system.

The detailed optical data of the 12th embodiment are shown in Table 23 and the aspheric surface data are shown in Table 24 below.

TABLE 23

12th Embodiment
f = 6.35 mm, Fno = 2.00, HFOV = 46.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.825 | (ASP) | 0.561 | Plastic | 1.550 | 50.8 | 34.90 |
| 2 | | 6.179 | (ASP) | 0.285 | | | | |
| 3 | Ape. Stop | Plano | | −0.049 | | | | |
| 4 | Lens 2 | 5.715 | (ASP) | 0.752 | Plastic | 1.544 | 55.9 | 8.12 |
| 5 | | −18.510 | (ASP) | 0.050 | | | | |
| 6 | Lens 3 | 5.659 | (ASP) | 0.350 | Plastic | 1.660 | 20.3 | −16.37 |
| 7 | | 3.622 | (ASP) | 0.674 | | | | |
| 8 | Lens 4 | 19.448 | (ASP) | 0.770 | Plastic | 1.544 | 55.9 | 15.84 |
| 9 | | −15.251 | (ASP) | 0.103 | | | | |
| 10 | Lens 5 | −6.047 | (ASP) | 0.500 | Plastic | 1.635 | 22.5 | −11.72 |
| 11 | | −33.346 | (ASP) | 0.289 | | | | |

TABLE 23-continued

12th Embodiment
f = 6.35 mm, Fno = 2.00, HFOV = 46.0 deg.

| Surface # | | Curvature Radius | | Thickness | Material | Index | Abbe # | Focal Length |
|---|---|---|---|---|---|---|---|---|
| 12 | Lens 6 | 5.620 | (ASP) | 0.777 | Plastic | 1.544 | 55.9 | 13.59 |
| 13 | | 22.290 | (ASP) | 0.090 | | | | |
| 14 | Lens 7 | 3.888 | (ASP) | 0.624 | Plastic | 1.567 | 40.0 | 20.33 |
| 15 | | 5.526 | (ASP) | 0.933 | | | | |
| 16 | Lens 8 | 3.054 | (ASP) | 0.750 | Plastic | 1.544 | 55.9 | −9.95 |
| 17 | | 1.783 | (ASP) | 0.700 | | | | |
| 18 | IR-cut filter | Plano | | 0.300 | Glass | 1.517 | 64.2 | — |
| 19 | | Plano | | 0.498 | | | | |
| 20 | Image | Plano | | — | | | | |

Note:
Reference wavelength is 587.6 nm (d-line).

TABLE 24

Aspheric Coefficients

| Surface # | 1 | 2 | 4 | 5 | 6 | 7 |
|---|---|---|---|---|---|---|
| k = | −4.3241E+00 | −6.7299E+00 | 9.4700E−01 | −1.0000E+00 | −9.4210E+00 | −5.2944E+00 |
| A4 = | −4.4661E−03 | −1.4856E−02 | −1.7319E−02 | −1.0862E−02 | −7.6296E−03 | 6.2673E−04 |
| A6 = | −6.7928E−04 | −5.6862E−03 | −7.6604E−04 | −4.2143E−04 | 3.4948E−03 | 2.2152E−03 |
| A8 = | 2.0353E−05 | 8.5146E−03 | 6.8596E−04 | −3.7444E−04 | −1.2514E−03 | −9.8051E−04 |
| A10 = | −9.0099E−06 | −5.9052E−03 | −4.7613E−04 | 2.2237E−04 | 7.4292E−05 | 1.2074E−04 |
| A12 = | 2.0738E−05 | 2.5823E−03 | 5.3485E−04 | −3.5399E−05 | 2.4241E−05 | −3.7754E−07 |
| A14 = | −2.0689E−06 | −6.0079E−04 | −2.0655E−04 | −9.5513E−06 | 2.5428E−07 | 1.7342E−06 |
| A16 = | −3.1019E−08 | 5.8560E−05 | 2.7164E−05 | 2.5663E−06 | −7.7954E−07 | −5.4395E−07 |

| Surface # | 8 | 9 | 10 | 11 | 12 | 13 |
|---|---|---|---|---|---|---|
| k = | −1.1423E+01 | −1.0000E+00 | −3.8457E+01 | −1.4250E+01 | 1.3521E+00 | −1.0000E+00 |
| A4 = | −7.3490E−03 | −1.7707E−02 | −4.9946E−02 | −3.9601E−02 | −9.6610E−03 | 1.5399E−02 |
| A6 = | 1.4485E−03 | 1.1107E−02 | 3.4639E−02 | 1.9045E−02 | 4.7891E−03 | −2.9202E−03 |
| A8 = | −4.3137E−03 | −8.7211E−03 | −1.5695E−02 | −5.8228E−03 | −1.7695E−03 | 2.2557E−04 |
| A10 = | 3.1750E−03 | 3.1868E−03 | 4.3692E−03 | 1.1022E−03 | 3.1489E−04 | −2.6354E−05 |
| A12 = | −1.1899E−03 | −6.1955E−04 | −6.8187E−04 | −1.1549E−04 | −3.4617E−05 | 2.4659E−06 |
| A14 = | 2.1266E−04 | 5.7846E−05 | 5.5360E−05 | 6.1420E−06 | 2.1157E−06 | −9.8966E−08 |
| A16 = | −1.4022E−05 | −1.5544E−06 | −1.8342E−06 | −1.3048E−07 | −5.2766E−08 | 1.1658E−09 |

| Surface # | 14 | 15 | 16 | 17 |
|---|---|---|---|---|
| k = | −1.3244E−01 | −2.0000E+01 | −1.2869E+01 | −3.7125E+00 |
| A4 = | 2.0832E−03 | 1.9559E−02 | −2.3271E−02 | −2.1912E−02 |
| A6 = | −3.3972E−03 | −4.6770E−03 | −1.2737E−03 | 3.0540E−03 |
| A8 = | 4.0875E−04 | 2.7721E−04 | 4.9350E−04 | −3.4671E−04 |
| A10 = | −7.5748E−05 | −8.0109E−07 | −4.0045E−05 | 2.5018E−05 |
| A12 = | 9.0199E−06 | −3.6823E−07 | 1.5358E−06 | −1.0419E−06 |
| A14 = | −4.7132E−07 | 7.7865E−09 | −2.9129E−08 | 2.2854E−08 |
| A16 = | 8.7344E−09 | 1.3818E−11 | 2.1878E−10 | −2.0410E−10 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 6.35 | Y11/Y82 | 0.38 |
| Fno | 2.00 | Yc82/f | 0.39 |
| HFOV [deg.] | 46.0 | (R15 + R16)/(R15 − R16) | 3.81 |
| ΣCT/BL | 3.39 | R16/f | 0.28 |
| Sd/Td | 0.89 | f2/f1 | 0.23 |

| -continued | | | |
|---|---|---|---|
| 12th Embodiment | | | |
| Td/f | 1.17 | |f7/f2| | 2.50 |
| Td/EPD | 2.35 | f/f123 | 0.62 |
| TL/ImgH | 1.40 | |f/f456| | 0.33 |
| ImgH/f | 1.01 | | |

The foregoing image capturing unit is able to be installed in, but not limited to, an electronic device, including smart phones, tablet personal computers and wearable devices.

According to the present disclosure, the photographing optical lens system has a total of eight lens elements, the second lens element with positive refractive power is favorable for arranging the lens elements having strong refractive power near the middle section of the photographing optical lens system so as to prevent the lens element with strong refractive power having excessive curvature, and thereby preventing the molding problems. When specific conditions are satisfied, it is favorable for tightly arranging the lens elements so as to reduce the total track length of the photographing optical lens system. Besides, it is favorable for correcting the aberration and increasing the relative illumination so as to improve the image resolution at the off-axis region. In addition, the photographing optical lens system favorably satisfies the requirement of compact size and large image surface so as to be applied to an electronic device having high resolution. Moreover, it is favorable with the principal point being positioned away from the image side of the photographing optical lens system for reducing the back focal length, and thereby maintaining a compact size thereof. Furthermore, it is favorable for arranging a diameter of each of the lens elements so as to keep the photographing optical lens system compact. As a result, the photographing optical lens system simultaneously satisfies the requirements of wide field of view, compact size and high image quality.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising eight lens elements, the eight lens elements being, in order from an object side to an image side: a first lens element, a second lens element, a third lens element, a fourth lens element, a fifth lens element, a sixth lens element, a seventh lens element and an eighth lens element;
   wherein the photographing optical lens system has a total of eight lens elements, there is an air gap in a paraxial region between every two of the eight lens elements that are adjacent to each other, the second lens element has an image-side surface being concave in a paraxial region thereof, the seventh lens element has at least one inflection point, the eighth lens element has an image-side surface being concave in a paraxial region thereof, the image-side surface of the eighth lens element has at least one convex critical point in an off-axis region thereof, and both an object-side surface and the image-side surface of the eighth lens element are aspheric;
   wherein an axial distance between an object-side surface of the first lens element and an image surface is TL, an axial distance between the object-side surface of the first lens element and the image-side surface of the eighth lens element is Td, a maximum image height of the photographing optical lens system is ImgH, a vertical distance between a non-axial critical point on the image-side surface of the eighth lens element and an optical axis is Yc82, a focal length of the photographing optical lens system is f, and the following conditions are satisfied:

$TL/ImgH<3.0$;

$Td/f<2.0$; and $0.10<Yc82/f<0.80$.

2. The photographing optical lens system of claim 1, wherein the seventh lens element has an image-side surface being concave in a paraxial region thereof, and the image-side surface of the seventh lens element has at least one convex critical point in an off-axis region thereof.

3. The photographing optical lens system of claim 1, wherein the axial distance between the object-side surface of the first lens element and the image-side surface of the eighth lens element is Td, an entrance pupil diameter of the photographing optical lens system is EPD, and the following condition is satisfied:

$Td/EPD<3.0$.

4. The photographing optical lens system of claim 1, wherein a sum of central thicknesses of all lens elements of the photographing optical lens system is ΣCT, an axial distance between the image-side surface of the eighth lens element and the image surface is BL, and the following condition is satisfied:

$2.5<\Sigma CT/BL<6.5$.

5. The photographing optical lens system of claim 1, wherein the focal length of the photographing optical lens system is f, a composite focal length of the first lens element, the second lens element and the third lens element is f123, and the following condition is satisfied:

$0.30<f/f123<1.5$.

6. The photographing optical lens system of claim 1, wherein the axial distance between the object-side surface of the first lens element and the image surface is TL, the maximum image height of the photographing optical lens system is ImgH, and the following condition is satisfied:

$TL/ImgH<2.0$.

7. The photographing optical lens system of claim 1, wherein the axial distance between the object-side surface of the first lens element and the image-side surface of the eighth lens element is Td, the focal length of the photographing optical lens system is f, and the following condition is satisfied:

$Td/f<1.50$.

8. The photographing optical lens system of claim 1, wherein a focal length of the second lens element is f2, a focal length of the seventh lens element is f7, and the following condition is satisfied:

$|f7/f2|<1.0$.

9. The photographing optical lens system of claim 1, wherein a maximum effective radius of the object-side surface of the first lens element is Y11, a maximum effective radius of the image-side surface of the eighth lens element is Y82, and the following condition is satisfied:

$Y11/Y82<1.25$.

10. The photographing optical lens system of claim 1, wherein a curvature radius of the object-side surface of the eighth lens element is R15, a curvature radius of the image-side surface of the eighth lens element is R16, and the following condition is satisfied:

$-0.50<(R15+R16)/(R15-R16)$.

11. The photographing optical lens system of claim 1, wherein a curvature radius of the image-side surface of the eighth lens element is R16, the focal length of the photographing optical lens system is f, and the following condition is satisfied:

$0.10<R16/f<1.0$.

12. A photographing optical lens system comprising eight lens elements, the eight lens elements being, in order from an object side to an image side: a first lens element, a second lens element, a third lens element, a fourth lens element, a fifth lens element, a sixth lens element, a seventh lens element and an eighth lens element;
wherein the photographing optical lens system has a total of eight lens elements, a central thickness of the third lens element is larger than an axial distance between the second lens element and the third lens element, the first lens element has an object-side surface being concave in a paraxial region thereof, the eighth lens element has an object-side surface being convex in a paraxial region thereof and an image-side surface being concave in a paraxial region thereof, the image-side surface of the eighth lens element has at least one convex critical point in an off-axis region thereof, and both the object-side surface and the image-side surface of the eighth lens element are aspheric;
wherein an axial distance between the object-side surface of the first lens element and an image surface is TL, a maximum image height of the photographing optical lens system is ImgH, and the following condition is satisfied:

$TL/\mathrm{ImgH}<2.0$.

13. The photographing optical lens system of claim 12, wherein a focal length of the second lens element is f2, a focal length of the seventh lens element is f7, and the following condition is satisfied:

$|f7/f2|<1.0$.

14. The photographing optical lens system of claim 12, wherein a curvature radius of the image-side surface of the eighth lens element is R16, a focal length of the photographing optical lens system is f, and the following condition is satisfied:

$0.10<R16/f<1.0$.

15. The photographing optical lens system of claim 12, wherein a sum of central thicknesses of all lens elements of the photographing optical lens system is ΣCT, an axial distance between the image-side surface of the eighth lens element and the image surface is BL, and the following condition is satisfied:

$2.5<\Sigma CT/BL<6.5$.

16. The photographing optical lens system of claim 12, wherein the axial distance between the object-side surface of the first lens element and an image surface is TL, the maximum image height of the photographing optical lens system is ImgH, and the following condition is satisfied:

$TL/\mathrm{ImgH}<1.75$.

17. The photographing optical lens system of claim 12, wherein an axial distance between the object-side surface of the first lens element and the image-side surface of the eighth lens element is Td, a focal length of the photographing optical lens system is f, and the following condition is satisfied:

$Td/f<2.0$.

18. The photographing optical lens system of claim 12, wherein a maximum effective radius of the object-side surface of the first lens element is Y11, a maximum effective radius of the image-side surface of the eighth lens element is Y82, and the following condition is satisfied:

$Y11/Y82<1.25$.

19. The photographing optical lens system of claim 12, wherein the first lens element has an image-side surface being convex in a paraxial region thereof, a focal length of the first lens element is f1, a focal length of the second lens element is f2, and the following condition is satisfied:

$-0.25<f2/f1<1.25$.

20. A photographing optical lens system comprising eight lens elements, the eight lens elements being, in order from an object side to an image side: a first lens element, a second lens element, a third lens element, a fourth lens element, a fifth lens element, a sixth lens element, a seventh lens element and an eighth lens element;
wherein the photographing optical lens system has a total of eight lens elements, the eighth lens element has an object-side surface being convex in a paraxial region thereof and an image-side surface being concave in a paraxial region thereof, the image-side surface of the eighth lens element has at least one convex critical point in an off-axis region thereof, and both the object-side surface and the image-side surface of the eighth lens element are aspheric;
wherein an axial distance between an object-side surface of the first lens element and an image surface is TL, a maximum image height of the photographing optical lens system is ImgH, a vertical distance between a non-axial critical point on the image-side surface of the eighth lens element and an optical axis is Yc82, a focal length of the photographing optical lens system is f, and the following conditions are satisfied:

$TL/\mathrm{ImgH}<2.0$; and $0.10<Yc82/f<0.80$.

21. The photographing optical lens system of claim 20, wherein the seventh lens element has an image-side surface being concave in a paraxial region thereof, and the image-side surface of the seventh lens element has at least one convex critical point in an off-axis region thereof.

22. The photographing optical lens system of claim 20, wherein an axial distance between the object-side surface of the first lens element and the image-side surface of the eighth lens element is Td, the focal length of the photographing optical lens system is f, and the following condition is satisfied:

$Td/f<2.0$.

23. The photographing optical lens system of claim 20, wherein a sum of central thicknesses of all lens elements of the photographing optical lens system is ΣCT, an axial distance between the image-side surface of the eighth lens element and the image surface is BL, and the following condition is satisfied:

$2.5<\Sigma CT/BL<6.5$.

24. The photographing optical lens system of claim 20, wherein a maximum effective radius of the object-side surface of the first lens element is Y11, a maximum effective radius of the image-side surface of the eighth lens element is Y82, and the following condition is satisfied:

$Y11/Y82<1.25$.

25. The photographing optical lens system of claim 20, wherein the maximum image height of the photographing optical lens system is ImgH, the focal length of the photographing optical lens system is f, and the following condition is satisfied:

$0.65 < ImgH/f < 1.40$.

* * * * *